US012609126B2

(12) United States Patent
Meng et al.

(10) Patent No.: US 12,609,126 B2
(45) Date of Patent: Apr. 21, 2026

(54) MULTI-CHANNEL SIGNAL ENCODING AND DECODING METHOD AND APPARATUS

(71) Applicant: Huawei Technologies Co., Ltd., Shenzhen (CN)

(72) Inventors: Xianbo Meng, Beijing (CN); Bingyin Xia, Beijing (CN); Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 198 days.

(21) Appl. No.: 18/423,990

(22) Filed: Jan. 26, 2024

(65) Prior Publication Data

US 2024/0169998 A1 May 23, 2024

Related U.S. Application Data

(63) Continuation of application No. PCT/CN2022/096602, filed on Jun. 1, 2022.

(30) Foreign Application Priority Data

Jul. 29, 2021 (CN) ......................... 202110865298.2

(51) Int. Cl.
*G10L 19/008* (2013.01)
*G10L 19/022* (2013.01)

(52) U.S. Cl.
CPC .......... *G10L 19/008* (2013.01); *G10L 19/022* (2013.01)

(58) Field of Classification Search
None
See application file for complete search history.

(56) References Cited

U.S. PATENT DOCUMENTS

| | | | | |
|---|---|---|---|---|
| 2004/0049379 A1* | 3/2004 | Thumpudi | ............ | G10L 19/008 704/E19.01 |
| 2012/0020482 A1* | 1/2012 | Kim | ...................... | G10L 19/032 381/23 |
| 2012/0265543 A1* | 10/2012 | Lang | ...................... | H04H 20/89 704/500 |
| 2021/0027794 A1* | 1/2021 | Vaillancourt | ......... | G10L 19/008 |

* cited by examiner

*Primary Examiner* — Hemant S Patel
(74) *Attorney, Agent, or Firm* — Conley Rose, P.C.

(57) ABSTRACT

In a multi-channel signal encoding method, a current frame includes a first sound channel and a second sound channel. First group information of M blocks of the first sound channel and second group information of M blocks of the second sound channel are obtained. When the first group information and the second group information meet a preset condition, first adjusted group information and second adjusted group information are obtained based on the first group information and the second group information. Then, a first to-be-encoded spectrum is obtained based on the first adjusted group information and the spectrums of the M blocks of the first sound channel. Similarly, a second to-be-encoded spectrum may be obtained. Finally, the first to-be-encoded spectrum and the second to-be-encoded spectrum are encoded by using an encoding neural network to obtain a spectrum encoding result. The spectrum encoding result may be carried by a bitstream.

20 Claims, 16 Drawing Sheets

FIG. 1
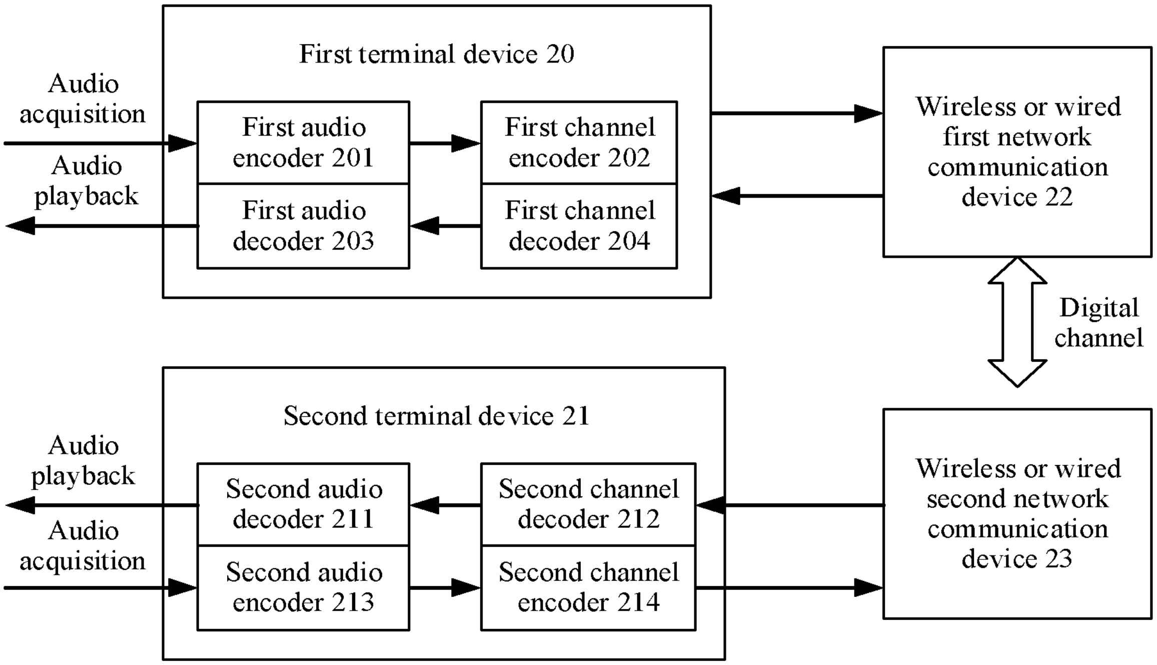
FIG. 2A
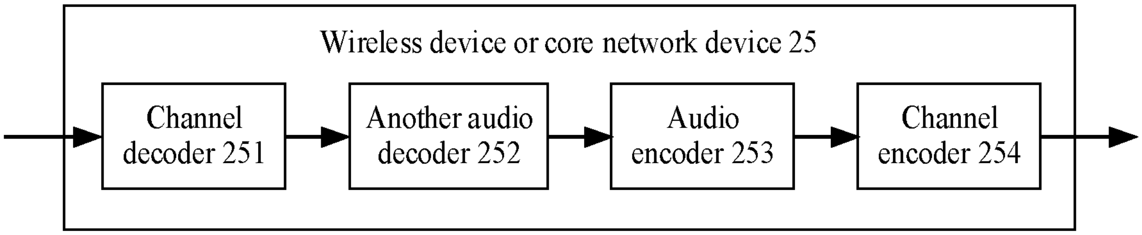
FIG. 2B

MULTI-CHANNEL SIGNAL ENCODING AND DECODING METHOD AND APPARATUS

CROSS-REFERENCE TO RELATED APPLICATIONS

This application is a continuation of International Patent Application No. PCT/CN2022/096602 filed on Jun. 1, 2022, which claims priority to Chinese Patent Application No. 202110865298.2 filed on Jul. 29, 2021. The disclosures of the aforementioned applications are hereby incorporated by reference in their entireties.

TECHNICAL FIELD

The present disclosure relates to the field of audio processing technologies, and in particular, to a multi-channel signal encoding and decoding method and apparatus.

BACKGROUND

Compression of audio data is an indispensable part in media communication, media broadcasting, and other media applications. With the development of high-definition audio industry and three-dimensional audio industry, people have an increasing requirement for audio quality, followed by the rapid growth of an audio data amount in media applications.

In a current audio data compression technology, based on a basic principle of signal processing, an original audio signal is compressed in time and space by using correlation of signals. For example, the audio signal includes a stereo signal, to reduce a data amount. This facilitates transmission or storage of audio data.

In a current audio signal encoding solution, when the audio signal is a transient signal, encoding quality is low. When a decoder side reconstructs a signal, a problem that reconstruction effect of a multi-channel signal is poor also exists.

SUMMARY

Embodiments of the present disclosure provide a multi-channel signal encoding and decoding method and apparatus, to improve encoding quality of a multi-channel signal and reconstruction effect of the multi-channel signal.

To resolve the foregoing technical problem, embodiments of the present disclosure provide the following technical solutions.

According to a first aspect, an embodiment of the present disclosure provides a multi-channel signal encoding method, including: obtaining M first transient identifiers of M blocks of a first sound channel of a current frame of a to-be-encoded multi-channel signal based on spectrums of the M blocks of the first sound channel, where the M blocks of the first sound channel include a first block of the first sound channel, and a first transient identifier of the first block indicates that the first block is a transient block or indicates that the first block is a non-transient block; obtaining first group information of the M blocks of the first sound channel based on the M first transient identifiers; obtaining M second transient identifiers of M blocks of a second sound channel of the current frame based on spectrums of the M blocks of the second sound channel, where the M blocks of the second sound channel include a second block of the second sound channel, and a second transient identifier of the second block indicates that the second block is a transient block or indicates that the second block is a non-transient block; obtaining second group information of the M blocks of the second sound channel based on the M second transient identifiers; when the first group information and the second group information meet a preset condition, obtaining first adjusted group information and second adjusted group information based on the first group information and the second group information, where the first adjusted group information corresponds to the first group information, and the second adjusted group information corresponds to the second group information; and the first adjusted group information is the same as the first group information, and the second adjusted group information is obtained by adjusting the second group information; or the first adjusted group information is obtained by adjusting the first group information, and the second adjusted group information is the same as the second group information; or the first adjusted group information is obtained by adjusting the first group information, and the second adjusted group information is obtained by adjusting the second group information; obtaining a first to-be-encoded spectrum based on the first adjusted group information and the spectrums of the M blocks of the first sound channel; obtaining a second to-be-encoded spectrum based on the second adjusted group information and the spectrums of the M blocks of the second sound channel; encoding the first to-be-encoded spectrum and the second to-be-encoded spectrum by using an encoding neural network, to obtain a spectrum encoding result; and writing the spectrum encoding result into a bitstream.

In the foregoing solution, the current frame of the to-be-encoded multi-channel signal includes the first sound channel and the second sound channel. Each sound channel includes the spectrums of the M blocks. The M first transient identifiers of the M blocks of the first sound channel are obtained based on the spectrums of the M blocks of the first sound channel of the current frame of the to-be-encoded multi-channel signal, and the first group information of the M blocks of the first sound channel is obtained based on the M first transient identifiers. Similarly, the second group information of the M blocks of the second sound channel may be obtained. When the first group information and the second group information meet the preset condition, the first adjusted group information and the second adjusted group information are obtained based on the first group information and the second group information. Then, the first to-be-encoded spectrum is obtained based on the first adjusted group information and the spectrums of the M blocks of the first sound channel. Similarly, the second to-be-encoded spectrum may be obtained. Finally, the first to-be-encoded spectrum and the second to-be-encoded spectrum are encoded by using the encoding neural network, to obtain the spectrum encoding result. The spectrum encoding result may be carried by the bitstream. Therefore, in this embodiment of the present disclosure, the group information of the M blocks of each sound channel is obtained based on the M transient identifiers of each sound channel of the current frame, the adjusted group information of the M blocks of each sound channel is obtained when the group information of the M blocks of each sound channel meets the preset condition, and the to-be-encoded spectrum is obtained based on the adjusted group information of the M blocks of each sound channel and the spectrums of the M blocks of each sound channel. Therefore, blocks with different transient identifiers can be grouped, adjusted, and encoded. This improves encoding quality of the multi-channel signal.

In a possible implementation, the method further includes: encoding the first adjusted group information and the second adjusted group information, to obtain a group information encoding result; and writing the group information encoding result into the bitstream. In the foregoing solution, after obtaining the first adjusted group information and the second adjusted group information, an encoder side encodes the first adjusted group information and the second adjusted group information to obtain the group information encoding result. An encoding scheme used for the adjusted group information is not limited herein. The adjusted group information may be encoded to obtain the group information encoding result, and the group information encoding result may be written into the bitstream, so that the bitstream may carry the group information encoding result, and a decoder side parses the bitstream to obtain the group information encoding result, and performs parsing to obtain the first adjusted group information and the second adjusted group information.

In a possible implementation, the first group information includes a first group quantity or a first group quantity identifier of the M blocks of the first sound channel, the first group quantity identifier indicates the first group quantity, and when the first group quantity is greater than 1, the first group information further includes the M first transient identifiers; or the first group information includes the M first transient identifiers; and/or the second group information includes a second group quantity or a second group quantity identifier of the M blocks of the second sound channel, the second group quantity identifier indicates the second group quantity, and when the second group quantity is greater than 1, the second group information further includes the M second transient identifiers; or the second group information includes the M second transient identifiers; and/or the first adjusted group information includes a first adjusted group quantity or a first adjusted group quantity identifier of the M blocks of the first sound channel, the first adjusted group quantity identifier indicates the first adjusted group quantity, when the first adjusted group quantity is greater than 1, the first adjusted group information further includes M first adjusted transient identifiers of the M blocks of the first sound channel, and a first adjusted transient identifier of the first block is different from or the same as the first transient identifier of the first block; or the first adjusted group information includes the M first adjusted transient identifiers; and/or the second adjusted group information includes a second adjusted group quantity or a second adjusted group quantity identifier of the M blocks of the second sound channel, the second adjusted group quantity identifier indicates the second adjusted group quantity, and when the second adjusted group quantity is greater than 1, the second adjusted group information further includes M second adjusted transient identifiers of the M blocks of the second sound channel, and a second adjusted transient identifier of the second block is different from the second transient identifier of the second block, or the second adjusted transient identifier of the second block is the same as the second transient identifier of the second block; or the second adjusted group information includes the M second adjusted transient identifiers.

In the foregoing solution, the first adjusted group information and the first group information may be the same or different. The first group information includes the first group quantity or the first group quantity identifier of the M blocks of the first sound channel, the first adjusted group information includes the first adjusted group quantity or the first adjusted group quantity identifier of the M blocks of the first sound channel, and when the first group information is not adjusted, the first group quantity is the same as the first adjusted group quantity, and the first group quantity identifier is the same as the first adjusted group quantity identifier. When the first group information is adjusted, the first group quantity and the first adjusted group quantity may be the same or may be different. For example, the adjustment for the first group information does not change the group quantity, and the first group quantity and the first adjusted group quantity are the same. If the adjustment for the first group information changes the group quantity, the first group quantity is different from the first adjusted group quantity. For example, before the first group information is adjusted, the first group quantity is 2, and after the first group information is adjusted, the first adjusted group quantity is 1. When the first group information is adjusted, the first group quantity identifier and the first adjusted group quantity identifier may be the same or may be different. For example, before the first group information is adjusted, the first group quantity is 2, and the first group quantity identifier is 1. After the first group information is adjusted, if the first adjusted group quantity is 2, the first group quantity identifier is still 1. Similarly, the second adjusted group information and the second group information may be the same or different.

In a possible implementation, the preset condition includes: The first group information is inconsistent with the second group information. In the foregoing solution, that the first group information is inconsistent with the second group information means that the first group information is not completely consistent with the second group information. When the first group information is inconsistent with the second group information, it may be considered that the first group information and the second group information meet the preset condition. When the first group information is consistent with the second group information, it may be considered that the first group information and the second group information do not meet the preset condition. For example, the group quantity of the M blocks of the first group information is the same as the group quantity of the M blocks of the second group information, but the M first transient identifiers included in the first group information are different from the M second transient identifiers included in the second group information. For another example, the group quantity of the M blocks of the first group information is different from the group quantity of the M blocks of the second group information. The preset condition needs to be determined based on a specific application scenario, and is not limited herein. The foregoing preset condition may be set to determine whether to adjust the first group information and the second group information.

In a possible implementation, that the first group information is inconsistent with the second group information includes: The M first transient identifiers indicate that the M blocks of the first sound channel include a transient block and a non-transient block, the M second transient identifiers indicate that the M blocks of the second sound channel include a transient block and a non-transient block, and the M first transient identifiers are inconsistent with the M second transient identifiers; or that the first group information is inconsistent with the second group information includes: The M first transient identifiers indicate that the M blocks of the first sound channel include a transient block and a non-transient block, the M second transient identifiers indicate that the M blocks of the second sound channel include a transient block and a non-transient block, and a quantity of transient blocks of the first sound channel is inconsistent with a quantity of transient blocks of the second sound channel; or that the first group information is inconsistent with the second group information includes: The M first transient identifiers indicate that the M blocks of the first sound channel include a transient block and a non-transient block, the M second transient identifiers indicate that the M blocks of the second sound channel include a transient block and a non-transient block, the M first transient identifiers are inconsistent with the M second transient identifiers, an $N^{th}$ block in the M blocks of the first sound channel and an $N^{th}$ block in the M blocks of the second sound channel are both in a transient state, and $0 \le N < M$.

In an implementation of the foregoing solution, some of the M blocks of the first sound channel are transient blocks, and some of the M blocks of the first sound channel are non-transient blocks. Similarly, the M blocks of the second sound channel include a transient block and a non-transient block. That the M first transient identifiers are inconsistent with the M second transient identifiers means that at least one transient identifier in the M first transient identifiers and a transient identifier in the M second transient identifiers have a same index but different values. For example, one block A in the M blocks of the first sound channel is a transient block, and one block B in the M blocks of the second sound channel is a transient block. If an index of the block A in the M blocks of the first sound channel is the same as an index of the block B in the M blocks of the second sound channel, a first transient identifier of the block A is consistent with a second transient identifier of the block B. For example, one block C in the M blocks of the first sound channel is a non-transient block, and one block D in the M blocks of the second sound channel is a transient block. If an index of the block C in the M blocks of the first sound channel is the same as an index of the block D in the M blocks of the second sound channel, a first transient identifier of the block C is inconsistent with a second transient identifier of the block D. In this embodiment of the present disclosure, when the M first transient identifiers are inconsistent with the M second transient identifiers, it may be determined that the first group information and the second group information meet the preset condition. In this case, the group information needs to be adjusted. When the M first transient identifiers are completely the same as the M second transient identifiers, it may be determined that the first group information and the second group information do not meet the preset condition. In this case, the group information is not adjusted.

In an implementation of the foregoing solution, some of the M blocks of the first sound channel are transient blocks, and some of the M blocks of the first sound channel are non-transient blocks. Therefore, the quantity of transient blocks included in the first sound channel may be obtained through statistics collection. Similarly, the M blocks of the second sound channel include a transient block and a non-transient block. Therefore, the quantity of transient blocks included in the second sound channel may be obtained through statistics collection. In this embodiment of the present disclosure, when the quantity of transient blocks of the first sound channel is different from the quantity of transient blocks of the second sound channel, it may be determined that the first group information and the second group information meet the preset condition. In this case, the group information needs to be adjusted. When the quantity of transient blocks of the first sound channel is the same as the quantity of transient blocks of the second sound channel, it may be determined that the first group information and the second group information do not meet the preset condition. In this case, the group information is not adjusted.

In an implementation of the foregoing solution, some of the M blocks of the first sound channel are transient blocks, and some of the M blocks of the first sound channel are non-transient blocks. Similarly, the M blocks of the second sound channel include a transient block and a non-transient block. That the M first transient identifiers are inconsistent with the M second transient identifiers means that at least one transient identifier in the M first transient identifiers and a transient identifier in the M second transient identifiers have a same index but different values. For example, one block A in the M blocks of the first sound channel is a transient block, and one block B in the M blocks of the second sound channel is a transient block. If an index of the block A in the M blocks of the first sound channel is the same as an index of the block B in the M blocks of the second sound channel, a first transient identifier of the block A is consistent with a second transient identifier of the block B. For example, one block C in the M blocks of the first sound channel is a non-transient block, and one block D in the M blocks of the second sound channel is a transient block. If an index of the block C in the M blocks of the first sound channel is the same as an index of the block D in the M blocks of the second sound channel, a first transient identifier of the block C is inconsistent with a second transient identifier of the block D. The $N^{th}$ block in the M blocks of the first sound channel and the $N^{th}$ block in the M blocks of the second sound channel are both in a transient state, $0 \le N < M$, and an index of the $N^{th}$ block of the first sound channel is the same as an index of the $N^{th}$ block of the second sound channel. A value of N and a quantity of values of N are not limited. For example, when the quantity of values of N is 1, it indicates that the first sound channel and the second sound channel have one transient block with a same index. For example, when the quantity of values of N is 2, it indicates that the first sound channel and the second sound channel have two transient blocks with a same index. In this embodiment of the present disclosure, when the M first transient identifiers are inconsistent with the M second transient identifiers, and the $N^{th}$ block in the M blocks of the first sound channel and the $N^{th}$ block in the M blocks of the second sound channel are both in the transient state, it may be determined that the first group information and the second group information meet the preset condition. In this case, the group information needs to be adjusted. When the M first transient identifiers are completely consistent with the M second transient identifiers, or the M first transient identifiers are inconsistent with the M second transient identifiers, and the first sound channel and the second sound channel do not have a transient block with a same index, it may be determined that the first group information and the second group information do not meet the preset condition. In this case, the group information is not adjusted.

In a possible implementation, the M blocks of the first sound channel have respective indices, and the M blocks of the second sound channel have respective indices; and when that the first group information is inconsistent with the second group information includes: the M first transient identifiers indicate that the M blocks of the first sound channel include a transient block and a non-transient block, the M second transient identifiers indicate that the M blocks of the second sound channel include a transient block and a non-transient block, and a quantity of transient blocks of the first sound channel is inconsistent with a quantity of transient blocks of the second sound channel, if an index of the transient block in the M blocks of the first sound channel and an index of the transient block in the M blocks of the second sound channel do not intersect, the obtaining first adjusted group information and second adjusted group information based on the first group information and the second group information includes: when the quantity of transient blocks of the first sound channel is less than the quantity of transient blocks of the second sound channel, adjusting the first group information to obtain the first adjusted group information, where a quantity of transient blocks of the first sound channel indicated by the first adjusted group information is equal to a quantity of transient blocks of the second sound channel indicated by the second group information; or when the quantity of transient blocks of the first sound channel is greater than the quantity of transient blocks of the second sound channel, adjusting the second group information to obtain the second adjusted group information, where a quantity of transient blocks of the second sound channel indicated by the second adjusted group information is equal to a quantity of transient blocks of the first sound channel indicated by the first group information.

In the foregoing solution, when the quantity of transient blocks of the first sound channel is inconsistent with the quantity of transient blocks of the second sound channel, and the index of the transient block in the M blocks of the first sound channel and the index of the transient block in the M blocks of the second sound channel do not intersect, the group information of the sound channel with a smaller quantity of transient blocks needs to be adjusted, and the group information of the sound channel with a larger quantity of transient blocks remains unchanged, and the quantities of transient blocks indicated by the adjusted group information of the two sound channels are the same. In this adjustment manner, the quantity of transient blocks of the first sound channel and the quantity of transient blocks of the second sound channel may be the same, to facilitate subsequent encoding of the spectrums of the first sound channel and the second sound channel. When the quantity of transient blocks of the first sound channel is less than the quantity of transient blocks of the second sound channel, the first group information is adjusted to obtain the first adjusted group information. Specifically, the adjustment of the first group information may include adjusting the first transient identifiers of the M blocks. For example, the first transient identifier of the first block in the M blocks is adjusted from a non-transient state to a transient state, so that the quantity of transient blocks of the first sound channel increases, and the quantity (namely, an adjusted quantity of transient blocks of the first sound channel) of transient blocks of the first sound channel in the first adjusted group information is equal to the quantity of transient blocks of the second sound channel indicated by the second group information. When the quantity of transient blocks of the first sound channel is greater than the quantity of transient blocks of the second sound channel, the second group information is adjusted to obtain the second adjusted group information. Specifically, the adjustment of the second group information may include adjusting the second transient identifiers of the M blocks. For example, the second transient identifier of the second block in the M blocks is adjusted from a non-transient state to a transient state, so that the quantity of transient blocks of the second sound channel increases, and the quantity (namely, an adjusted quantity of transient blocks of the second sound channel) of transient blocks of the second sound channel in the second adjusted group information is equal to the quantity of transient blocks of the first sound channel indicated by the first group information.

In a possible implementation, the M blocks of the first sound channel have respective indices, and the M blocks of the second sound channel have respective indices; and when that the first group information is inconsistent with the second group information includes: the M first transient identifiers indicate that the M blocks of the first sound channel include a transient block and a non-transient block, the M second transient identifiers indicate that the M blocks of the second sound channel include a transient block and a non-transient block, and a quantity of transient blocks of the first sound channel is inconsistent with a quantity of transient blocks of the second sound channel, if an index of the transient block in the M blocks of the first sound channel and an index of the transient block in the M blocks of the second sound channel intersect, the obtaining first adjusted group information and second adjusted group information based on the first group information and the second group information includes: when indices of transient blocks indicated by the M first transient identifiers are a part of indices of transient blocks indicated by the M second transient identifiers, adjusting at least one of the M first transient identifiers to obtain the M first adjusted transient identifiers, where the indices of all the transient blocks indicated by the M first adjusted transient identifiers are the same as the indices of all the transient blocks indicated by the M second transient identifiers; or when indices of transient blocks indicated by the M second transient identifiers are a part of indices of transient blocks indicated by the M first transient identifiers, adjusting at least one of the M second transient identifiers to obtain the M second adjusted transient identifiers, where the indices of all the transient blocks indicated by the M second adjusted transient identifiers are the same as the indices of all the transient blocks indicated by the M first transient identifiers; or when indices of transient blocks indicated by the M first transient identifiers are partially the same as indices of transient blocks indicated by the M second transient identifiers, adjusting at least one of the M first transient identifiers to obtain the M first adjusted transient identifiers, and adjusting at least one of the M second transient identifiers to obtain the M second adjusted transient identifiers, where the indices of all the transient blocks indicated by the M first adjusted transient identifiers are the same as the indices of all the transient blocks indicated by the M second adjusted transient identifiers.

In an implementation of the foregoing solution, for example, the quantity of transient blocks of the first sound channel is less than the quantity of transient blocks of the second sound channel, that is, the indices of the transient blocks indicated by the M first transient identifiers are a part of the indices of the transient blocks indicated by the M second transient identifiers. In this case, the first transient identifiers of the M blocks of the first sound channel need to be adjusted, the second transient identifiers of the M blocks of the second sound channel remain unchanged, and the at least one of the M first transient identifiers is adjusted to obtain the M first adjusted transient identifiers. The indices of all the transient blocks indicated by the M first adjusted transient identifiers are the same as the indices of all the transient blocks indicated by the M second transient identifiers, and the adjusted quantities of transient blocks indicated by the group information of the two sound channels are the same. In this adjustment manner, the quantity of transient blocks of the first sound channel and the quantity of transient blocks of the second sound channel may be the same, to facilitate subsequent encoding of the spectrums of the first sound channel and the second sound channel.

In an implementation of the foregoing solution, for example, the quantity of transient blocks of the second sound channel is less than the quantity of transient blocks of the first sound channel, that is, the indices of the transient blocks indicated by the M second transient identifiers are a part of the indices of the transient blocks indicated by the M first transient identifiers. In this case, the second transient identifiers of the M blocks of the second sound channel need to be adjusted, the first transient identifiers of the M blocks of the first sound channel remain unchanged, and the at least one of the M second transient identifiers is adjusted to obtain the M second adjusted transient identifiers. The indices of all the transient blocks indicated by the M second adjusted transient identifiers are the same as the indices of all the transient blocks indicated by the M first transient identifiers, and the adjusted quantities of transient blocks indicated by the group information of the two sound channels are the same. In this adjustment manner, the quantity of transient blocks of the first sound channel and the quantity of transient blocks of the second sound channel may be the same, to facilitate subsequent encoding of the spectrums of the first sound channel and the second sound channel.

In an implementation of the foregoing solution, for example, the quantity of transient blocks of the second sound channel is not equal to the quantity of transient blocks of the first sound channel, but the indices of the transient blocks indicated by the M first transient identifiers are partially the same as the indices of the transient blocks indicated by the M second transient identifiers. The partial sameness herein means that indices of some transient blocks in the M blocks of the first sound channel are the same as indices of some transient blocks in the M blocks of the second sound channel, instead of the indices of all the transient blocks being completely the same. In this case, the first transient identifiers of the M blocks of the first sound channel need to be adjusted, and the second transient identifiers of the M blocks of the second sound channel need to be adjusted, that is, the transient identifiers of the M blocks of the two sound channels need to be adjusted. The at least one of the M first transient identifiers is adjusted to obtain the M first adjusted transient identifiers, and the at least one of the M second transient identifiers is adjusted to obtain the M second adjusted transient identifiers. The indices of all the transient blocks indicated by the M first adjusted transient identifiers are the same as the indices of all the transient blocks indicated by the M second adjusted transient identifiers. The quantities of transient blocks indicated by the adjusted group information of the two sound channels are the same. In this adjustment manner, the quantity of transient blocks of the first sound channel and the quantity of transient blocks of the second sound channel may be the same, to facilitate subsequent encoding of the spectrums of the first sound channel and the second sound channel.

In a possible implementation, the adjusting at least one of the M first transient identifiers to obtain the M first adjusted transient identifiers includes: when the first transient identifier of the first block indicates that the first block is a non-transient block, if a second transient identifier of a third block in the M blocks of the second sound channel indicates that the third block is a transient block, adjusting the first transient identifier of the first block to the first adjusted transient identifier of the first block, where the first adjusted transient identifier of the first block indicates that the first block is a transient block, and an index of the first block is the same as an index of the third block; or the adjusting at least one of the M second transient identifiers to obtain the M second adjusted transient identifiers includes: when the second transient identifier of the second block indicates that the second block is a non-transient block, if a first transient identifier of a fourth block in the M blocks of the first sound channel indicates that the fourth block is a transient block, adjusting the second transient identifier of the second block to the second adjusted transient identifier of the second block, where the second adjusted transient identifier of the second block indicates that the second block is a transient block, and an index of the second block is the same as an index of the fourth block.

In the foregoing solution, the adjustment of the first transient identifier is used as an example for description. When the first transient identifier of the first block indicates that the first block is a non-transient block, if the second transient identifier of the third block in the M blocks of the second sound channel indicates that the third block is a transient block, the first transient identifier of the first block is adjusted to the first adjusted transient identifier of the first block, where the first adjusted transient identifier of the first block indicates that the first block is a transient block, and the index of the first block is the same as the index of the third block. For example, the first transient identifier of the first block is 1, the second transient identifier of the third block is 0, and both the index of the first block and the index of the third block are 4. In this case, the first adjusted transient identifier of the first block is 0. In this adjustment manner, the quantity of transient blocks of the first sound channel and the quantity of transient blocks of the second sound channel may be the same, to facilitate subsequent encoding of the spectrums of the first sound channel and the second sound channel.

In a possible implementation, when the first adjusted group quantity is greater than 1 or the M first adjusted transient identifiers indicate that the M blocks of the first sound channel include a transient block and a non-transient block, the obtaining a first to-be-encoded spectrum based on the first adjusted group information and the spectrums of the M blocks of the first sound channel includes: grouping and arranging the spectrums of the M blocks of the first sound channel based on the first adjusted group information, to obtain the first to-be-encoded spectrum; and when the second adjusted group quantity is greater than 1 or the M second adjusted transient identifiers indicate that the M blocks of the second sound channel include a transient block and a non-transient block, the obtaining a second to-be-encoded spectrum based on the second adjusted group information and the spectrums of the M blocks of the second sound channel includes: grouping and arranging the spectrums of the M blocks of the second sound channel based on the second adjusted group information, to obtain the second to-be-encoded spectrum.

In the foregoing solution, that the encoder side obtains the first adjusted group information is used as an example. After obtaining the first adjusted group information of the M blocks, the encoder side may group and arrange the spectrums of the M blocks of the current frame based on the first adjusted group information of the M blocks. The spectrums of the M blocks are grouped and arranged, so that an arrangement order of the spectrums of the M blocks in the current frame can be adjusted. The foregoing grouping and arranging are performed based on the first adjusted group information of the M blocks. The first adjusted group information of the M blocks is obtained based on the M transient identifiers of the M blocks. After the foregoing grouping and arranging of the M blocks, grouped and arranged spectrums of the M blocks are obtained. The grouped and arranged spectrums of the M blocks are grouped and arranged based on the M transient identifiers of the M blocks, and an encoding order of the spectrums of the M blocks may be changed through grouping and arranging. It should be noted that the M blocks of the current frame may be the M blocks of the first sound channel of the current frame.

In a possible implementation, the grouping and arranging the spectrums of the M blocks of the first sound channel based on the first adjusted group information, to obtain the first to-be-encoded spectrum includes: allocating spectrums of blocks that are indicated as transient blocks by the first adjusted transient identifiers of the M blocks and that are in the M blocks of the first sound channel to a first transient group, allocating spectrums of blocks that are indicated as non-transient blocks by the first adjusted transient identifiers of the M blocks and that are in the M blocks of the first sound channel to a first non-transient group, and arranging the spectrums of the blocks in the first transient group before the spectrums of the blocks in the first non-transient group, to obtain the first to-be-encoded spectrum; or the grouping and arranging the spectrums of the M blocks of the second sound channel based on the second adjusted group information, to obtain the second to-be-encoded spectrum includes: allocating spectrums of blocks that are indicated as transient blocks by the second adjusted transient identifiers of the M blocks and that are in the M blocks of the second sound channel to a second transient group, allocating spectrums of blocks that are indicated as non-transient blocks by the second adjusted transient identifiers of the M blocks and that are in the M blocks of the second sound channel to a second non-transient group, and arranging the spectrums of the blocks in the second transient group before the spectrums of the blocks in the second non-transient group, to obtain the second to-be-encoded spectrum.

In the foregoing solution, after obtaining the first adjusted group information of the M blocks, the encoder side groups the M blocks based on the different transient identifiers, to obtain a transient group and a non-transient group, and then arranges locations of the spectrums of the M blocks in the current frame to arrange spectrums of blocks in the transient group before spectrums of blocks in the non-transient group, to obtain the to-be-encoded spectrum. That is, the spectrums of all the transient blocks in the to-be-encoded spectrum are located before the spectrums of the non-transient blocks, so that the spectrums of the transient blocks can be adjusted to a location of higher encoding importance, so that a transient feature of an audio signal reconstructed through encoding and decoding by using a neural network can be better retained. The M blocks of the current frame may be the M blocks of the first sound channel of the current frame.

In a possible implementation, the grouping and arranging the spectrums of the M blocks of the first sound channel based on the first adjusted group information, to obtain the first to-be-encoded spectrum includes: allocating spectrums of blocks that are indicated as transient blocks by the first adjusted transient identifiers of the M blocks and that are in the M blocks of the first sound channel before spectrums of blocks that are indicated as non-transient blocks by the first adjusted transient identifiers of the M blocks and that are in the M blocks of the first sound channel, to obtain the first to-be-encoded spectrum; or the grouping and arranging the spectrums of the M blocks of the second sound channel based on the second adjusted group information, to obtain the second to-be-encoded spectrum includes: arranging spectrums of blocks that are indicated as transient blocks by the second adjusted transient identifiers of the M blocks and that are in the M blocks of the second sound channel before spectrums of blocks that are indicated as non-transient blocks by the second adjusted transient identifiers of the M blocks and that are in the M blocks of the second sound channel, to obtain the second to-be-encoded spectrum.

In the foregoing solution, after obtaining the first adjusted group information of the M blocks, the encoder side determines a transient identifier of each of the M blocks based on the first adjusted group information, and first finds P transient blocks and Q non-transient blocks from the M blocks. In this case, M=P+Q. The spectrums of the blocks that are indicated as transient blocks by the M first adjusted transient identifiers and that are in the M blocks are arranged before the spectrums of the blocks that are indicated as non-transient blocks by the M transient identifiers and that are in the M blocks, to obtain the to-be-encoded spectrum. That is, the spectrums of all the transient blocks in the to-be-encoded spectrum are located before the spectrums of the non-transient blocks, so that the spectrums of the transient blocks can be adjusted to a location of higher encoding importance, so that a transient feature of an audio signal reconstructed through encoding and decoding by using a neural network can be better retained. The M blocks of the current frame may be the M blocks of the first sound channel of the current frame.

In a possible implementation, before the encoding the first to-be-encoded spectrum and the second to-be-encoded spectrum by using an encoding neural network, the method further includes: performing intra-group interleaving on the first to-be-encoded spectrum to obtain a first intra-group interleaved spectrum; and performing intra-group interleaving on the second to-be-encoded spectrum, to obtain a second intra-group interleaved spectrum; and the encoding the first to-be-encoded spectrum and the second to-be-encoded spectrum by using an encoding neural network includes: encoding, by using the encoding neural network, the first intra-group interleaved spectrum and the second intra-group interleaved spectrum.

In the foregoing solution, after obtaining the to-be-encoded spectrum (for example, the first to-be-encoded spectrum and the second to-be-encoded spectrum), the encoder side may first perform intra-group interleaving based on groups of the M blocks of each sound channel, to obtain intra-group interleaved spectrums of the M blocks. In this case, the intra-group interleaved spectrums of the M blocks may be input data of the encoded neural network. The M blocks of the current frame may be the M blocks of the first sound channel of the current frame. Through intra-group interleaving, encoding side information can be further reduced, and encoding efficiency can be improved.

In a possible implementation, a quantity of the blocks that are indicated as transient blocks by the M first adjusted transient identifiers and that are in the M blocks of the first sound channel is P, a quantity of the blocks that are indicated as non-transient blocks by the M first adjusted transient identifiers and that are in the M blocks of the first sound channel is Q, and M=P+Q; and the performing intra-group interleaving on the first to-be-encoded spectrum includes: performing interleaving on the spectrums of the P blocks, to obtain interleaved spectrums of the P blocks; and performing interleaving on the spectrums of the Q blocks, to obtain interleaved spectrums of the Q blocks.

In the foregoing solution, the performing interleaving on the spectrums of the P blocks includes performing interleaving on the spectrums of the P blocks as a whole. Similarly, the performing interleaving on the spectrums of the Q blocks includes performing interleaving on the spectrums of the Q blocks as a whole. If the adjusted group quantity of the M blocks of the first sound channel is 1, intra-group interleaving needs to be performed on the spectrums of the M blocks of the first sound channel, to obtain the intra-group interleaved spectrums of the M blocks of the first sound channel.

In a possible implementation, before the obtaining M first transient identifiers of M blocks of a first sound channel of a current frame of a to-be-encoded multi-channel signal based on spectrums of the M blocks of the first sound channel, the method further includes: obtaining a first window type of the first sound channel, where the first window type is a short window type or a non-short window type; obtaining a second window type of the second sound channel, where the second window type is a short window type or a non-short window type; and performing, only when both the first window type and the second window type are short window types, the step of obtaining M first transient identifiers of M blocks of a first sound channel of a current frame of a to-be-encoded multi-channel signal based on spectrums of the M blocks of the first sound channel.

In the foregoing solution, the encoder side may first determine a window type of the current frame, where the window type may be a short window type or a non-short window type. For example, the encoder side determines the window type based on the current frame of the to-be-encoded multi-channel signal. A short window may also be referred to as a short frame, and a non-short window may also be referred to as a non-short frame. When the window type is a short window type, the foregoing step of obtaining M first transient identifiers of M blocks of a first sound channel is triggered to be performed. In this embodiment of the present disclosure, when the window type of the current frame is a short window type, the foregoing encoding solution is executed, to implement encoding of the multi-channel signal as a transient signal.

In a possible implementation, the method further includes: encoding the first window type and the second window type to obtain a window type encoding result; and writing the window type encoding result into the bitstream.

In the foregoing solution, after obtaining the first window type of the first sound channel and the second window type of the second sound channel of the current frame, the encoder side may include the window type in the bitstream, and first encode the window type. An encoding scheme used for the window type is not limited herein. The window type may be encoded to obtain the window type encoding result. The window type encoding result may be written into the bitstream, so that the bitstream may carry the window type encoding result. In this way, the decoder side may obtain the window type encoding result by using the bitstream, and parse the window type encoding result to obtain the first window type of the first sound channel and the second window type of the second sound channel of the current frame; and determine, based on the first window type of the first sound channel and the second window type of the second sound channel, whether to continue decoding the bitstream, to obtain first decoded group information of the M blocks of the first sound channel.

In a possible implementation, the obtaining M first transient identifiers of M blocks of a first sound channel of a current frame of a to-be-encoded multi-channel signal based on spectrums of the M blocks of the first sound channel includes: obtaining M first spectral energy values of the M blocks of the first sound channel based on the spectrums of the M blocks of the first sound channel; obtaining a first average spectral energy value of the M blocks of the first sound channel based on the M first spectral energy values; and obtaining the M first transient identifiers based on the M first spectral energy values and the first average spectral energy value.

In the foregoing solution, after obtaining the M spectral energy values, the encoder side may average the M spectral energy values to obtain the average spectral energy value, or remove a largest value or largest values from the M spectral energy values and then perform averaging to obtain the average spectral energy value. A spectral energy value of each block in the M spectral energy values is compared with the average spectral energy value, to determine a change status of a spectrum of each block compared with spectrums of other blocks in the M blocks, and further obtain the M transient identifiers of the M blocks, where a transient identifier of a block may indicate a transient feature of the block. The M blocks of the current frame may be the M blocks of the first sound channel of the current frame. In this embodiment of the present disclosure, the transient identifier of each block may be determined based on the spectral energy of each block and the average spectral energy value, so that the transient identifier of one block can determine group information of the block.

In a possible implementation, when a first spectral energy value of the first block is greater than K times the first average spectral energy value, the first transient identifier of the first block indicates that the first block is a transient block; or when a first spectral energy value of the first block is less than or equal to K times the first average spectral energy value, the transient identifier of the first block indicates that the first block is a non-transient block.

K is a real number greater than or equal to 1.

In the foregoing solution, there are multiple values of K. This is not limited herein. A process of determining the transient identifier of the first block in the M blocks is used as an example. When the spectral energy value of the first block is greater than K times the average spectral energy value, it indicates that the spectrum of the first block excessively changes compared with other blocks in the M blocks. In this case, the transient identifier of the first block indicates that the first block is a transient block. When the spectral energy value of the first block is less than or equal to K times the average spectral energy value, it indicates that the spectrum of the first block does not change greatly compared with other blocks in the M blocks, and the transient identifier of the first block indicates that the first block is a non-transient block. The M blocks of the current frame may be the M blocks of the first sound channel of the current frame. The following is not limited: The encoder side may alternatively obtain the M transient identifiers of the M blocks in another manner. For example, a difference or a ratio of the spectral energy value of the first block to the average spectral energy value is obtained, and the M transient identifiers of the M blocks are determined based on the obtained difference or ratio.

According to a second aspect, an embodiment of the present disclosure further provides a multi-channel signal decoding method, including: obtaining first decoded group information of M blocks of a first sound channel of a current frame of a multi-channel signal from a bitstream, where the first decoded group information indicates first decoded transient identifiers of the M blocks of the first sound channel; obtaining second decoded group information of M blocks of a second sound channel of the current frame from the bitstream, where the second decoded group information indicates second decoded transient identifiers of the M blocks of the second sound channel; decoding the bitstream by using a decoding neural network, to obtain decoded spectrums of the M blocks of the first sound channel and decoded spectrums of the M blocks of the second sound channel; obtaining a first reconstructed signal of the first sound channel based on the first decoded group information and the decoded spectrums of the M blocks of the first sound channel; and obtaining a second reconstructed signal of the second sound channel based on the second decoded group information and the decoded spectrums of the M blocks of the second sound channel.

In the foregoing solution, the first decoded group information of the M blocks of the first sound channel of the current frame of the multi-channel signal is obtained from the bitstream, where the first decoded group information indicates the first decoded transient identifiers of the M blocks of the first sound channel. Similarly, the second decoded group information of the M blocks of the second sound channel is obtained from the bitstream, and the bitstream is decoded by using the decoding neural network, to obtain the decoded spectrums of the M blocks of the first sound channel and the decoded spectrums of the M blocks of the second sound channel. The first reconstructed signal of the first sound channel is obtained based on the first decoded group information and the decoded spectrums of the M blocks of the first sound channel. Similarly, the second reconstructed signal of the second sound channel is obtained based on the second decoded group information and the decoded spectrums of the M blocks of the second sound channel. The first decoded spectrums of the M blocks of the first sound channel and the second decoded spectrums of the M blocks of the second sound channel are obtained when the bitstream is decoded, and respectively correspond to grouped and arranged spectrums of the M blocks of the first sound channel and grouped and arranged spectrums of the M blocks of the second sound channel at an encoder side. Therefore, the first reconstructed signal of the first sound channel and the second reconstructed signal of the second sound channel may be obtained based on the first decoded group information and the second decoded group information. During signal reconstruction, decoding and reconstruction may be performed based on blocks with different transient identifiers in the multi-channel signal, so that reconstruction effect of the multi-channel signal can be improved.

In a possible implementation, the obtaining a first reconstructed signal of the first sound channel based on the first decoded group information and the decoded spectrums of the M blocks of the first sound channel includes: when the first decoded group information indicates that a first decoded group quantity of the M blocks of the first sound channel is greater than 1, performing inverse grouping and arranging on the decoded spectrums of the M blocks of the first sound channel, to obtain inversely grouped and arranged spectrums of the M blocks of the first sound channel; and obtaining the first reconstructed signal of the first sound channel based on the inversely grouped and arranged spectrums of the M blocks of the first sound channel; and the obtaining a second reconstructed signal of the second sound channel based on the second decoded group information and the decoded spectrums of the M blocks of the second sound channel includes: when the second decoded group information indicates that a second decoded group quantity of the M blocks of the second sound channel is greater than 1, performing inverse grouping and arranging on the decoded spectrums of the M blocks of the second sound channel, to obtain inversely grouped and arranged spectrums of the M blocks of the second sound channel; and obtaining the second reconstructed signal of the second sound channel based on the inversely grouped and arranged spectrums of the M blocks of the second sound channel.

In the foregoing solution, the signal reconstruction process of the first sound channel is used as an example. A decoder side obtains the first decoded group information of the M blocks, and the decoder side further obtains the decoded spectrums of the M blocks of the first sound channel by using the bitstream. Because the encoder side performs grouping and arranging on the decoded spectrums of the M blocks of the first sound channel, the decoder side needs to perform a process inverse to that of the encoder side. Therefore, inverse grouping and arranging is performed on the decoded spectrums of the M blocks of the first sound channel based on the first decoded group information of the M blocks, to obtain inversely grouped and arranged spectrums of the M blocks of the first sound channel, where inverse grouping and arranging is inverse to grouping and arranging of the encoder side. After obtaining the inversely grouped and arranged spectrums of the M blocks of the first sound channel, the encoder side may perform frequency-time transformation on the inversely grouped and arranged spectrums of the M blocks of the first sound channel, to obtain the first reconstructed signal of the first sound channel.

In a possible implementation, the obtaining a first reconstructed signal of the first sound channel based on the first decoded group information and the decoded spectrums of the M blocks of the first sound channel includes: performing intra-group de-interleaving on the decoded spectrums of the M blocks of the first sound channel, to obtain intra-group de-interleaved spectrums of the M blocks of the first sound channel; and obtaining the first reconstructed signal based on the intra-group de-interleaved spectrums of the M blocks of the first sound channel; and the obtaining a second reconstructed signal of the second sound channel based on the second decoded group information and the decoded spectrums of the M blocks of the second sound channel includes: performing intra-group de-interleaving on the decoded spectrums of the M blocks of the second sound channel, to obtain intra-group de-interleaved spectrums of the M blocks of the second sound channel; and obtaining the second reconstructed signal based on the intra-group de-interleaved spectrums of the M blocks of the second sound channel.

In the foregoing solution, intra-group de-interleaving performed by the decoder side is an inverse process of intra-group interleaving performed by the encoder side.

In a possible implementation, a quantity of blocks that are indicated as transient blocks by the M first decoded transient identifiers and that are in the M blocks of the first sound channel is P, a quantity of blocks that are indicated as non-transient blocks by the M first decoded transient identifiers and that are in the M blocks of the first sound channel is Q, and M=P+Q; and the obtaining a first reconstructed signal of the first sound channel based on the first decoded group information and the decoded spectrums of the M blocks of the first sound channel includes: performing intra-group de-interleaving on decoded spectrums of the P blocks of the first sound channel, and performing intra-group de-interleaving on decoded spectrums of the Q blocks of the first sound channel, to obtain intra-group de-interleaved spectrums of the M blocks of the first sound channel; performing inverse grouping and arranging on the intra-group de-interleaved spectrums of the M blocks of the first sound channel based on the first decoded group information, to obtain inversely grouped and arranged spectrums of the M blocks of the first sound channel; and obtaining the first reconstructed signal of the first sound channel based on the inversely grouped and arranged spectrums of the M blocks of the first sound channel.

In the foregoing solution, the performing de-interleaving on the spectrums of the P blocks includes performing de-interleaving on the spectrums of the P blocks as a whole.

Similarly, the performing de-interleaving on the spectrums of the Q blocks includes performing de-interleaving on the spectrums of the Q blocks as a whole. The encoder side may separately perform interleaving based on a transient group and a non-transient group, to obtain the interleaved spectrums of the P blocks and the interleaved spectrums of the Q blocks. The interleaved spectrums of the P blocks and the interleaved spectrums of the Q blocks may be used as input data of an encoding neural network. Through intra-group interleaving, encoding side information can be further reduced, and encoding efficiency can be improved. Because the encoder side performs intra-group interleaving, the decoder side needs to perform a corresponding inverse process, that is, the decoder side may perform de-interleaving. If the adjusted group quantity of the M blocks of the first sound channel is 1, intra-group de-interleaving needs to be performed on the decoded spectrums of the M blocks of the first sound channel, to obtain the intra-group de-interleaved spectrums of the M blocks of the first sound channel.

In a possible implementation, the performing inverse grouping and arranging on the intra-group de-interleaved spectrums of the M blocks of the first sound channel based on the first decoded group information includes: obtaining indices of the P blocks of the first sound channel based on the first decoded group information; obtaining indices of the Q blocks of the first sound channel based on the first decoded group information; and performing inverse grouping and arranging on the intra-group de-interleaved spectrums of the M blocks of the first sound channel based on the indices of the P blocks and the indices of the Q blocks.

In the foregoing solution, before the encoder side performs grouping and arranging on the spectrums of the M blocks, indices of the M blocks are consecutive, for example, from 0 to M−1. After the encoder side performs grouping and arranging, the indices of the M blocks are no longer consecutive. The decoder side may obtain reconstructed, grouped, and arranged indices of the P blocks in the M blocks and reconstructed, grouped, and arranged indices of the Q blocks in the M blocks based on the first decoded group information of the M blocks. Through inverse grouping and arranging, restored indices of the M blocks are still consecutive.

In a possible implementation, the method further includes: obtaining a window type of the first sound channel of the current frame from the bitstream; obtaining a window type of the second sound channel of the current frame from the bitstream; and performing, only when both the first window type and the second window type are short window types, the step of obtaining first decoded group information of M blocks of a first sound channel of a current frame of a multi-channel signal from a bitstream.

In the foregoing solution, only when both the first window type and the second window type of the current frame are short window types, the foregoing encoding solution may be executed, to implement encoding of the multi-channel signal as a transient signal. The decoder side executes a process inverse to that of the encoder side. Therefore, the decoder side may alternatively first determine the first window type and the second window type of the current frame, where the window type may be a short window type or a non-short window type. For example, the decoder side obtains the window type of the current frame from the bitstream. If the current frame includes the first sound channel and the second sound channel, the first window type of the first sound channel and the second window type of the second sound channel may be obtained.

In a possible implementation, the first decoded group information includes a first decoded group quantity or a first decoded group quantity identifier of the M blocks of the first sound channel, the first decoded group quantity identifier indicates the first decoded group quantity, and when the first decoded group quantity is greater than 1, the first decoded group information further includes the M first decoded transient identifiers; or the first decoded group information includes the M first decoded transient identifiers; and/or the second decoded group information includes a second decoded group quantity or a second decoded group quantity identifier of the M blocks of the second sound channel, the second decoded group quantity identifier indicates the second decoded group quantity, and when the second decoded group quantity is greater than 1, the second decoded group information further includes the M second decoded transient identifiers; or the second decoded group information includes the M second decoded transient identifiers.

In the foregoing solution, the encoder side includes a group information encoding result in the bitstream, where the group information encoding result includes first adjusted group information and second adjusted group information. The decoder side may decode the bitstream to obtain the first decoded group information and the second decoded group information. The first decoded group information corresponds to the first adjusted group information of the encoder side, and the second decoded group information corresponds to the second adjusted group information of the encoder side. For example, the first decoded group information includes the first decoded group quantity or the first decoded group quantity identifier of the M blocks of the first sound channel, the first decoded group quantity indicates the group quantity or the adjusted group quantity of the first sound channel, and the first decoded group quantity identifier indicates the group quantity or the adjusted group quantity of the first sound channel. The M first decoded transient identifiers indicate transient identifiers or adjusted transient identifiers respectively corresponding to the M blocks of the first sound channel. Similarly, the description of the second decoded group information is similar to that of the first decoded group information.

According to a third aspect, an embodiment of the present disclosure further provides a multi-channel signal encoding apparatus, including: a transient identifier obtaining module configured to obtain M first transient identifiers of M blocks of a first sound channel of a current frame of a to-be-encoded multi-channel signal based on spectrums of the M blocks of the first sound channel, where the M blocks of the first sound channel include a first block of the first sound channel, and a first transient identifier of the first block indicates that the first block is a transient block or indicates that the first block is a non-transient block; a group information obtaining module configured to obtain first group information of the M blocks of the first sound channel based on the M first transient identifiers, where the transient identifier obtaining module is configured to obtain M second transient identifiers of M blocks of a second sound channel of the current frame based on spectrums of the M blocks of the second sound channel, where the M blocks of the second sound channel include a second block of the second sound channel, and a second transient identifier of the second block indicates that the second block is a transient block or indicates that the second block is a non-transient block; and the group information obtaining module is configured to obtain second group information of the M blocks of the second sound channel based on the M second transient identifiers; a group information adjustment module configured to: when the first group information and the second group information meet a preset condition, obtain first adjusted group information and second adjusted group information based on the first group information and the second group information, where the first adjusted group information corresponds to the first group information, and the second adjusted group information corresponds to the second group information; and the first adjusted group information is the same as the first group information, and the second adjusted group information is obtained by adjusting the second group information; or the first adjusted group information is obtained by adjusting the first group information, and the second adjusted group information is the same as the second group information; or the first adjusted group information is obtained by adjusting the first group information, and the second adjusted group information is obtained by adjusting the second group information; a spectrum obtaining module configured to obtain a first to-be-encoded spectrum based on the first adjusted group information and the spectrums of the M blocks of the first sound channel, where the spectrum obtaining module is configured to obtain a second to-be-encoded spectrum based on the second adjusted group information and the spectrums of the M blocks of the second sound channel; and an encoding module configured to encode the first to-be-encoded spectrum and the second to-be-encoded spectrum by using an encoding neural network, to obtain a spectrum encoding result; and write the spectrum encoding result into a bitstream.

In the third aspect of the present disclosure, the composition modules of the multi-channel signal encoding apparatus may further perform the steps described in the first aspect and the possible implementations. For details, refer to the foregoing descriptions of the first aspect and the possible implementations.

According to a fourth aspect, an embodiment of the present disclosure further provides a multi-channel signal decoding apparatus, including: a group information obtaining module configured to obtain first decoded group information of M blocks of a first sound channel of a current frame of a multi-channel signal from a bitstream, where the first decoded group information indicates first decoded transient identifiers of the M blocks of the first sound channel; and the group information obtaining module is configured to obtain second decoded group information of M blocks of a second sound channel of the current frame from the bitstream, where the second decoded group information indicates second decoded transient identifiers of the M blocks of the second sound channel; a decoding module configured to decode the bitstream by using a decoding neural network, to obtain decoded spectrums of the M blocks of the first sound channel and decoded spectrums of the M blocks of the second sound channel; and a reconstructed signal obtaining module configured to obtain a first reconstructed signal of the first sound channel based on the first decoded group information and the decoded spectrums of the M blocks of the first sound channel, where the reconstructed signal obtaining module is configured to obtain a second reconstructed signal of the second sound channel based on the second decoded group information and the decoded spectrums of the M blocks of the second sound channel.

In the fourth aspect of the present disclosure, the composition modules of the multi-channel signal decoding apparatus may further perform the steps described in the second aspect and the possible implementations. For details, refer to the foregoing descriptions of the second aspect and the possible implementations.

According to a fifth aspect, an embodiment of the present disclosure provides a computer-readable storage medium. The computer-readable storage medium stores instructions. When the instructions are run on a computer, the computer is enabled to perform the method according to the first aspect or the second aspect.

According to a sixth aspect, an embodiment of the present disclosure provides a computer program product including instructions. When the computer program product runs on a computer, the computer is enabled to perform the method according to the first aspect or the second aspect.

According to a seventh aspect, an embodiment of the present disclosure provides a computer-readable storage medium, including a bitstream generated in the method according to the first aspect.

According to an eighth aspect, an embodiment of the present disclosure provides a communication apparatus. The communication apparatus may include a terminal device, a chip, or another entity. The communication apparatus includes a processor and a memory. The memory is configured to store instructions. The processor is configured to execute the instructions in the memory, so that the communication apparatus performs the method according to either the first aspect or the second aspect.

According to a ninth aspect, the present disclosure provides a chip system. The chip system includes a processor configured to support a multi-channel signal encoding apparatus or a multi-channel signal decoding apparatus in implementing functions in the foregoing aspects, for example, sending or processing data and/or information in the foregoing methods. In a possible design, the chip system further includes a memory. The memory is configured to store program instructions and data that are necessary for the multi-channel signal encoding apparatus or the multi-channel signal decoding apparatus. The chip system may include a chip, or may include a chip and another discrete device.

It can be learned from the foregoing technical solutions that embodiments of the present disclosure have the following advantages.

In embodiments of the present disclosure, the current frame of the to-be-encoded multi-channel signal includes the first sound channel and the second sound channel. Each sound channel includes the spectrums of the M blocks. The M first transient identifiers of the M blocks of the first sound channel are obtained based on the spectrums of the M blocks of the first sound channel of the current frame of the to-be-encoded multi-channel signal, and the first group information of the M blocks of the first sound channel is obtained based on the M first transient identifiers. Similarly, the second group information of the M blocks of the second sound channel may be obtained. When the first group information and the second group information meet the preset condition, the first adjusted group information and the second adjusted group information are obtained based on the first group information and the second group information. Then, the first to-be-encoded spectrum is obtained based on the first adjusted group information and the spectrums of the M blocks of the first sound channel. Similarly, the second to-be-encoded spectrum may be obtained. Finally, the first to-be-encoded spectrum and the second to-be-encoded spectrum are encoded by using the encoding neural network, to obtain the spectrum encoding result. The spectrum encoding result may be carried by the bitstream. Therefore, in this embodiment of the present disclosure, the group information of the M blocks of each sound channel is obtained based on the M transient identifiers of each sound channel of the current frame, the adjusted group information of the M blocks of each sound channel is obtained when the group information of the M blocks of each sound channel meets the preset condition, and the to-be-encoded spectrum is obtained based on the adjusted group information of the M blocks of each sound channel and the spectrums of the M blocks of each sound channel. Therefore, blocks with different transient identifiers can be grouped, adjusted, and encoded. This improves encoding quality of the multi-channel signal.

In another embodiment of the present disclosure, the first decoded group information of the M blocks of the first sound channel of the current frame of the multi-channel signal is obtained from the bitstream, where the first decoded group information indicates the first decoded transient identifiers of the M blocks of the first sound channel. Similarly, the second decoded group information of the M blocks of the second sound channel is obtained from the bitstream, and the bitstream is decoded by using the decoding neural network, to obtain the decoded spectrums of the M blocks of the first sound channel and the decoded spectrums of the M blocks of the second sound channel. The first reconstructed signal of the first sound channel is obtained based on the first decoded group information and the decoded spectrums of the M blocks of the first sound channel. Similarly, the second reconstructed signal of the second sound channel is obtained based on the second decoded group information and the decoded spectrums of the M blocks of the second sound channel. The first decoded spectrums of the M blocks of the first sound channel and the second decoded spectrums of the M blocks of the second sound channel are obtained when the bitstream is decoded, and respectively correspond to grouped and arranged spectrums of the M blocks of the first sound channel and grouped and arranged spectrums of the M blocks of the second sound channel at an encoder side. Therefore, the first reconstructed signal of the first sound channel and the second reconstructed signal of the second sound channel may be obtained based on the first decoded group information and the second decoded group information. During signal reconstruction, decoding and reconstruction may be performed based on blocks with different transient identifiers in the multi-channel signal, so that reconstruction effect of the multi-channel signal can be improved.

BRIEF DESCRIPTION OF DRAWINGS

FIG. 1 is a schematic diagram of a composition structure of an audio processing system according to an embodiment of the present disclosure;

FIG. 2A is a schematic diagram of applying an audio encoder and an audio decoder to a terminal device according to an embodiment of the present disclosure;

FIG. 2B is a schematic diagram of applying an audio encoder to a wireless device or core network device according to an embodiment of the present disclosure;

DESCRIPTION OF EMBODIMENTS

Figure 2C:
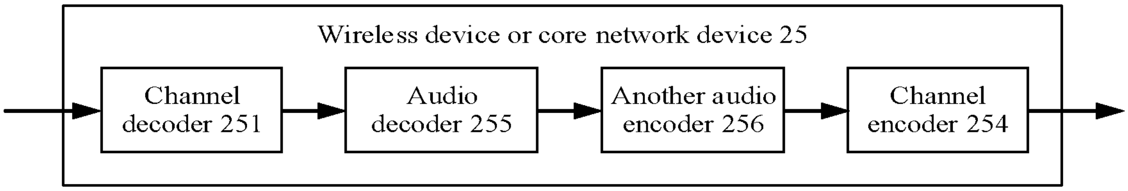
FIG. 2C is a schematic diagram of applying an audio decoder to a wireless device or core network device according to an embodiment of the present disclosure.

The following describes embodiments of the present disclosure with reference to the accompanying drawings.

In the specification, claims, and the accompanying drawings of the present disclosure, the terms “first”, “second”, and the like are intended to distinguish between similar objects but do not necessarily indicate a specific order or sequence. It should be understood that the terms used in such a way are interchangeable in proper circumstances, and this is merely a discrimination manner for describing objects having a same attribute in embodiments of the present disclosure. In addition, the terms “include”, “have”, and any other variants thereof mean to cover the non-exclusive inclusion, so that a process, method, system, product, or device that includes a series of units is not necessarily limited to those units, but may include other units not expressly listed or inherent to such a process, method, product, or device.

Sound is a continuous wave produced by vibration of an object. The object that produces vibration and emits a sound wave is referred to as a sound source. Sound is sensed by human or animal auditory organs as the sound wave travels through a medium (such as air, solid, or liquid).

Features of the sound wave include a tone, an intensity, and a timbre. The tone indicates a sound pitch. The intensity indicates a sound loudness. The intensity may also be referred to as a loudness or a volume. A unit of the intensity is decibel (dB). The timbre is also referred to as sound quality.

A frequency of the sound wave determines the tone. A higher frequency indicates a higher tone. A quantity of times an object vibrates in a second is referred to as the frequency. A unit of the frequency is hertz (Hz). A frequency of sound recognized by a human ear is between 20 Hz and 20000 Hz.

An amplitude of the sound wave determines the intensity. A higher amplitude indicates a higher intensity. A closer sound source indicates a higher intensity.

A waveform of the sound wave determines the timbre. The waveform of the sound wave includes a square wave, a sawtooth wave, a sine wave, a pulse wave, and the like.

Based on the features of the sound wave, the sound can be divided into regular sound and irregular sound. The irregular sound indicates sound produced by irregular vibration of the sound source. The irregular sound is, for example, noise that affects work, study, rest, and the like of people. The regular sound indicates sound produced by regular vibration of the sound source. The regular sound includes voice and music. When sound is represented by electricity, the regular sound is an analog signal that changes continuously in a time-frequency domain. The analog signal may be referred to as an audio signal (acoustic signal). The audio signal is an information carrier that carries voice, music and sound effect.

Because human has a hearing ability to distinguish location distribution of sound sources in space, a listener can feel a location of sound in addition to a tone, an intensity, and a timbre of the sound when hearing the sound in space.

The sound may alternatively be divided into mono and stereo. The mono has one sound channel, a microphone picks up the sound, and a speaker plays the sound. The stereo has a plurality of sound channels, and different sound channels transmit sound with different waveforms.

When the audio signal is a transient signal, a current encoder side does not extract a transient feature or transmit the transient feature in a bitstream, where the transient feature indicates a change status of spectrums of adjacent blocks in a transient frame of the audio signal. As a result, when a decoder side reconstructs a signal, a transient feature of the reconstructed audio signal cannot be obtained from the bitstream, and a problem of poor audio signal reconstruction effect exists.

Embodiments of the present disclosure provide an audio processing technology, and particularly provide an audio encoding technology for a multi-channel signal, to improve a conventional audio encoding system. The multi-channel signal is an audio signal including a plurality of sound channels. For example, the multi-channel signal may be a stereo signal. Audio processing includes audio encoding and audio decoding. Audio encoding is performed at a source side, including encoding (for example, compressing) original audio to reduce a data amount for the audio. This facilitates more efficient storage and/or transmission. Audio decoding is performed at a destination side, including inverse processing with respect to an encoder to reconstruct the original audio. Encoding and decoding are collectively referred to as coding. The following describes the implementations of embodiments of the present disclosure in detail with reference to accompanying drawings.

The technical solutions in embodiments of the present disclosure may be applied to various audio processing systems. FIG. 1 is a schematic diagram of a composition structure of an audio processing system according to an embodiment of the present disclosure. The audio processing system 100 may include a multi-channel signal encoding apparatus 101 and a multi-channel signal decoding apparatus 102. The multi-channel signal encoding apparatus 101 may also be referred to as an audio encoding apparatus, and may be configured to generate a bitstream, and then the audio encoded bitstream may be transmitted to the multi-channel signal decoding apparatus 102 through an audio transmission channel. The multi-channel signal decoding apparatus 102 may also be referred to as a multi-audio decoding apparatus, and may receive the bitstream, then execute an audio decoding function of the multi-channel signal decoding apparatus 102, and finally obtain a reconstructed signal.

In this embodiment of the present disclosure, the multi-channel signal encoding apparatus may be applied to various terminal devices that require audio communication and various wireless devices and core network devices that require transcoding. For example, the multi-channel signal encoding apparatus may be an audio encoder of the terminal device or the wireless device or core network device. Similarly, the multi-channel signal decoding apparatus may be applied to various terminal devices that require audio communication and various wireless devices and core network devices that require transcoding. For example, the multi-channel signal decoding apparatus may be an audio decoder of the terminal device and the wireless device or core network device. For example, the audio encoder may include a radio access network, a media gateway in a core network, a transcoding device, a media resource server, a mobile terminal, a fixed network terminal, and the like. Alternatively, the audio encoder may be an audio encoder applied to a virtual reality (VR) streaming service.

In this embodiment of the present disclosure, an audio coding (audio encoding and audio decoding) module applicable to the VR streaming service is used as an example. A process of encoding and decoding an audio signal between sides includes: After an audio signal A passes through an acquisition module, a preprocessing operation (audio preprocessing) is performed, where the preprocessing operation includes filtering out a low-frequency part in the signal, and may be extracting orientation information in the signal by using 20 Hz or 50 Hz as a demarcation point; after performing encoding (audio encoding), encapsulation (file/segment encapsulation), and delivery to a decoder side, the decoder side first performs decapsulation (file/segment decapsulation) and then performs decoding (audio decoding); and binaural rendering (audio rendering) is performed on a decoded signal, and a signal obtained through rendering is mapped to a listener headphone that may be an independent headphone, or may be a headphone on an eyeglass device.

FIG. 2A is a schematic diagram of applying an audio encoder and an audio decoder to a terminal device according to an embodiment of the present disclosure. Each terminal device may include an audio encoder, a channel encoder, an audio decoder, and a channel decoder. Specifically, the channel encoder is configured to perform channel encoding on an audio signal, and the channel decoder is configured to perform channel decoding on the audio signal. For example, a first terminal device 20 may include a first audio encoder 201, a first channel encoder 202, a first audio decoder 203, and a first channel decoder 204. A second terminal device 21 may include a second audio decoder 211, a second channel decoder 212, a second audio encoder 213, and a second channel encoder 214. The first terminal device 20 is connected to a wireless or wired first network communication device 22, the first network communication device 22 is connected to a wireless or wired second network communication device 23 through a digital channel, and the second terminal device 21 is connected to the wireless or wired second network communication device 23. The wireless or wired network communication device may be a signal transmission device in general, for example, a communication base station or a data switching device.

In audio communication, a terminal device as a transmit end first performs audio acquisition, performs audio encoding on an acquired audio signal, performs channel encoding, and performs transmission in the digital channel via a wireless network or a core network. A terminal device as a receive end performs channel decoding based on a received signal to obtain a bitstream, and then restores an audio signal through audio decoding, and the terminal device as the receive end performs audio playback.

FIG. 2B is a schematic diagram of applying an audio encoder to a wireless device or core network device according to an embodiment of the present disclosure. A wireless device or core network device 25 includes a channel decoder 251, another audio decoder 252, the audio encoder 253 provided in this embodiment of the present disclosure, and a channel encoder 254. The another audio decoder 252 is different from the audio decoder. In the wireless device or core network device 25, the channel decoder 251 first performs channel decoding on a signal entering the device. The another audio decoder 252 performs audio decoding. Then, the audio encoder 253 provided in this embodiment of the present disclosure performs audio encoding. Finally, the channel encoder 254 performs channel encoding on an audio signal, and then performs transmission after channel encoding is completed. The other audio decoder 252 performs audio decoding on a bitstream decoded by the channel decoder 251.

FIG. 2C is a schematic diagram of applying an audio decoder to a wireless device or core network device according to an embodiment of the present disclosure. The wireless device or core network device 25 includes a channel decoder 251, the audio decoder 255 provided in this embodiment of the present disclosure, another audio encoder 256, and a channel encoder 254. The another audio encoder 256 is different from the audio encoder. In the wireless device or core network device 25, the channel decoder 251 first performs channel decoding on a signal entering the device. The audio decoder 255 performs decoding on a received audio encoded bitstream. Then, the another audio encoder 256 performs audio encoding. Finally, the channel encoder 254 performs channel encoding on an audio signal, and then performs transmission after channel encoding is completed. In a wireless device or core network device, if transcoding needs to be implemented, corresponding audio encoding needs to be performed. The wireless device is a radio frequency-related device in communication, and the core network device is a core network-related device in communication.

In some embodiments of the present disclosure, the multi-channel signal encoding apparatus may be applied to various terminal devices that require audio communication and various wireless devices and core network devices that require transcoding. For example, the multi-channel signal encoding apparatus may be a multi-channel encoder of the terminal device or the wireless device or core network device. Similarly, the multi-channel signal decoding apparatus may be applied to various terminal devices that require audio communication and various wireless devices and core network devices that require transcoding. For example, the multi-channel signal decoding apparatus may be a multi-channel decoder of the terminal device and the wireless device or core network device.

Figure 3A:
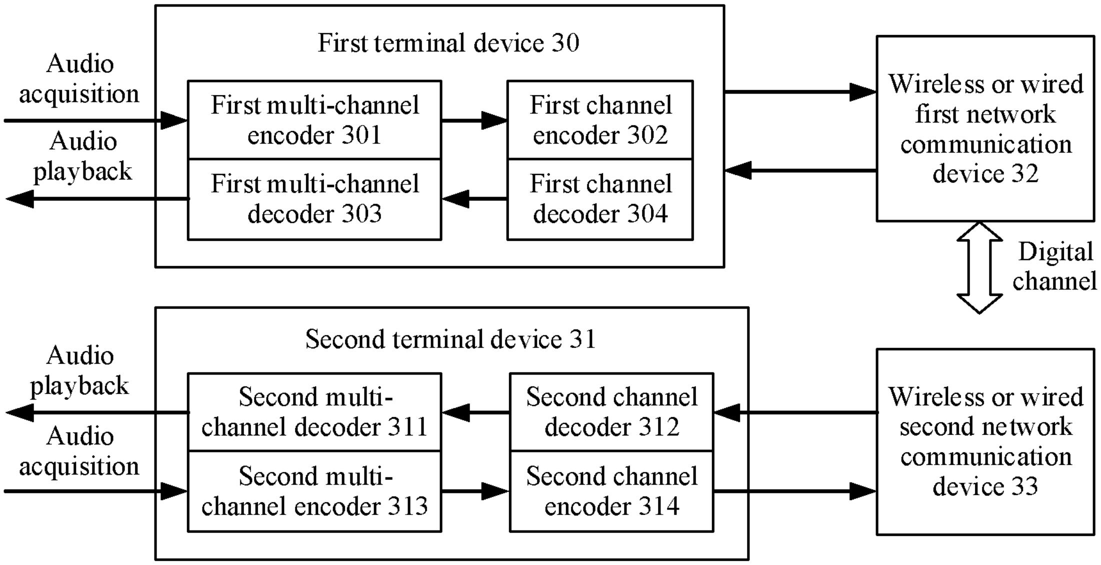
FIG. 3A is a schematic diagram of applying a multi-channel encoder and a multi-channel decoder to a terminal device according to an embodiment of the present disclosure.

FIG. 3A is a schematic diagram of applying a multi-channel encoder and a multi-channel decoder to a terminal device according to an embodiment of the present disclosure. Each terminal device may include a multi-channel encoder, a channel encoder, a multi-channel decoder, and a channel decoder. The multi-channel encoder may perform an audio encoding method provided in embodiments of the present disclosure, and the multi-channel decoder may perform an audio decoding method provided in embodiments of the present disclosure. Specifically, the channel encoder is configured to perform channel encoding on a multi-channel signal, and the channel decoder is configured to perform channel decoding on the multi-channel signal. For example, a first terminal device 30 may include a first multi-channel encoder 301, a first channel encoder 302, a first multi-channel decoder 303, and a first channel decoder 304. A second terminal device 31 may include a second multi-channel decoder 311, a second channel decoder 312, a second multi-channel encoder 313, and a second channel encoder 314. The first terminal device 30 is connected to a wireless or wired first network communication device 32, the first network communication device 32 is connected to a wireless or wired second network communication device 33 through a digital channel, and the second terminal device 31 is connected to the wireless or wired second network communication device 33. The wireless or wired network communication device may be a signal transmission device in general, for example, a communication base station or a data switching device. In audio communication, a terminal device as a transmit end performs multi-channel encoding on an acquired multi-channel signal, performs channel encoding, and performs transmission in the digital channel via a wireless network or a core network. A terminal device as a receive end performs channel decoding based on a received signal to obtain a multi-channel signal encoded bitstream, and then restores a multi-channel signal through multi-channel decoding, and the terminal device as the receive end performs playback.

Figure 3B:
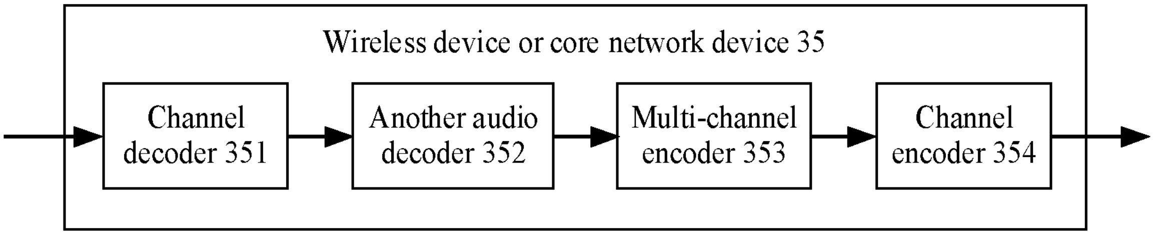
FIG. 3B is a schematic diagram of applying a multi-channel encoder to a wireless device or core network device according to an embodiment of the present disclosure.

FIG. 3B is a schematic diagram of applying a multi-channel encoder to a wireless device or core network device according to an embodiment of the present disclosure. The wireless device or core network device 35 includes: a channel decoder 351, another audio decoder 352, a multi-channel encoder 353, and a channel encoder 354. FIG. 3B is similar to FIG. 2B.

Figure 3C:
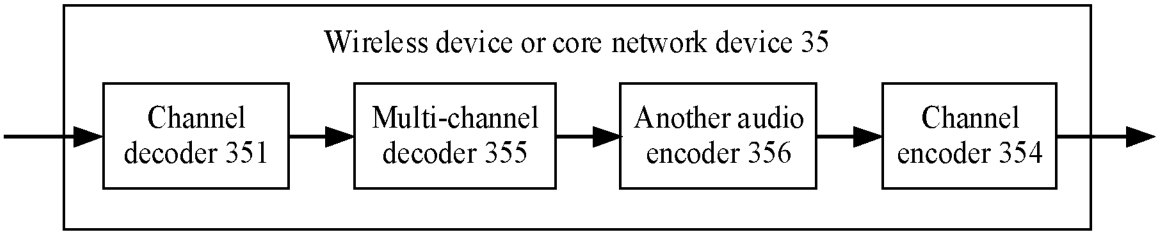
FIG. 3C is a schematic diagram of applying a multi-channel decoder to a wireless device or core network device according to an embodiment of the present disclosure.

FIG. 3C is a schematic diagram of applying a multi-channel decoder to a wireless device or core network device according to an embodiment of the present disclosure. The wireless device or core network device 35 includes: a channel decoder 351, a multi-channel decoder 355, another audio encoder 356, and a channel encoder 354. FIG. 3C is similar to FIG. 2C.

Audio encoding may be a part of the multi-channel encoder, and audio decoding may be a part of the multi-channel decoder. For example, the performing multi-channel encoding on an acquired multi-channel signal may be processing the acquired multi-channel signal to obtain an audio signal, and then encoding the obtained audio signal by using the method provided in embodiments of the present disclosure. A decoder side performs decoding based on the multi-channel signal encoded bitstream to obtain the audio signal, and restores the multi-channel signal after upmixing. Therefore, embodiments of the present disclosure may also be applied to a multi-channel encoder and a multi-channel decoder in a terminal device or a wireless device or core network device. In a wireless device or core network device, if transcoding needs to be implemented, corresponding multi-channel encoding needs to be performed.

Figure 4:
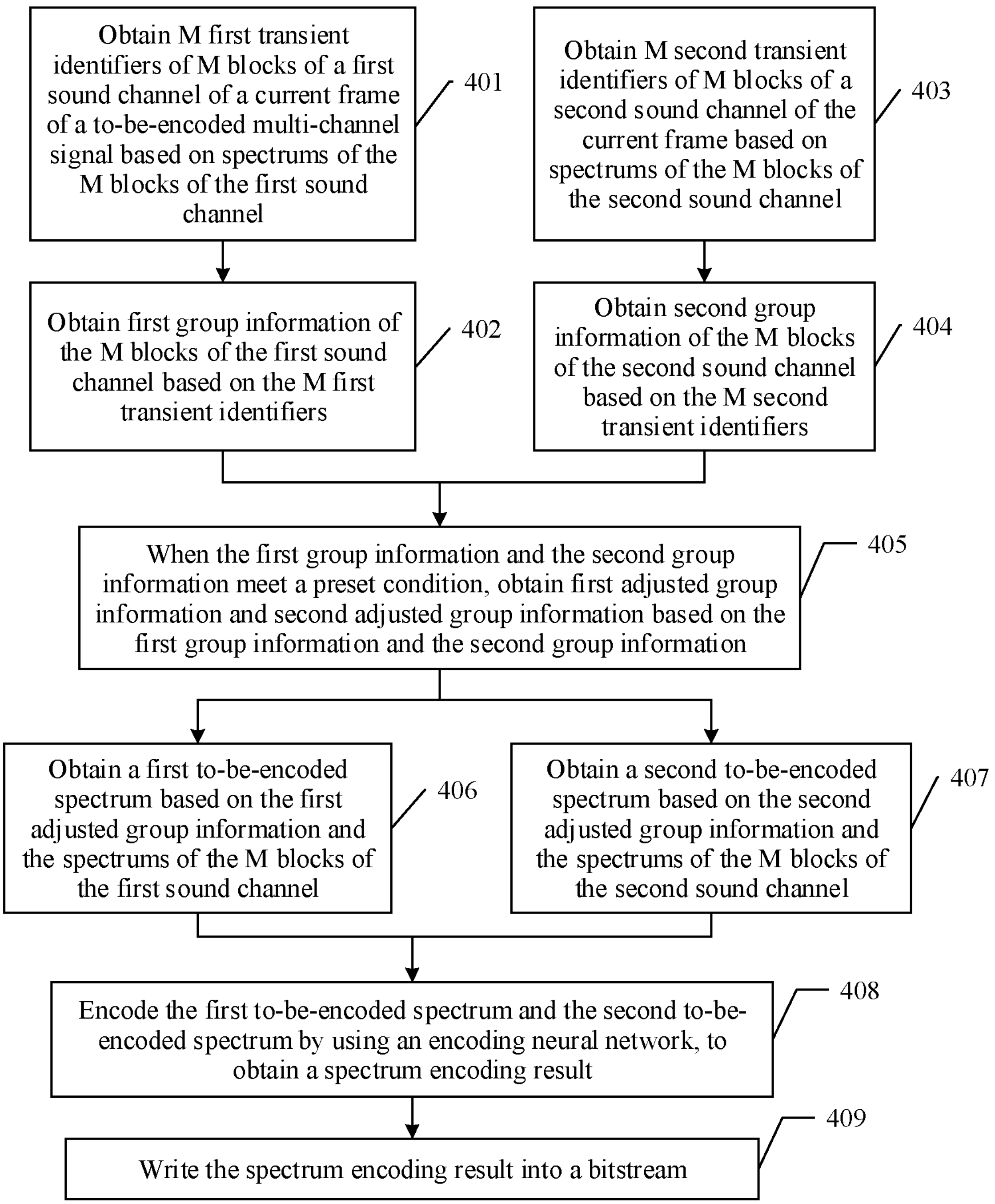
FIG. 4 is a schematic diagram of a multi-channel signal encoding method according to an embodiment of the present disclosure.

A multi-channel signal encoding method provided in embodiments of the present disclosure is first described. The method may be performed by a terminal device. For example, the terminal device may be a multi-channel signal encoding apparatus (briefly referred to as an encoder side or an encoder below, for example, the encoder side may be an artificial intelligence (AI) encoder). In this embodiment of the present disclosure, the multi-channel signal may include a plurality of sound channels, for example, a first sound channel and a second sound channel, or the plurality of sound channels may include a first sound channel, a second sound channel, a third sound channel, and the like. In the subsequent embodiments, an encoding procedure of the first sound channel is described in detail. For an encoding procedure of another channel, refer to an encoding manner of the first sound channel, and details are no longer described for each sound channel. As shown in FIG. 4, an encoding procedure performed by an encoder side in an embodiment of the present disclosure is described.

401: Obtain M first transient identifiers of M blocks of a first sound channel of a current frame of a to-be-encoded multi-channel signal based on spectrums of the M blocks of the first sound channel, where the M blocks of the first sound channel include a first block of the first sound channel, and a first transient identifier of the first block indicates that the first block is a transient block or indicates that the first block is a non-transient block.

An encoder side first obtains the to-be-encoded multi-channel signal, and performs framing on the to-be-encoded multi-channel signal to obtain the current frame of the to-be-encoded multi-channel signal. In a subsequent embodiment, a process of encoding the current frame is used as an example for description. An encoding scheme of another frame of the to-be-encoded multi-channel signal is similar to an encoding scheme of the current frame. The current frame of the to-be-encoded multi-channel signal includes the first sound channel and a second sound channel. Each channel includes spectrums of M blocks. For example, the first sound channel may be a left sound channel, and the second sound channel may be a right sound channel. Alternatively, the first sound channel and the second sound channel may be any two sound channels in a plurality of sound channels, or the first sound channel and the second sound channel may be signals of two sound channels obtained based on a multi-channel signal. In this embodiment of the present disclosure, the current frame may further include three or more sound channels. This is not limited herein. In this embodiment of the present disclosure, for the first sound channel and the second sound channel, manners of obtaining transient identifiers, obtaining group information, and grouping and arranging are similar. In a subsequent embodiment, processing of the first sound channel is used only as an example. For processing of the second sound channel, refer to a processing manner of the first sound channel.

After determining the current frame, the encoder side performs windowing on the current frame, and performs time-frequency transformation. If the current frame includes M blocks, spectrums of the M blocks of the current frame may be obtained, where M indicates a quantity of blocks included in the current frame. In this embodiment of the present disclosure, a value of M is not limited. For example, an audio signal of the current frame is divided into blocks to obtain the M blocks of the audio signal. A length of one block of the audio signal is the same as a length of a window function used when windowing is performed on the block of the audio signal. Then, windowing and time-frequency transformation are performed on the M blocks of the audio signal, so that the spectrums of the M blocks may be obtained. For example, the encoder side performs time-frequency transformation on M windowed blocks of the audio signal of the current frame, to obtain the modified discrete cosine transform (MDCT) spectrums of the M blocks. In a subsequent embodiment, that the spectrums of the M blocks are the MDCT spectrum is used as an example. The following is not limited: The spectrums of the M blocks may alternatively be another spectrum. The M blocks of the current frame may be the M blocks of the first sound channel of the current frame.

After obtaining the spectrums of the M blocks, the encoder side respectively obtains the M transient identifiers of the M blocks based on the spectrums of the M blocks. A spectrum of each block is used to determine a transient identifier of the block, each block corresponds to one transient identifier, and a transient identifier of one block indicates a spectrum change status of the block in the M blocks. For example, a block included in the M blocks is the first block, and the first block corresponds to one transient identifier. The M blocks of the current frame may be the M blocks of the first sound channel of the current frame. For another example, the M blocks of the first sound channel include a fourth block, and an index of the fourth block is different from an index of the first block.

In some embodiments of the present disclosure, there are a plurality of implementations for a value of the transient identifier. For example, the transient identifier may indicate that the first block is a transient block, or the transient identifier may indicate that the first block is a non-transient block. If a transient identifier of a block is a transient state, it indicates that a spectrum of the block greatly changes compared with a spectrum of another block in the M blocks. If a transient identifier of a block is a non-transient state, it indicates that a spectrum of the block does not greatly change compared with a spectrum of another block in the M blocks. For example, the transient identifier occupies one bit. If a value of the transient identifier is 0, it indicates that a corresponding block is a transient block, or if a value of the transient identifier is 1, it indicates that a corresponding block is a non-transient block. Alternatively, if a value of the transient identifier is 1, it indicates that the corresponding block is a transient block; or if a value of the transient identifier is 0, it indicates that the corresponding block is a non-transient block. This is not limited herein.

402: Obtain first group information of the M blocks of the first sound channel based on the M first transient identifiers.

After obtaining the M transient identifiers of the M blocks, the encoder side obtains the first group information of the M blocks based on the M transient identifiers of the M blocks, where the M transient identifiers of the M blocks are used to group the M blocks. The first group information of the M blocks may indicate a grouping manner of the M blocks, and the M transient identifiers of the M blocks are a basis for grouping the M blocks. For example, blocks with a same transient identifier may be grouped into one group, and blocks with different transient identifiers are grouped into different groups. The M blocks of the current frame may be the M blocks of the first sound channel of the current frame.

In some embodiments of the present disclosure, the first group information includes a first group quantity or a first group quantity identifier of the M blocks of the first sound channel, the first group quantity identifier indicates the first group quantity, and when the first group quantity is greater than 1, the first group information further includes the M first transient identifiers; or the first group information includes the M first transient identifiers, that is, the first group information may not directly include the group quantity, but indirectly indicate the group quantity by using the M first transient identifiers. In other words, when the M first transient identifiers indicate that the M blocks of the first sound channel are all transient blocks or non-transient blocks, the group quantity is 1. When the M first transient identifiers indicate that the M blocks of the first sound channel include a transient block and a non-transient block, the group quantity is 2.

There may be a plurality of implementations for the first group information of the M blocks. The first group information of the M blocks includes the group quantity or the group quantity identifier of the M blocks, the group quantity identifier indicates the group quantity, and when the group quantity is greater than 1, the first group information of the M blocks further includes the M transient identifiers of the M blocks; or the first group information of the M blocks includes the M transient identifiers of the M blocks. The first group information of the M blocks may indicate a grouping status of the M blocks, so that the encoder side may use the group information to perform grouping and arranging on the spectrums of the M blocks. The M blocks of the current frame may be the M blocks of the first sound channel of the current frame.

For example, the first group information of the M blocks includes the group quantity of the M blocks and the transient identifiers of the M blocks. The transient identifiers of the M blocks may also be referred to as group indicator information. Therefore, the group information in this embodiment of the present disclosure may include the group quantity and the group indicator information. For example, a value of the group quantity may be 1 or 2. The group indicator information indicates the transient identifiers of the M blocks.

For example, the first group information of the M blocks includes the transient identifiers of the M blocks. The transient identifiers of the M blocks may also be referred to as group indicator information. Therefore, the group information in this embodiment of the present disclosure may include the group indicator information. For example, the group indicator information indicates the transient identifiers of the M blocks.

For example, the first group information of the M blocks includes: When the group quantity of the M blocks is 1, that is, when the group quantity is equal to 1, the first group information of the M blocks does not include the M transient identifiers, and when the group quantity is greater than 1, the first group information of the M blocks further includes the M transient identifiers of the M blocks.

For another example, the group quantity in the first group information of the M blocks may alternatively be replaced with the group quantity identifier that indicates the group quantity. For example, when the group quantity identifier is 0, it indicates that the group quantity is 1, and when the group quantity identifier is 1, it indicates that the group quantity is 2.

403: Obtain M second transient identifiers of M blocks of the second sound channel based on spectrums of the M blocks of the second sound channel of the current frame, where the M blocks of the second sound channel include a second block of the second sound channel, and a second transient identifier of the second block indicates that the second block is a transient block or indicates that the second block is a non-transient block.

404: Obtain second group information of the M blocks of the second sound channel based on the M second transient identifiers.

Implementations of steps 403 and 404 are similar to the foregoing implementations of steps 401 and 402.

After obtaining the spectrums of the M blocks of the second sound channel of the current frame, the encoder side respectively obtains the M transient identifiers of the M blocks based on the spectrums of the M blocks. A spectrum of each block is used to determine a transient identifier of the block, each block corresponds to one transient identifier, and a transient identifier of one block indicates a spectrum change status of the block in the M blocks. For example, a block included in the M blocks is the second block, and the second block corresponds to one transient identifier. For another example, if the M blocks of the second sound channel include a third block, an index of the third block is different from an index of the second block.

405: When the first group information and the second group information meet a preset condition, obtain first adjusted group information and second adjusted group information based on the first group information and the second group information, where the first adjusted group information corresponds to the first group information, and the second adjusted group information corresponds to the second group information.

The first adjusted group information is the same as the first group information, and the second adjusted group information is obtained by adjusting the second group information; or the first adjusted group information is obtained by adjusting the first group information, and the second adjusted group information is the same as the second group information; or the first adjusted group information is obtained by adjusting the first group information, and the second adjusted group information is obtained by adjusting the second group information.

In some embodiments of the present disclosure, the first group information includes the first group quantity or the first group quantity identifier of the M blocks of the first sound channel, the first group quantity identifier indicates the first group quantity, and when the first group quantity is greater than 1, the first group information further includes the M first transient identifiers; or the first group information includes the M first transient identifiers; and/or the second group information includes a second group quantity or a second group quantity identifier of the M blocks of the second sound channel, the second group quantity identifier indicates the second group quantity, and when the second group quantity is greater than 1, the second group information further includes the M second transient identifiers; or the second group information includes the M second transient identifiers; and/or the first adjusted group information includes a first adjusted group quantity or a first adjusted group quantity identifier of the M blocks of the first sound channel, the first adjusted group quantity identifier indicates the first adjusted group quantity, when the first adjusted group quantity is greater than 1, the first adjusted group information further includes M first adjusted transient identifiers of the M blocks of the first sound channel, and a first adjusted transient identifier of the first block is different from or the same as the first transient identifier of the first block; or the first adjusted group information includes the M first adjusted transient identifiers; and/or the second adjusted group information includes a second adjusted group quantity or a second adjusted group quantity identifier of the M blocks of the second sound channel, the second adjusted group quantity identifier indicates the second adjusted group quantity, and when the second adjusted group quantity is greater than 1, the second adjusted group information further includes M second adjusted transient identifiers of the M blocks of the second sound channel, and a second adjusted transient identifier of the second block is different from the second transient identifier of the second block, or the second adjusted transient identifier of the second block is the same as the second transient identifier of the second block; or the second adjusted group information includes the M second adjusted transient identifiers.

Specifically, implementations of the first group information, the second group information, the first adjusted group information, and the second adjusted group information may be any one of the foregoing specific implementations of the group information. This is not limited herein.

It should be noted that the first adjusted group information and the first group information may be the same or different. For details, refer to the foregoing descriptions of the first adjusted group information and the first group information. The first group information includes the first group quantity or the first group quantity identifier of the M blocks of the first sound channel, the first adjusted group information includes the first adjusted group quantity or the first adjusted group quantity identifier of the M blocks of the first sound channel, and when the first group information is not adjusted, the first group quantity is the same as the first adjusted group quantity, and the first group quantity identifier is the same as the first adjusted group quantity identifier. When the first group information is adjusted, the first group quantity and the first adjusted group quantity may be the same or may be different. For example, the adjustment for the first group information does not change the group quantity, and the first group quantity and the first adjusted group quantity are the same. If the adjustment for the first group information changes the group quantity, the first group quantity is different from the first adjusted group quantity. For example, before the first group information is adjusted, the first group quantity is 2, and after the first group information is adjusted, the first adjusted group quantity is 1. When the first group information is adjusted, the first group quantity identifier and the first adjusted group quantity identifier may be the same or may be different. For example, before the first group information is adjusted, the first group quantity is 2, and the first group quantity identifier is 1. After the first group information is adjusted, if the first adjusted group quantity is 2, the first group quantity identifier is still 1. Similarly, the second adjusted group information and the second group information may be the same or different.

In an implementation, a quantity of transient blocks in the M blocks of the first sound channel indicated by the first adjusted group information is the same as a quantity of transient blocks in the M blocks of the second sound channel indicated by the second adjusted group information. In this case, locations (indices) of the transient blocks in the M blocks of the first sound channel indicated by the first adjusted group information may be the same as locations (indices) of the transient blocks in the M blocks of the second sound channel indicated by the second adjusted group information. Alternatively, the locations (indices) of the transient blocks in the M blocks of the first sound channel indicated by the first adjusted group information may be different from the locations (indices) of the transient blocks in the M blocks of the second sound channel indicated by the second adjusted group information.

In another implementation, a quantity of transient blocks in the M blocks of the first sound channel indicated by the first adjusted group information is the same as a quantity of transient blocks in the M blocks of the second sound channel indicated by the second adjusted group information. In addition, locations (indices) of the transient blocks in the M blocks of the first sound channel indicated by the first adjusted group information are also the same as locations (indices) of the transient blocks in the M blocks of the second sound channel indicated by the second adjusted group information.

The current frame includes the first sound channel and the second sound channel. If the group information of the two sound channels meets the preset condition, the group information needs to be adjusted. The preset condition needs to be determined based on a specific application scenario. This is not limited herein. Whether the first group information and the second group information meet the preset condition is determined, so that at least one of the first group information and the second group information may be adjusted, and the quantity of transient blocks of the first sound channel is the same as the quantity of transient blocks of the second sound channel, to facilitate a subsequent encoding operation.

When the first group information and the second group information meet the preset condition, the encoder side needs to adjust the at least one of the first group information and the second group information, to obtain the first adjusted group information and the second adjusted group information. For example, only the first group information is adjusted. In this case, the first adjusted group information is obtained by adjusting the first group information, and the second adjusted group information is the same as the second group information. For another example, only the second group information is adjusted. The first adjusted group information is the same as the first group information, and the second adjusted group information is obtained by adjusting the second group information. For another example, both the first group information and the second group information are adjusted. In this case, the first adjusted group information is obtained by adjusting the first group information, and the second adjusted group information is obtained by adjusting the second group information. The encoder side adjusts the at least one of the first group information and the second group information, so that the adjusted group information can be used for grouping and arranging, and a to-be-encoded spectrum can be obtained.

In some embodiments of the present disclosure, the preset condition includes that the first group information is inconsistent with the second group information.

That the first group information is inconsistent with the second group information means that the first group information is not completely consistent with the second group information. When the first group information is inconsistent with the second group information, it may be considered that the first group information and the second group information meet the preset condition. When the first group information is consistent with the second group information, it may be considered that the first group information and the second group information do not meet the preset condition. For example, the group quantity of the M blocks of the first group information is the same as the group quantity of the M blocks of the second group information, but the M first transient identifiers included in the first group information are different from the M second transient identifiers included in the second group information. For another example, the group quantity of the M blocks of the first group information is different from the group quantity of the M blocks of the second group information. The preset condition needs to be determined based on a specific application scenario, and is not limited herein. The foregoing preset condition may be set to determine whether to adjust the first group information and the second group information.

In some embodiments of the present disclosure, there are a plurality of implementations in which the first group information is inconsistent with the second group information. For example, that the first group information is inconsistent with the second group information includes: The M first transient identifiers indicate that the M blocks of the first sound channel include a transient block and a non-transient block, the M second transient identifiers indicate that the M blocks of the second sound channel include a transient block and a non-transient block, and the M first transient identifiers are inconsistent with the M second transient identifiers; or that the first group information is inconsistent with the second group information includes: The M first transient identifiers indicate that the M blocks of the first sound channel include a transient block and a non-transient block, the M second transient identifiers indicate that the M blocks of the second sound channel include a transient block and a non-transient block, and a quantity of transient blocks of the first sound channel is different from a quantity of transient blocks of the second sound channel; or that the first group information is inconsistent with the second group information includes: The M first transient identifiers indicate that the M blocks of the first sound channel include a transient block and a non-transient block, the M second transient identifiers indicate that the M blocks of the second sound channel include a transient block and a non-transient block, the M first transient identifiers are inconsistent with the M second transient identifiers, an $N^{th}$ block in the M blocks of the first sound channel and an $N^{th}$ block in the M blocks of the second sound channel are both in a transient state, and $0 \le N < M$.

In an implementation, some of the M blocks of the first sound channel are transient blocks, and some of the M blocks of the first sound channel are non-transient blocks. Similarly, the M blocks of the second sound channel include a transient block and a non-transient block. That the M first transient identifiers are inconsistent with the M second transient identifiers means that at least one transient identifier in the M first transient identifiers and a transient identifier in the M second transient identifiers have a same index but different values. For example, one block A in the M blocks of the first sound channel is a transient block, and one block B in the M blocks of the second sound channel is a transient block. If an index of the block A in the M blocks of the first sound channel is the same as an index of the block B in the M blocks of the second sound channel, a first transient identifier of the block A is consistent with a second transient identifier of the block B. For example, one block C in the M blocks of the first sound channel is a non-transient block, and one block D in the M blocks of the second sound channel is a transient block. If an index of the block C in the M blocks of the first sound channel is the same as an index of the block D in the M blocks of the second sound channel, a first transient identifier of the block C is inconsistent with a second transient identifier of the block D. In this embodiment of the present disclosure, when the M first transient identifiers are inconsistent with the M second transient identifiers, it may be determined that the first group information and the second group information meet the preset condition. In this case, the group information needs to be adjusted. When the M first transient identifiers are completely the same as the M second transient identifiers, it may be determined that the first group information and the second group information do not meet the preset condition. In this case, the group information is not adjusted.

In an implementation, some of the M blocks of the first sound channel are transient blocks, and some of the M blocks of the first sound channel are non-transient blocks. Therefore, the quantity of transient blocks included in the first sound channel may be obtained through statistics collection. Similarly, the M blocks of the second sound channel include a transient block and a non-transient block. Therefore, the quantity of transient blocks included in the second sound channel may be obtained through statistics collection. In this embodiment of the present disclosure, when the quantity of transient blocks of the first sound channel is different from the quantity of transient blocks of the second sound channel, it may be determined that the first group information and the second group information meet the preset condition. In this case, the group information needs to be adjusted. When the quantity of transient blocks of the first sound channel is the same as the quantity of transient blocks of the second sound channel, it may be determined that the first group information and the second group information do not meet the preset condition. In this case, the group information is not adjusted.

In an implementation, some of the M blocks of the first sound channel are transient blocks, and some of the M blocks of the first sound channel are non-transient blocks. Similarly, the M blocks of the second sound channel include a transient block and a non-transient block. That the M first transient identifiers are inconsistent with the M second transient identifiers means that at least one transient identifier in the M first transient identifiers and a transient identifier in the M second transient identifiers have a same index but different values. For example, one block A in the M blocks of the first sound channel is a transient block, and one block B in the M blocks of the second sound channel is a transient block. If an index of the block A in the M blocks of the first sound channel is the same as an index of the block B in the M blocks of the second sound channel, a first transient identifier of the block A is consistent with a second transient identifier of the block B. For example, one block C in the M blocks of the first sound channel is a non-transient block, and one block D in the M blocks of the second sound channel is a transient block. If an index of the block C in the M blocks of the first sound channel is the same as an index of the block D in the M blocks of the second sound channel, a first transient identifier of the block C is inconsistent with a second transient identifier of the block D. The $N^{th}$ block in the M blocks of the first sound channel and the $N^{th}$ block in the M blocks of the second sound channel are both in a transient state, $0 \le N < M$, and an index of the $N^{th}$ block of the first sound channel is the same as an index of the $N^{th}$ block of the second sound channel. A value of N and a quantity of values of N are not limited. For example, when the quantity of values of N is 1, it indicates that the first sound channel and the second sound channel have one transient block with a same index. For example, when the quantity of values of N is 2, it indicates that the first sound channel and the second sound channel have two transient blocks with a same index. In this embodiment of the present disclosure, when the M first transient identifiers are inconsistent with the M second transient identifiers, and the $N^{th}$ block in the M blocks of the first sound channel and the $N^{th}$ block in the M blocks of the second sound channel are both in the transient state, it may be determined that the first group information and the second group information meet the preset condition. In this case, the group information needs to be adjusted. When the M first transient identifiers are completely consistent with the M second transient identifiers, or the M first transient identifiers are inconsistent with the M second transient identifiers, and the first sound channel and the second sound channel do not have a transient block with a same index, it may be determined that the first group information and the second group information do not meet the preset condition. In this case, the group information is not adjusted.

Further, in some embodiments of the present disclosure, the M blocks of the first sound channel have respective indices, and the M blocks of the second sound channel have respective indices; when that the first group information is inconsistent with the second group information includes: the M first transient identifiers indicate that the M blocks of the first sound channel include a transient block and a non-transient block, the M second transient identifiers indicate that the M blocks of the second sound channel include a transient block and a non-transient block, and a quantity of transient blocks of the first sound channel is inconsistent with a quantity of transient blocks of the second sound channel, if an index of the transient block in the M blocks of the first sound channel and an index of the transient block in the M blocks of the second sound channel do not intersect, the step 405 of obtaining first adjusted group information and second adjusted group information based on the first group information and the second group information includes: when the quantity of transient blocks of the first sound channel is less than the quantity of transient blocks of the second sound channel, adjusting the first group information to obtain the first adjusted group information, where a quantity of transient blocks of the first sound channel indicated by the first adjusted group information is equal to a quantity of transient blocks of the second sound channel indicated by the second group information; or when the quantity of transient blocks of the first sound channel is greater than the quantity of transient blocks of the second sound channel, adjusting the second group information to obtain the second adjusted group information, where a quantity of transient blocks of the second sound channel indicated by the second adjusted group information is equal to a quantity of transient blocks of the first sound channel indicated by the first group information.

Specifically, the M blocks of the first sound channel respectively have indices. For example, the indices of the M blocks are from 0 to M−1. Similarly, the M blocks of the second sound channel respectively have indices. For example, the indices of the M blocks are from 0 to M−1. That an index of the transient block in the M blocks of the first sound channel and an index of the transient block in the M blocks of the second sound channel do not intersect means that the index of the transient block in the M blocks of the first sound channel and the index of the transient block in the M blocks of the second sound channel are completely different. For example, a transient identifier of a transient block is 0, and a transient identifier of a non-transient block is 1. For example, a value of M is 4. Transient identifiers of four blocks (indices 0-3) of the first sound channel are 1011 (respectively corresponding to the indices 0-3, to be specific, a value of a transient identifier of a block with an index 0 is 1, a value of a transient identifier of a block with an index 1 is 0, a value of a transient identifier of a block with an index 2 is 1, and a value of a transient identifier of a block with an index 3 is 1). Transient identifiers of four blocks (indices 0-3) of the second sound channel are 0110 (respectively corresponding to the indices 0-3, to be specific, a value of a transient identifier of a block with an index 0 is 0, a value of a transient identifier of a block with an index 1 is 1, a value of a transient identifier of a block with an index 2 is 1, and a value of a transient identifier of a block with an index 3 is 0). In this case, the first sound channel has one transient block, the second sound channel has two transient blocks, the index of the transient block of the first sound channel is 1, the indices of the two transient blocks of the second sound channel are 0 and 3, and the index of the transient block in the four blocks of the first sound channel and the indices of the transient blocks in the four blocks of the second sound channel do not intersect.

When the quantity of transient blocks of the first sound channel is inconsistent with the quantity of transient blocks of the second sound channel, and the index of the transient block in the M blocks of the first sound channel and the index of the transient block in the M blocks of the second sound channel do not intersect, the group information of the sound channel with a smaller quantity of transient blocks needs to be adjusted, and the group information of the sound channel with a larger quantity of transient blocks remains unchanged, and the quantities of transient blocks indicated by the adjusted group information of the two sound channels are the same. In this adjustment manner, the quantity of transient blocks of the first sound channel and the quantity of transient blocks of the second sound channel may be the same, to facilitate subsequent encoding of the spectrums of the first sound channel and the second sound channel. That the index of the transient block in the M blocks of the first sound channel and the index of the transient block in the M blocks of the second sound channel do not intersect means that transient identifiers of two blocks corresponding to a same index in the M blocks of the first sound channel and the M blocks of the second sound channel are different. To be specific, M is 4 is used as an example for description, a transient identifier of a block with an index 0 in the M blocks of the first sound channel is different from a transient identifier of a block with an index 0 in the M blocks of the second sound channel, a transient identifier of a block with an index 1 in the M blocks of the first sound channel is different from a transient identifier of a block with an index 1 in the M blocks of the second sound channel, a transient identifier of a block with an index 2 in the M blocks of the first sound channel is different from a transient identifier of a block with an index 2 in the M blocks of the second sound channel, and a transient identifier of a block with an index 3 in the M blocks of the first sound channel is also different from a transient identifier of a block with an index 3 in the M blocks of the second sound channel.

When the quantity of transient blocks of the first sound channel is less than the quantity of transient blocks of the second sound channel, the first group information is adjusted to obtain the first adjusted group information. Specifically, the adjustment of the first group information may include adjusting the first transient identifiers of the M blocks. For example, the first transient identifier of the first block in the M blocks is adjusted from a non-transient state to a transient state, so that the quantity of transient blocks of the first sound channel increases, and the quantity (namely, an adjusted quantity of transient blocks of the first sound channel) of transient blocks of the first sound channel in the first adjusted group information is equal to the quantity of transient blocks of the second sound channel indicated by the second group information.

When the quantity of transient blocks of the first sound channel is greater than the quantity of transient blocks of the second sound channel, the second group information is adjusted to obtain the second adjusted group information. Specifically, the adjustment of the second group information may include adjusting the second transient identifiers of the M blocks. For example, the second transient identifier of the second block in the M blocks is adjusted from a non-transient state to a transient state, so that the quantity of transient blocks of the second sound channel increases, and the quantity (namely, an adjusted quantity of transient blocks of the second sound channel) of transient blocks of the second sound channel in the second adjusted group information is equal to the quantity of transient blocks of the first sound channel indicated by the first group information.

Further, in some embodiments of the present disclosure, the M blocks of the first sound channel have respective indices, and the M blocks of the second sound channel have respective indices; when that the first group information is inconsistent with the second group information includes: the M first transient identifiers indicate that the M blocks of the first sound channel include a transient block and a non-transient block, the M second transient identifiers indicate that the M blocks of the second sound channel include a transient block and a non-transient block, and a quantity of transient blocks of the first sound channel is inconsistent with a quantity of transient blocks of the second sound channel, if an index of the transient block in the M blocks of the first sound channel and an index of the transient block in the M blocks of the second sound channel intersect, the step 405 of obtaining first adjusted group information and second adjusted group information based on the first group information and the second group information includes: when indices of transient blocks indicated by the M first transient identifiers are a part of indices of transient blocks indicated by the M second transient identifiers, adjusting at least one of the M first transient identifiers to obtain the M first adjusted transient identifiers, where the indices of all the transient blocks indicated by the M first adjusted transient identifiers are the same as the indices of all the transient blocks indicated by the M second transient identifiers; or when indices of transient blocks indicated by the M second transient identifiers are a part of indices of transient blocks indicated by the M first transient identifiers, adjusting at least one of the M second transient identifiers to obtain the M second adjusted transient identifiers, where the indices of all the transient blocks indicated by the M second adjusted transient identifiers are the same as the indices of all the transient blocks indicated by the M first transient identifiers; or when indices of transient blocks indicated by the M first transient identifiers are partially the same as indices of transient blocks indicated by the M second transient identifiers, adjusting at least one of the M first transient identifiers to obtain the M first adjusted transient identifiers, and adjusting at least one of the M second transient identifiers to obtain the M second adjusted transient identifiers, where the indices of all the transient blocks indicated by the M first adjusted transient identifiers are the same as the indices of all the transient blocks indicated by the M second adjusted transient identifiers.

Specifically, the M blocks of the first sound channel respectively have indices. For example, the indices of the M blocks are from 0 to M−1. Similarly, the M blocks of the second sound channel respectively have indices. For example, the indices of the M blocks are from 0 to M−1. That an index of the transient block in the M blocks of the first sound channel and an index of the transient block in the M blocks of the second sound channel intersect means that the index of the transient block in the M blocks of the first sound channel and the index of the transient block in the M blocks of the second sound channel are partially the same but not completely the same, for example, a transient identifier bit 0 of a transient block and a transient identifier bit 1 of a non-transient block. For example, if a value of M is 4, transient identifiers of four blocks of the first sound channel are 0011, and transient identifiers of four blocks of the second sound channel are 0111, the first sound channel has two transient blocks, and the second sound channel has one transient block, indices of the two transient blocks of the first sound channel are 0 and 1, an index of one transient block of the second sound channel is 0, and the index 0 of one transient block of the first sound channel is the same as the index 0 of one transient block of the second sound channel. That is, the index of the transient block in the four blocks of the first sound channel and the index of the transient block in the four blocks of the second sound channel intersect.

There are a plurality of implementations in which the index of the transient block in the M blocks of the first sound channel and the index of the transient block in the M blocks of the second sound channel intersect.

In an implementation, for example, the quantity of transient blocks of the first sound channel is less than the quantity of transient blocks of the second sound channel, that is, the indices of the transient blocks indicated by the M first transient identifiers are a part of the indices of the transient blocks indicated by the M second transient identifiers. In this case, the first transient identifiers of the M blocks of the first sound channel need to be adjusted, the second transient identifiers of the M blocks of the second sound channel remain unchanged, and the at least one of the M first transient identifiers is adjusted to obtain the M first adjusted transient identifiers. The indices of all the transient blocks indicated by the M first adjusted transient identifiers are the same as the indices of all the transient blocks indicated by the M second transient identifiers, and the adjusted quantities of transient blocks indicated by the group information of the two sound channels are the same. In this adjustment manner, the quantity of transient blocks of the first sound channel and the quantity of transient blocks of the second sound channel may be the same, to facilitate subsequent encoding of the spectrums of the first sound channel and the second sound channel.

In an implementation, for example, the quantity of transient blocks of the second sound channel is less than the quantity of transient blocks of the first sound channel, that is, the indices of the transient blocks indicated by the M second transient identifiers are a part of the indices of the transient blocks indicated by the M first transient identifiers. In this case, the second transient identifiers of the M blocks of the second sound channel need to be adjusted, the first transient identifiers of the M blocks of the first sound channel remain unchanged, and the at least one of the M second transient identifiers is adjusted to obtain the M second adjusted transient identifiers. The indices of all the transient blocks indicated by the M second adjusted transient identifiers are the same as the indices of all the transient blocks indicated by the M first transient identifiers, and the adjusted quantities of transient blocks indicated by the group information of the two sound channels are the same. In this adjustment manner, the quantity of transient blocks of the first sound channel and the quantity of transient blocks of the second sound channel may be the same, to facilitate subsequent encoding of the spectrums of the first sound channel and the second sound channel.

In an implementation, for example, the quantity of transient blocks of the second sound channel is not equal to the quantity of transient blocks of the first sound channel, but the indices of the transient blocks indicated by the M first transient identifiers are partially the same as the indices of the transient blocks indicated by the M second transient identifiers. The partial sameness herein means that indices of some transient blocks in the M blocks of the first sound channel are the same as indices of some transient blocks in the M blocks of the second sound channel, instead of the indices of all the transient blocks being completely the same. In this case, the first transient identifiers of the M blocks of the first sound channel need to be adjusted, and the second transient identifiers of the M blocks of the second sound channel need to be adjusted, that is, the transient identifiers of the M blocks of the two sound channels need to be adjusted. The at least one of the M first transient identifiers is adjusted to obtain the M first adjusted transient identifiers, and the at least one of the M second transient identifiers is adjusted to obtain the M second adjusted transient identifiers. The indices of all the transient blocks indicated by the M first adjusted transient identifiers are the same as the indices of all the transient blocks indicated by the M second adjusted transient identifiers. The quantities of transient blocks indicated by the adjusted group information of the two sound channels are the same. In this adjustment manner, the quantity of transient blocks of the first sound channel and the quantity of transient blocks of the second sound channel may be the same, to facilitate subsequent encoding of the spectrums of the first sound channel and the second sound channel.

The following describes an adjustment manner of a transient identifier in this embodiment of the present disclosure. For example, the adjusting at least one of the M first transient identifiers to obtain the M first adjusted transient identifiers includes: when the first transient identifier of the first block indicates that the first block is a non-transient block, if a second transient identifier of a third block in the M blocks of the second sound channel indicates that the third block is a transient block, adjusting the first transient identifier of the first block to the first adjusted transient identifier of the first block, where the first adjusted transient identifier of the first block indicates that the first block is a transient block, and an index of the first block is the same as an index of the third block; or the adjusting at least one of the M second transient identifiers to obtain the M second adjusted transient identifiers includes: when the second transient identifier of the second block indicates that the second block is a non-transient block, if a first transient identifier of a fourth block in the M blocks of the first sound channel indicates that the fourth block is a transient block, adjusting the second transient identifier of the second block to the second adjusted transient identifier of the second block, where the second adjusted transient identifier of the second block indicates that the second block is a transient block, and an index of the second block is the same as an index of the fourth block.

Adjustment of the M first transient identifiers is similar to adjustment of the M second transient identifiers. Then, the adjustment of the first transient identifier is used as an example for description. When the first transient identifier of the first block indicates that the first block is a non-transient block, if the second transient identifier of the third block in the M blocks of the second sound channel indicates that the third block is a transient block, the first transient identifier of the first block is adjusted to the first adjusted transient identifier of the first block, where the first adjusted transient identifier of the first block indicates that the first block is a transient block, and the index of the first block is the same as the index of the third block. For example, the first transient identifier of the first block is 1, the second transient identifier of the third block is 0, and both the index of the first block and the index of the third block are 4. In this case, the first adjusted transient identifier of the first block is 0. In this adjustment manner, the quantity of transient blocks of the first sound channel and the quantity of transient blocks of the second sound channel may be the same, to facilitate subsequent encoding of the spectrums of the first sound channel and the second sound channel.

In some embodiments of the present disclosure, the method performed by the encoder side further includes:

A1: Encode the first adjusted group information and the second adjusted group information, to obtain a group information encoding result.

A2: Write the group information encoding result into the bitstream.

After obtaining the first adjusted group information and the second adjusted group information, the encoder side encodes the first adjusted group information and the second adjusted group information to obtain the group information encoding result. An encoding scheme used for the adjusted group information is not limited herein. The adjusted group information may be encoded to obtain the group information encoding result, and the group information encoding result may be written into the bitstream, so that the bitstream may carry the group information encoding result, and a decoder side parses the bitstream to obtain the group information encoding result, and performs parsing to obtain the first adjusted group information and the second adjusted group information.

It should be noted that there is no sequence between step A2 and subsequent step 409. Step 409 may be performed before step A2, or step A2 may be performed before step 409, or step A2 and step 409 may be performed simultaneously. This is not limited herein.

406: Obtain a first to-be-encoded spectrum based on the first adjusted group information and the spectrums of the M blocks of the first sound channel.

The first to-be-encoded spectrum is a first to-be-encoded spectrum of the first sound channel of the current frame, and the first to-be-encoded spectrum may also be referred to as grouped and arranged spectrums of the M blocks of the first sound channel.

That the encoder side obtains the first adjusted group information is used as an example. After obtaining the first adjusted group information of the M blocks, the encoder side may process the spectrums of the M blocks of the current frame based on the first adjusted group information of the M blocks. The first adjusted group information may be used to adjust an arrangement order of the spectrums of the M blocks in the current frame, and the first to-be-encoded spectrum may be generated based on the first adjusted group information.

In some embodiments of the present disclosure, when the first adjusted group quantity is greater than 1 or the M first adjusted transient identifiers indicate that the M blocks of the first sound channel include a transient block and a non-transient block, the obtaining a first to-be-encoded spectrum based on the first adjusted group information and the spectrums of the M blocks of the first sound channel includes: grouping and arranging the spectrums of the M blocks of the first sound channel based on the first adjusted group information, to obtain the first to-be-encoded spectrum.

That the encoder side obtains the first adjusted group information is used as an example. After obtaining the first adjusted group information of the M blocks, the encoder side may group and arrange the spectrums of the M blocks of the current frame based on the first adjusted group information of the M blocks. The spectrums of the M blocks are grouped and arranged, so that an arrangement order of the spectrums of the M blocks in the current frame can be adjusted. The foregoing grouping and arranging are performed based on the first adjusted group information of the M blocks. The first adjusted group information of the M blocks is obtained based on the M transient identifiers of the M blocks. After the foregoing grouping and arranging of the M blocks, grouped and arranged spectrums of the M blocks are obtained. The grouped and arranged spectrums of the M blocks are grouped and arranged based on the M transient identifiers of the M blocks, and an encoding order of the spectrums of the M blocks may be changed through grouping and arranging. It should be noted that the M blocks of the current frame may be the M blocks of the first sound channel of the current frame.

407: Obtain a second to-be-encoded spectrum based on the second adjusted group information and the spectrums of the M blocks of the second sound channel.

The second to-be-encoded spectrum is a second to-be-encoded spectrum of the second sound channel of the current frame, and the second to-be-encoded spectrum may also be referred to as grouped and arranged spectrums of the M blocks of the second sound channel.

In some embodiments of the present disclosure, when the second adjusted group quantity is greater than 1 or the M second adjusted transient identifiers indicate that the M blocks of the second sound channel include a transient block and a non-transient block, the obtaining a second to-be-encoded spectrum based on the second adjusted group information and the spectrums of the M blocks of the second sound channel includes: grouping and arranging the spectrums of the M blocks of the second sound channel based on the second adjusted group information, to obtain the second to-be-encoded spectrum.

In some embodiments of the present disclosure, the grouping and arranging the spectrums of the M blocks of the first sound channel based on the first adjusted group information, to obtain the first to-be-encoded spectrum includes the following steps.

B1: Allocate spectrums of blocks that are indicated as transient blocks by the first adjusted transient identifiers of the M blocks and that are in the M blocks of the first sound channel to a first transient group, allocate spectrums of blocks that are indicated as non-transient blocks by the first adjusted transient identifiers of the M blocks and that are in the M blocks of the first sound channel to a first non-transient group, and arrange the spectrums of the blocks in the first transient group before the spectrums of the blocks in the first non-transient group, to obtain the first to-be-encoded spectrum.

After obtaining the first adjusted group information of the M blocks, the encoder side groups the M blocks based on the different transient identifiers, to obtain a transient group and a non-transient group, and then arranges locations of the spectrums of the M blocks in the current frame to arrange spectrums of blocks in the transient group before spectrums of blocks in the non-transient group, to obtain the to-be-encoded spectrum. That is, the spectrums of all the transient blocks in the to-be-encoded spectrum are located before the spectrums of the non-transient blocks, so that the spectrums of the transient blocks can be adjusted to a location of higher encoding importance, so that a transient feature of an audio signal reconstructed through encoding and decoding by using a neural network can be better retained. The M blocks of the current frame may be the M blocks of the first sound channel of the current frame.

Alternatively, the grouping and arranging the spectrums of the M blocks of the second sound channel based on the second adjusted group information, to obtain the second to-be-encoded spectrum includes:

B2: Allocate spectrums of blocks that are indicated as transient blocks by the second adjusted transient identifiers of the M blocks and that are in the M blocks of the second sound channel to a second transient group, allocate spectrums of blocks that are indicated as non-transient blocks by the second adjusted transient identifiers of the M blocks and that are in the M blocks of the second sound channel to a second non-transient group, and arrange the spectrums of the blocks in the second transient group before the spectrums of the blocks in the second non-transient group, to obtain the second to-be-encoded spectrum.

In some embodiments of the present disclosure, the grouping and arranging the spectrums of the M blocks of the first sound channel based on the first adjusted group information, to obtain the first to-be-encoded spectrum includes the following step.

C1: Arrange spectrums of blocks that are indicated as transient blocks by the first adjusted transient identifiers of the M blocks and that are in the M blocks of the first sound channel before spectrums of blocks that are indicated as non-transient blocks by the first adjusted transient identifiers of the M blocks and that are in the M blocks of the first sound channel, to obtain the first to-be-encoded spectrum.

After obtaining the first adjusted group information of the M blocks, the encoder side determines a transient identifier of each of the M blocks based on the first adjusted group information, and first finds P transient blocks and Q non-transient blocks from the M blocks. In this case, M=P+Q. The spectrums of the blocks that are indicated as transient blocks by the M first adjusted transient identifiers and that are in the M blocks are arranged before the spectrums of the blocks that are indicated as non-transient blocks by the M transient identifiers and that are in the M blocks, to obtain the to-be-encoded spectrum. That is, the spectrums of all the transient blocks in the to-be-encoded spectrum are located before the spectrums of the non-transient blocks, so that the spectrums of the transient blocks can be adjusted to a location of higher encoding importance, so that a transient feature of an audio signal reconstructed through encoding and decoding by using a neural network can be better retained. The M blocks of the current frame may be the M blocks of the first sound channel of the current frame.

Alternatively, the grouping and arranging the spectrums of the M blocks of the second sound channel based on the second adjusted group information, to obtain the second to-be-encoded spectrum includes: arranging spectrums of blocks that are indicated as transient blocks by the second adjusted transient identifiers of the M blocks and that are in the M blocks of the second sound channel before spectrums of blocks that are indicated as non-transient blocks by the second adjusted transient identifiers of the M blocks and that are in the M blocks of the second sound channel, to obtain the second to-be-encoded spectrum.

408: Encode the first to-be-encoded spectrum and the second to-be-encoded spectrum by using an encoding neural network, to obtain a spectrum encoding result.

409: Write the spectrum encoding result into the bitstream.

In this embodiment of the present disclosure, after obtaining the first to-be-encoded spectrum and the second to-be-encoded spectrum, the encoder side may perform encoding by using the encoding neural network, to generate the spectrum encoding result, and then write the spectrum encoding result into the bitstream. The encoder side may send the bitstream to the decoder side.

In an implementable, the encoder side uses the to-be-encoded spectrum as input data of the encoding neural network, or may perform other processing on the to-be-encoded spectrum for input data of the encoding neural network. After processing by using the encoding neural network, latent variables may be generated. The latent variables represent features of the grouped and arranged spectrums of the M blocks.

In some embodiments of the present disclosure, before the step 408 of encoding the first to-be-encoded spectrum and the second to-be-encoded spectrum by using an encoding neural network, the method performed by the encoder side further includes the following steps.

D1: Perform intra-group interleaving on the first to-be-encoded spectrum, to obtain a first intra-group interleaved spectrum.

D2: Perform intra-group interleaving on the second to-be-encoded spectrum, to obtain a second intra-group interleaved spectrum.

In this implementation scenario, the step 408 of encoding the first to-be-encoded spectrum and the second to-be-encoded spectrum by using an encoding neural network includes the following step.

E1: Encode, by using the encoding neural network, the first intra-group interleaved spectrum and the second intra-group interleaved spectrum.

After obtaining the to-be-encoded spectrum (for example, the first to-be-encoded spectrum and the second to-be-encoded spectrum), the encoder side may first perform intra-group interleaving based on groups of the M blocks of each sound channel, to obtain the intra-group interleaved spectrums of the M blocks. In this case, the intra-group interleaved spectrums of the M blocks may be input data of the encoded neural network. The M blocks of the current frame may be the M blocks of the first sound channel of the current frame. Through intra-group interleaving, encoding side information can be further reduced, and encoding efficiency can be improved.

In some embodiments of the present disclosure, the quantity of the blocks that are indicated as transient blocks by the M first transient identifiers and that are in the M blocks of the first sound channel is P, the quantity of the blocks that are indicated as non-transient blocks by the M first transient identifiers and that are in the M blocks of the first sound channel is Q, and M=P+Q. Values of P and Q are not limited in embodiments of the present disclosure.

Specifically, the step D1 of performing intra-group interleaving on the first to-be-encoded spectrum includes the following steps.

D11: Perform interleaving on the spectrums of the P blocks, to obtain interleaved spectrums of the P blocks.

D12: Perform interleaving on the spectrums of the Q blocks, to obtain interleaved spectrums of the Q blocks.

The performing interleaving on the spectrums of the P blocks includes performing interleaving on the spectrums of the P blocks as a whole. Similarly, the performing interleaving on the spectrums of the Q blocks includes performing interleaving on the spectrums of the Q blocks as a whole.

It should be noted that if the adjusted group quantity of the M blocks of the first sound channel is 1, intra-group interleaving needs to be performed on the spectrums of the M blocks of the first sound channel, to obtain the intra-group interleaved spectrums of the M blocks of the first sound channel.

If the steps D11 and D12 are performed, the step E1 of encoding, by using the encoding neural network, the first intra-group interleaved spectrum and the second intra-group interleaved spectrum includes:

The interleaved spectrums of the P blocks and the interleaved spectrums of the Q blocks are encoded by using the encoding neural network.

In D11 and D12, the encoder side may separately perform interleaving based on a transient group and a non-transient group, to obtain the interleaved spectrums of the P blocks and the interleaved spectrums of the Q blocks. The interleaved spectrums of the P blocks and the interleaved spectrums of the Q blocks may be used as input data of the encoding neural network. Through intra-group interleaving, encoding side information can be further reduced, and encoding efficiency can be improved.

In some embodiments of the present disclosure, before the step 401 of obtaining M first transient identifiers of M blocks of a first sound channel of a current frame of a to-be-encoded multi-channel signal based on spectrums of the M blocks of the first sound channel, the method performed by the encoder side further includes the following steps.

F1: Obtain a first window type of the first sound channel, where the first window type is a short window type or a non-short window type.

F2: Obtain a second window type of the second sound channel, where the second window type is a short window type or a non-short window type.

F3: Only when both the first window type and the second window type are short window types, perform the step of obtaining M first transient identifiers of M blocks of a first sound channel of a current frame of a to-be-encoded multi-channel signal based on spectrums of the M blocks of the first sound channel.

Before the encoder side performs 401, the encoder side may first determine a window type of the current frame, where the window type may be a short window type or a non-short window type. For example, the encoder side determines the window type based on the current frame of the to-be-encoded multi-channel signal. A short window may also be referred to as a short frame, and a non-short window may also be referred to as a non-short frame. When the window type is a short window type, the foregoing step 401 is triggered to be performed. In this embodiment of the present disclosure, when the window type of the current frame is a short window type, the foregoing encoding solution is executed, to implement encoding of the multi-channel signal as a transient signal.

In some embodiments of the present disclosure, if the encoder side performs the foregoing steps F1 to F3, the method performed by the encoder side further includes the following steps.

G1: Encode the first window type and the second window type to obtain a window type encoding result.

G2: Write the window type encoding result into the bitstream.

After obtaining the first window type of the first sound channel and the second window type of the second sound channel of the current frame, the encoder side may include the window type in the bitstream, and first encode the window type. An encoding scheme used for the window type is not limited herein. The window type may be encoded to obtain the window type encoding result. The window type encoding result may be written into the bitstream, so that the bitstream may carry the window type encoding result. In this way, the decoder side may obtain the window type encoding result by using the bitstream, and parse the window type encoding result to obtain the first window type of the first sound channel and the second window type of the second sound channel of the current frame; and determine, based on the first window type of the first sound channel and the second window type of the second sound channel, whether to continue decoding the bitstream, to obtain first decoded group information of the M blocks of the first sound channel.

In some embodiments of the present disclosure, the step 401 of obtaining M first transient identifiers of M blocks of a first sound channel of a current frame of a to-be-encoded multi-channel signal based on spectrums of the M blocks of the first sound channel includes the following steps.

H1: Obtain M first spectral energy values of the M blocks of the first sound channel based on the spectrums of the M blocks of the first sound channel.

H2: Obtain a first average spectral energy value of the M blocks of the first sound channel based on the M first spectral energy values.

H3: Obtain the M first transient identifiers based on the M first spectral energy values and the first average spectral energy value.

After obtaining the M spectral energy values, the encoder side may average the M spectral energy values to obtain the average spectral energy value, or remove a largest value or largest values from the M spectral energy values and then perform averaging to obtain the average spectral energy value. A spectral energy value of each block in the M spectral energy values is compared with the average spectral energy value, to determine a change status of a spectrum of each block compared with spectrums of other blocks in the M blocks, and further obtain the M transient identifiers of the M blocks, where a transient identifier of a block may indicate a transient feature of the block. The M blocks of the current frame may be the M blocks of the first sound channel of the current frame. In this embodiment of the present disclosure, the transient identifier of each block may be determined based on the spectral energy of each block and the average spectral energy value, so that the transient identifier of one block can determine group information of the block.

Further, in some embodiments of the present disclosure, when a first spectral energy value of the first block is greater than K times the first average spectral energy value, the first transient identifier of the first block indicates that the first block is a transient block; or when a first spectral energy value of the first block is less than or equal to K times the first average spectral energy value, the transient identifier of the first block indicates that the first block is a non-transient block.

K is a real number greater than or equal to 1.

There are multiple values of K. This is not limited herein. A process of determining the transient identifier of the first block in the M blocks is used as an example. When the spectral energy value of the first block is greater than K times the average spectral energy value, it indicates that the spectrum of the first block excessively changes compared with other blocks in the M blocks. In this case, the transient identifier of the first block indicates that the first block is a transient block. When the spectral energy value of the first block is less than or equal to K times the average spectral energy value, it indicates that the spectrum of the first block does not change greatly compared with other blocks in the M blocks, and the transient identifier of the first block indicates that the first block is a non-transient block. The M blocks of the current frame may be the M blocks of the first sound channel of the current frame.

The following is not limited: The encoder side may alternatively obtain the M transient identifiers of the M blocks in another manner. For example, a difference or a ratio of the spectral energy value of the first block to the average spectral energy value is obtained, and the M transient identifiers of the M blocks are determined based on the obtained difference or ratio.

It can be learned from the example descriptions of the encoder side in the foregoing embodiments that the current frame of the to-be-encoded multi-channel signal includes the first sound channel and the second sound channel. Each sound channel includes the spectrums of the M blocks. The M first transient identifiers of the M blocks of the first sound channel are obtained based on the spectrums of the M blocks of the first sound channel of the current frame of the to-be-encoded multi-channel signal, and the first group information of the M blocks of the first sound channel is obtained based on the M first transient identifiers. Similarly, the second group information of the M blocks of the second sound channel may be obtained. When the first group information and the second group information meet the preset condition, the first adjusted group information and the second adjusted group information are obtained based on the first group information and the second group information. Then, the first to-be-encoded spectrum is obtained based on the first adjusted group information and the spectrums of the M blocks of the first sound channel. Similarly, the second to-be-encoded spectrum may be obtained. Finally, the first to-be-encoded spectrum and the second to-be-encoded spectrum are encoded by using the encoding neural network, to obtain the spectrum encoding result. The spectrum encoding result may be carried by the bitstream. Therefore, in this embodiment of the present disclosure, the group information of the M blocks of each sound channel is obtained based on the M transient identifiers of each sound channel of the current frame, the adjusted group information of the M blocks of each sound channel is obtained when the group information of the M blocks of each sound channel meets the preset condition, and the to-be-encoded spectrum is obtained based on the adjusted group information of the M blocks of each sound channel and the spectrums of the M blocks of each sound channel. Therefore, blocks with different transient identifiers can be grouped, adjusted, and encoded. This improves encoding quality of the multi-channel signal.

Figure 5:
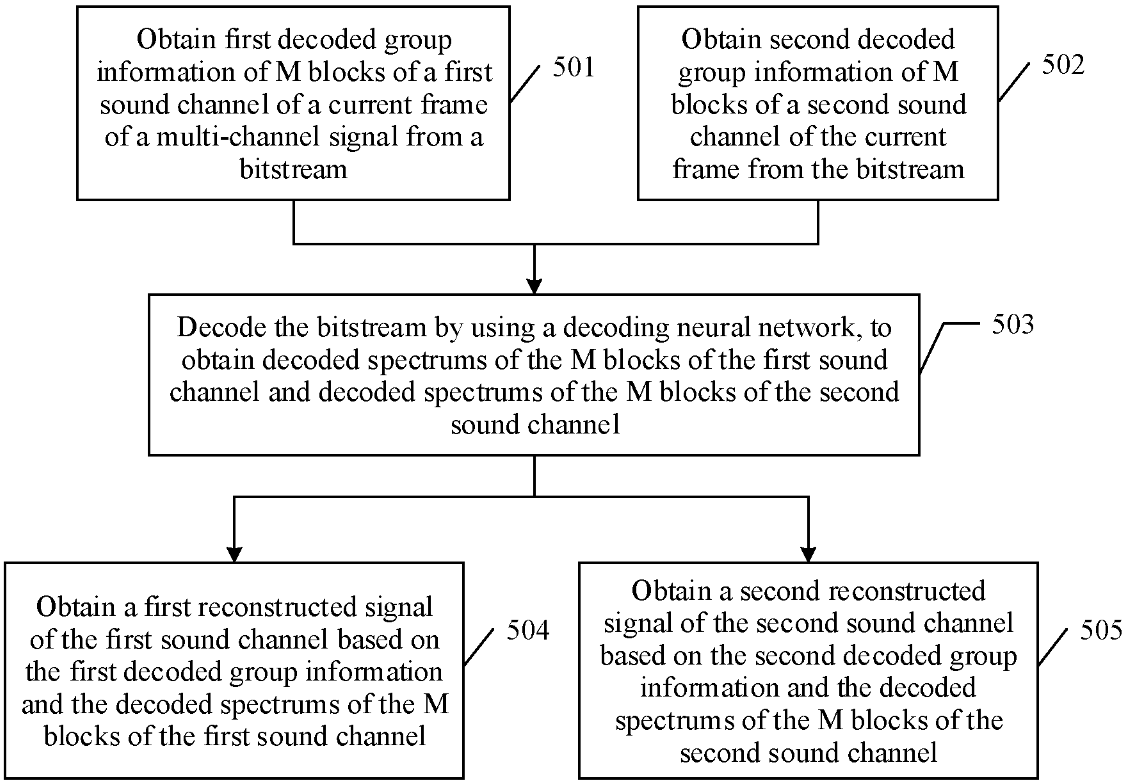
FIG. 5 is a schematic diagram of a multi-channel signal decoding method according to an embodiment of the present disclosure.

An embodiment of the present disclosure further provides a multi-channel signal decoding method. The method may be performed by a terminal device. For example, the terminal device may be a multi-channel signal decoding apparatus (briefly referred to as a decoder side or a decoder below, for example, the decoder side may be an A1 decoder). As shown in FIG. 5, the method performed by the decoder side in this embodiment of the present disclosure mainly includes the following steps.

501: Obtain first decoded group information of M blocks of a first sound channel of a current frame of a multi-channel signal from a bitstream, where the first decoded group information indicates first decoded transient identifiers of the M blocks of the first sound channel.

The decoder side receives the bitstream sent by an encoder side, where the encoder side includes a group information encoding result in the bitstream, and the decoder side parses the bitstream to obtain the first decoded group information of the M blocks of the current frame of the audio signal. The decoder side may determine the M first decoded transient identifiers of the M blocks based on the first decoded group information of the M blocks. For example, the first decoded group information may include a group quantity and group indicator information. For another example, the group information may include group indicator information. For details, refer to the descriptions of the foregoing embodiments of the encoder side.

It should be noted that the first decoded group information is group information obtained by the decoder side by decoding the bitstream. For example, the encoder side includes first adjusted group information in the bitstream, and the first decoded group information obtained by the decoder side corresponds to the foregoing first adjusted group information. The first decoded group information indicates first decoded transient identifiers of the M blocks of the first sound channel, and the first decoded transient identifiers correspond to a first transient identifier or a first adjusted transient identifier of the encoder side. Similarly, second decoded group information obtained in a subsequent step corresponds to the foregoing second adjusted group information, and second decoded transient identifiers corresponds to a second transient identifier or a second adjusted transient identifier of the encoder side.

502: Obtain the second decoded group information of M blocks of a second sound channel of the current frame from the bitstream, where the second decoded group information indicates the second decoded transient identifiers of the M blocks of the second sound channel.

503: Decode the bitstream by using a decoding neural network, to obtain decoded spectrums of the M blocks of the first sound channel and decoded spectrums of the M blocks of the second sound channel.

After obtaining the bitstream, the decoder side decodes the bitstream by using the decoding neural network, to obtain the decoded spectrums of the M blocks of the first sound channel and the decoded spectrums of the M blocks of the second sound channel. The encoder side performs encoding after performing grouping and arranging on the decoded spectrums of the M blocks of the first sound channel and the decoded spectrums of the M blocks of the second sound channel, and the encoder side includes a spectrum encoding result in the bitstream. The decoded spectrums of the M blocks of the first sound channel and the decoded spectrums of the M blocks of the second sound channel correspond to grouped and arranged spectrums of the M blocks of the first sound channel and grouped and arranged spectrums of the M blocks of the second sound channel of the encoder side. An execution process of the decoding neural network at the decoder side is inverse to that of the encoding neural network at the encoder side. Through decoding, the decoded spectrums of the M blocks of the first sound channel and the decoded spectrums of the M blocks of the second sound channel may be obtained.

504: Obtain a first reconstructed signal of the first sound channel based on the first decoded group information and the decoded spectrums of the M blocks of the first sound channel.

The first decoded spectrums of the M blocks of the first sound channel correspond to the grouped and arranged spectrums of the M blocks of the first sound channel of the encoder side. Therefore, the first reconstructed signal of the first sound channel may be obtained based on the first decoded group information. During signal reconstruction, decoding and reconstruction may be performed based on blocks with different transient identifiers in the multi-channel signal, so that reconstruction effect of the multi-channel signal can be improved.

505: Obtain a second reconstructed signal of the second sound channel based on the second decoded group information and the decoded spectrums of the M blocks of the second sound channel.

The second decoded spectrums of the M blocks of the second sound channel correspond to the grouped and arranged spectrums of the M blocks of the second sound channel of the encoder side. Therefore, the second reconstructed signal of the second sound channel may be obtained based on the second decoded group information. During signal reconstruction, decoding and reconstruction may be performed based on blocks with different transient identifiers in the multi-channel signal, so that reconstruction effect of the multi-channel signal can be improved.

In some embodiments of the present disclosure, the obtaining a first reconstructed signal of the first sound channel based on the first decoded group information and the decoded spectrums of the M blocks of the first sound channel includes: when the first decoded group information indicates that a first decoded group quantity of the M blocks of the first sound channel is greater than 1, performing inverse grouping and arranging on the decoded spectrums of the M blocks of the first sound channel, to obtain inversely grouped and arranged spectrums of the M blocks of the first sound channel; and obtaining the first reconstructed signal of the first sound channel based on the inversely grouped and arranged spectrums of the M blocks of the first sound channel.

The obtaining a second reconstructed signal of the second sound channel based on the second decoded group information and the decoded spectrums of the M blocks of the second sound channel includes: when the second decoded group information indicates that a second decoded group quantity of the M blocks of the second sound channel is greater than 1, performing inverse grouping and arranging on the decoded spectrums of the M blocks of the second sound channel, to obtain inversely grouped and arranged spectrums of the M blocks of the second sound channel; and obtaining the second reconstructed signal of the second sound channel based on the inversely grouped and arranged spectrums of the M blocks of the second sound channel.

The signal reconstruction process of the first sound channel is used as an example. The decoder side obtains the first decoded group information of the M blocks, and the decoder side further obtains the decoded spectrums of the M blocks of the first sound channel by using the bitstream. Because the encoder side performs grouping and arranging on the decoded spectrums of the M blocks of the first sound channel, the decoder side needs to perform a process inverse to that of the encoder side. Therefore, inverse grouping and arranging is performed on the decoded spectrums of the M blocks of the first sound channel based on the first decoded group information of the M blocks, to obtain inversely grouped and arranged spectrums of the M blocks of the first sound channel, where inverse grouping and arranging is inverse to grouping and arranging of the encoder side.

After obtaining the inversely grouped and arranged spectrums of the M blocks of the first sound channel, the encoder side may perform frequency-time transformation on the inversely grouped and arranged spectrums of the M blocks of the first sound channel, to obtain the first reconstructed signal of the first sound channel.

An implementation of the decoding process of the second sound channel is similar to the foregoing decoding process of the first sound channel.

In some embodiments of the present disclosure, the step 504 of obtaining a first reconstructed signal of the first sound channel based on the first decoded group information and the decoded spectrums of the M blocks of the first sound channel includes the following steps.

I1: Perform intra-group de-interleaving on the decoded spectrums of the M blocks of the first sound channel, to obtain intra-group de-interleaved spectrums of the M blocks of the first sound channel.

J1: Obtain the first reconstructed signal based on the intra-group de-interleaved spectrums of the M blocks of the first sound channel.

Intra-group de-interleaving performed by the decoder side is an inverse process of intra-group interleaving performed by the encoder side.

The step 505 of obtaining a second reconstructed signal of the second sound channel based on the second decoded group information and the decoded spectrums of the M blocks of the second sound channel includes: performing intra-group de-interleaving on the decoded spectrums of the M blocks of the second sound channel, to obtain intra-group de-interleaved spectrums of the M blocks of the second sound channel; and obtaining the second reconstructed signal based on the intra-group de-interleaved spectrums of the M blocks of the second sound channel.

In some embodiments of the present disclosure, a quantity of blocks that are indicated as transient blocks by the M first decoded transient identifiers and that are in the M blocks of the first sound channel is P, a quantity of blocks that are indicated as non-transient blocks by the M first decoded transient identifiers and that are in the M blocks of the first sound channel is Q, and M=P+Q.

The obtaining a first reconstructed signal of the first sound channel based on the first decoded group information and the decoded spectrums of the M blocks of the first sound channel includes: performing intra-group de-interleaving on decoded spectrums of the P blocks of the first sound channel, and performing intra-group de-interleaving on decoded spectrums of the Q blocks of the first sound channel, to obtain intra-group de-interleaved spectrums of the M blocks of the first sound channel; performing inverse grouping and arranging on the intra-group de-interleaved spectrums of the M blocks of the first sound channel based on the first decoded group information, to obtain inversely grouped and arranged spectrums of the M blocks of the first sound channel; and obtaining the first reconstructed signal of the first sound channel based on the inversely grouped and arranged spectrums of the M blocks of the first sound channel.

The performing de-interleaving on the spectrums of the P blocks includes performing de-interleaving on the spectrums of the P blocks as a whole. Similarly, the performing de-interleaving on the spectrums of the Q blocks includes performing de-interleaving on the spectrums of the Q blocks as a whole.

The encoder side may separately perform interleaving based on a transient group and a non-transient group, to obtain interleaved spectrums of the P blocks and interleaved spectrums of the Q blocks. The interleaved spectrums of the P blocks and the interleaved spectrums of the Q blocks may be used as input data of the encoding neural network. Through intra-group interleaving, encoding side information can be further reduced, and encoding efficiency can be improved. Because the encoder side performs intra-group interleaving, the decoder side needs to perform a corresponding inverse process, that is, the decoder side may perform de-interleaving.

It should be noted that if the adjusted group quantity of the M blocks of the first sound channel is 1, intra-group de-interleaving needs to be performed on the decoded spectrums of the M blocks of the first sound channel, to obtain the intra-group de-interleaved spectrums of the M blocks of the first sound channel.

In some embodiments of the present disclosure, a quantity of blocks that are indicated as transient blocks by the M first decoded transient identifiers and that are in the M blocks of the first sound channel is P, a quantity of blocks that are indicated as non-transient blocks by the M first decoded transient identifiers and that are in the M blocks of the first sound channel is Q, and M=P+Q.

The performing inverse grouping and arranging on the decoded spectrums of the M blocks of the first sound channel based on the first decoded group information includes the following steps.

K1: Obtain indices of the P blocks of the first sound channel based on the first decoded group information.

K2: Obtain indices of the Q blocks of the first sound channel based on the first decoded group information.

K3: Perform inverse grouping and arranging on the decoded spectrums of the M blocks of the first sound channel based on the indices of the P blocks and the indices of the Q blocks.

Before the encoder side performs grouping and arranging on the spectrums of the M blocks, indices of the M blocks are consecutive, for example, from 0 to M−1. After the encoder side performs grouping and arranging, the indices of the M blocks are no longer consecutive. The decoder side may obtain reconstructed, grouped, and arranged indices of the P blocks in the M blocks and reconstructed, grouped, and arranged indices of the Q blocks in the M blocks based on the first decoded group information of the M blocks. Through inverse grouping and arranging, restored indices of the M blocks are still consecutive.

In some embodiments of the present disclosure, the method performed by the decoder side further includes the following steps.

L1: Obtain a window type of the first sound channel of the current frame from the bitstream.

L2: Obtain a window type of the second sound channel of the current frame from the bitstream.

L3: Only when both the first window type and the second window type are short window types, perform the step of obtaining first decoded group information of M blocks of a first sound channel of a current frame of a multi-channel signal from a bitstream.

In embodiments of the present disclosure, only when both the first window type and the second window type of the current frame are short window types, the foregoing encoding solution may be executed, to implement encoding of the multi-channel signal as a transient signal. The decoder side executes a process inverse to that of the encoder side. Therefore, the decoder side may alternatively first determine the first window type and the second window type of the current frame, where the window type may be a short window type or a non-short window type. For example, the decoder side obtains the window type of the current frame from the bitstream. If the current frame includes the first sound channel and the second sound channel, the first window type of the first sound channel and the second window type of the second sound channel may be obtained. A short window may also be referred to as a short frame, and a non-short window may also be referred to as a non-short frame. When the window type is a short window type, the foregoing step 501 is triggered to be performed.

In some embodiments of the present disclosure, the first decoded group information includes a first decoded group quantity or a first decoded group quantity identifier of the M blocks of the first sound channel, the first decoded group quantity identifier indicates the first decoded group quantity, and when the first decoded group quantity is greater than 1, the first decoded group information further includes the M first decoded transient identifiers; or the first decoded group information includes the M first decoded transient identifiers; and/or the second decoded group information includes a second decoded group quantity or a second decoded group quantity identifier of the M blocks of the second sound channel, the second decoded group quantity identifier indicates the second decoded group quantity, and when the second decoded group quantity is greater than 1, the second decoded group information further includes the M second decoded transient identifiers; or the second decoded group information includes the M second decoded transient identifiers.

The encoder side includes a group information encoding result in the bitstream, where the group information encoding result includes first adjusted group information and second adjusted group information. The decoder side may decode the bitstream to obtain the first decoded group information and the second decoded group information. The first decoded group information corresponds to the first adjusted group information of the encoder side, and the second decoded group information corresponds to the second adjusted group information of the encoder side. For example, the first decoded group information includes the first decoded group quantity or the first decoded group quantity identifier of the M blocks of the first sound channel, the first decoded group quantity indicates the group quantity or the adjusted group quantity of the first sound channel, and the first decoded group quantity identifier indicates the group quantity or the adjusted group quantity of the first sound channel. The M first decoded transient identifiers indicate transient identifiers or adjusted transient identifiers respectively corresponding to the M blocks of the first sound channel. Similarly, the description of the second decoded group information is similar to that of the first decoded group information.

It can be learned from the example descriptions of the decoder side in the foregoing embodiments that the first decoded group information of the M blocks of the first sound channel of the current frame of the multi-channel signal is obtained from the bitstream, where the first decoded group information indicates the first decoded transient identifiers of the M blocks of the first sound channel. Similarly, the second decoded group information of the M blocks of the second sound channel is obtained from the bitstream, and the bitstream is decoded by using the decoding neural network, to obtain the decoded spectrums of the M blocks of the first sound channel and the decoded spectrums of the M blocks of the second sound channel. The first reconstructed signal of the first sound channel is obtained based on the first decoded group information and the decoded spectrums of the M blocks of the first sound channel. Similarly, the second reconstructed signal of the second sound channel is obtained based on the second decoded group information and the decoded spectrums of the M blocks of the second sound channel. The first decoded spectrums of the M blocks of the first sound channel and the second decoded spectrums of the M blocks of the second sound channel are obtained when the bitstream is decoded, and respectively correspond to grouped and arranged spectrums of the M blocks of the first sound channel and grouped and arranged spectrums of the M blocks of the second sound channel at an encoder side. Therefore, the first reconstructed signal of the first sound channel and the second reconstructed signal of the second sound channel may be obtained based on the first decoded group information and the second decoded group information. During signal reconstruction, decoding and reconstruction may be performed based on blocks with different transient identifiers in the multi-channel signal, so that reconstruction effect of the multi-channel signal can be improved.

For better understanding and implementation of the foregoing solutions in embodiments of the present disclosure, specific descriptions are provided below by using corresponding application scenarios as examples.

Figure 6:
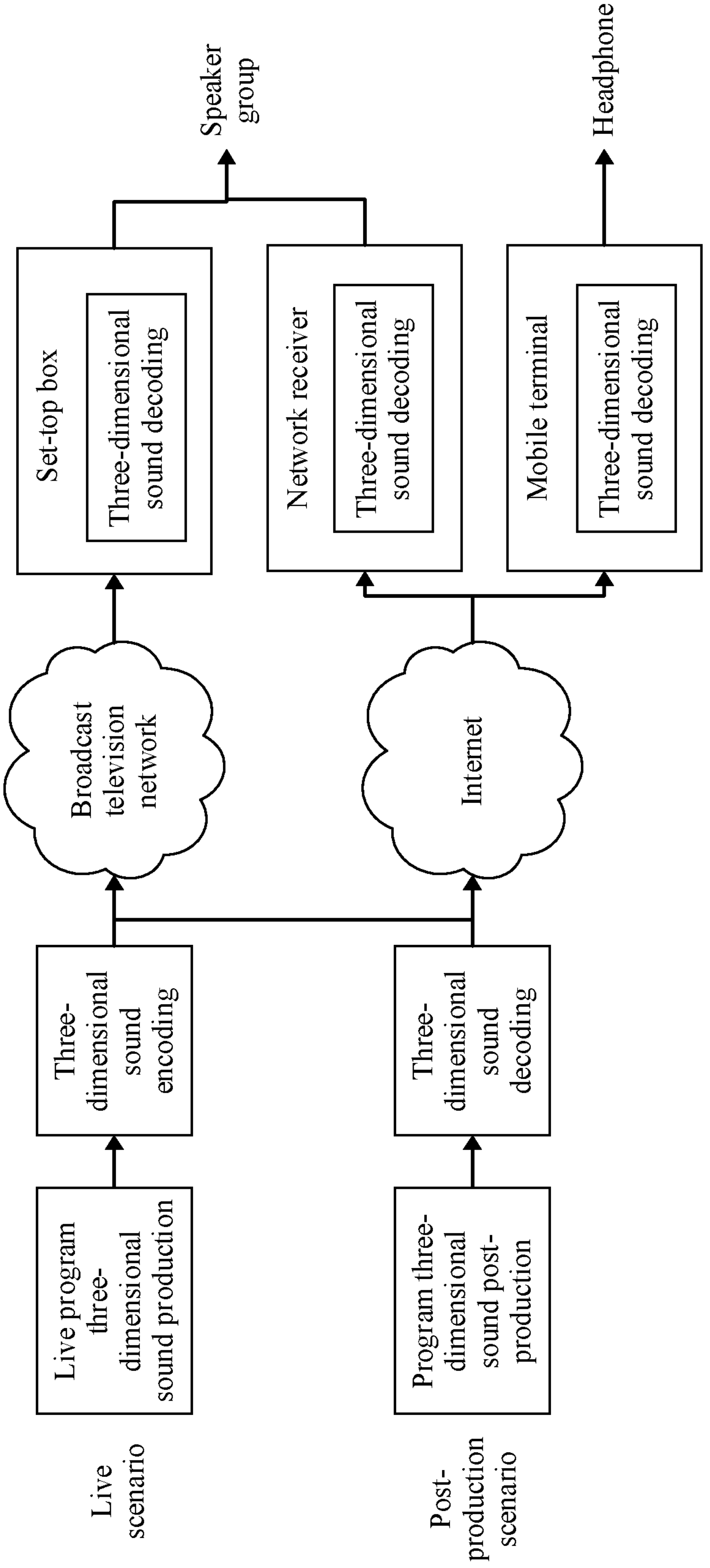
FIG. 6 is a schematic diagram of an audio signal encoding and decoding system according to an embodiment of the present disclosure.

FIG. 6 is a schematic diagram of a system architecture applied to the broadcast and television field according to an embodiment of the present disclosure. This embodiment of the present disclosure may also be applied to a live broadcast scenario and a post-production scenario of broadcast and television, or applied to a three-dimensional sound codec in terminal media playback.

In the live broadcast scenario, three-dimensional sound encoding in this embodiment of the present disclosure is performed on a three-dimensional sound signal produced from a three-dimensional sound of a live program to obtain a bitstream, and the bitstream is transmitted to a user side via a broadcast and television network. A three-dimensional sound decoder in a set-top box performs decoding to reconstruct a three-dimensional sound signal, and a speaker group plays back the three-dimensional sound signal. In the post-production scenario, three-dimensional sound encoding in this embodiment of the present disclosure is performed on a three-dimensional sound signal produced from a three-dimensional sound of a post-production program to obtain a bitstream, and the bitstream is transmitted to a user side via a broadcast and television network or the Internet. A three-dimensional sound decoder in a network receiver or a mobile terminal performs decoding to reconstruct a three-dimensional sound signal, and a speaker group or a headphone plays back the three-dimensional sound signal.

An embodiment of the present disclosure provides an audio codec. The audio codec may specifically include a radio access network, a media gateway in a core network, a transcoding device, a media resource server, a mobile terminal, a fixed network terminal, and the like. The audio codec can also be used as an audio codec in broadcast and television, terminal media playback, or VR streaming services.

The following separately describes application scenarios of the encoder side and the decoder side in embodiments of the present disclosure.

Figure 7:
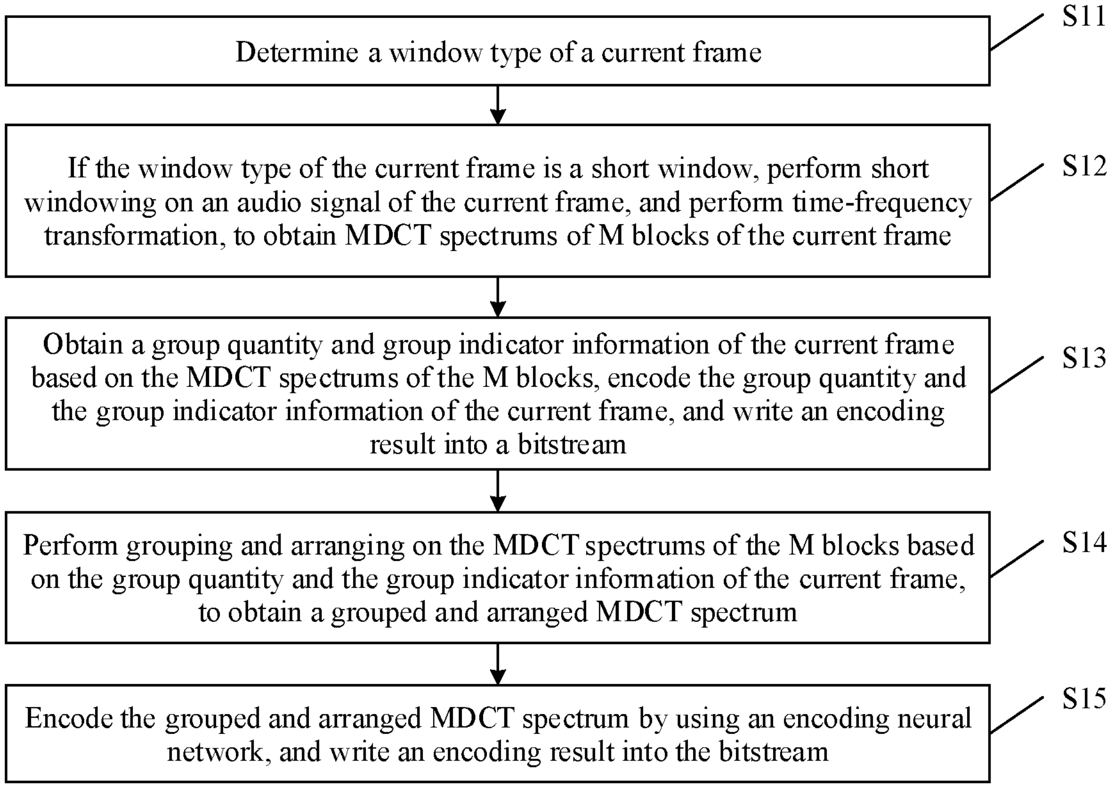
FIG. 7 is a schematic diagram of a multi-channel signal encoding method according to an embodiment of the present disclosure.

As shown in FIG. 7, a multi-channel signal encoding method performed by an encoder provided in embodiments of the present disclosure includes the following steps.

S11: Determine a window type of a current frame.

An audio signal of the current frame is obtained, the window type of the current frame is determined based on the audio signal of the current frame, and the window type is written into a bitstream.

A specific implementation includes the following three steps.

(1) Perform framing on a to-be-encoded audio signal to obtain the audio signal of the current frame.

For example, if a frame length of the current frame is L sample points, the audio signal of the current frame is an L-point time-domain signal.

(2) Perform transient state detection based on the audio signal of the current frame to determine transient state information of the current frame.

There are a plurality of transient state detection methods. This is not limited in embodiments of the present disclosure. The transient state information of the current frame may include one or more of the following: an identifier of whether the current frame is a transient signal, a location at which a transient state of the current frame occurs, and a parameter that indicates a transient degree. The transient degree may be a transient energy level, or a ratio of signal energy of the location at which the transient state occurs to signal energy of an adjacent non-transient location.

(3) Determine the window type of the current frame based on the transient state information of the current frame, encode the window type of the current frame, and write an encoding result into the bitstream.

If the transient state information of the current frame indicates that the current frame is a transient signal, the window type of the current frame is a short window.

If the transient state information of the current frame indicates that the current frame is a non-transient signal, the window type of the current frame is another window type excluding a short window. The another window type is not limited in embodiments of the present disclosure. For example, the another window type may include a long window, a cut-in window, a cut-out window, and the like.

S12: If the window type of the current frame is a short window, perform short windowing on the audio signal of the current frame, and perform time-frequency transformation, to obtain MDCT spectrums of M blocks of the current frame.

If the window type of the current frame is a short window, short windowing is performed on the audio signal of the current frame, and time-frequency transformation is performed, to obtain the MDCT spectrums of the M blocks.

For example, if the window type of the current frame is a short window, windowing is performed by using M overlapped short window functions, to obtain windowed audio signals of the M blocks, where M is a positive integer greater than or equal to 2. For example, a window length of a short window function is 2L/M, L is the frame length of the current frame, and an overlap length is L/M. For example, M is equal to 8, L is equal to 1024, the window length of the short window function is 256 sample points, and the overlap length is 128 sample points.

Time-frequency transformation is separately performed on the windowed audio signals of the M blocks to obtain the MDCT spectrums of the M blocks of the current frame.

For example, a length of a windowed audio signal of a current block is 256 sample points. MDCT transformation is performed to obtain a 128-point MDCT coefficient, namely, an MDCT spectrum of the current block.

S13: Obtain a group quantity and group indicator information of the current frame based on the MDCT spectrums of the M blocks, encode the group quantity and the group indicator information of the current frame, and write an encoding result into the bitstream.

In an implementation, before the group quantity and the group indicator information of the current frame are obtained in step S13, interleaving is first performed on the MDCT spectrums of the M blocks, to obtain an interleaved MDCT spectrum of the M blocks; an encoding preprocessing operation is then performed on the interleaved MDCT spectrum of the M blocks, to obtain a preprocessed MDCT spectrum; de-interleaving is performed on the preprocessed MDCT spectrum, to obtain de-interleaved MDCT spectrums of the M blocks; and finally the group quantity and the group indicator information of the current frame are determined based on the de-interleaved MDCT spectrums of the M blocks.

Performing interleaving on the MDCT spectrums of the M blocks is interleaving the M MDCT spectrums with a length L/M into the MDCT spectrum with a length L. M spectral coefficients at frequency bin locations i in the MDCT spectrums of the M blocks are arranged together from 0 to M−1 of sequence numbers of the blocks. Then, M spectral coefficients at frequency bin locations i+1 in the MDCT spectrums of the M blocks are arranged together from 0 to M−1 of the sequence numbers of the blocks. A value of i is from 0 to L/M−1.

The encoding preprocessing operation may include frequency domain noise shaping (FDNS), temporal noise shaping (TNS), bandwidth extension (BWE), and other processing. This is not limited herein.

De-interleaving is an inverse process of interleaving. The length of the preprocessed MDCT spectrum is L. The preprocessed MDCT spectrum with the length L is divided into the M MDCT spectrums with the length L/M. The MDCT spectrums of the blocks are arranged in ascending order of frequency bins, to obtain the de-interleaved MDCT spectrums of the M blocks. The interleaved spectrum is preprocessed, so that encoding side information can be reduced, bits occupied by the side information are reduced, and encoding efficiency is improved.

The group quantity and the group indicator information of the current frame are determined based on the de-interleaved MDCT spectrums of the M blocks. Specifically, the method includes the following three steps.

(a) Calculate MDCT Spectral Energy Values of the M Blocks.

Assuming that de-interleaved MDCT spectral coefficients of the M blocks are mdctSpectrum[8][128], an MDCT spectral energy value of each block is calculated and denoted as enerMdct[8]. Herein, 8 is a value of M, and 128 indicates a quantity of MDCT coefficients in a block.

(b) Calculate an average value of the MDCT spectral energy values based on the MDCT spectral energy values of the M blocks. The following two methods are mainly included.

Method 1: Directly calculate the average value of the MDCT spectral energy values of the M blocks, that is, an average value of enerMdct[8], as an average value avgEner of the MDCT spectral energy values.

Method 2: Determine a block with a largest MDCT spectral energy value in the M blocks; and calculate an average value of MDCT spectral energy values of M−1 blocks other than the block with the largest energy value as an average value avgEner of the MDCT spectral energy values; or calculate an average value of MDCT spectral energy values of blocks other than several blocks with largest energy values as an average value avgEner of the MDCT spectral energy values.

(c) Determine the group quantity and the group indicator information of the current frame based on the MDCT spectral energy values of the M blocks and the average value of the MDCT spectral energy values, and write the group quantity and the group indicator information into the bitstream.

Specifically, the MDCT spectral energy value of each block is compared with the average value of the MDCT spectral energy value. If an MDCT spectral energy value of the current block is greater than K times the average value of the MDCT spectral energy values, the current block is a transient block, and a transient identifier of the current block is 0. Otherwise, the current block is a non-transient block, and a non-transient identifier of the current block is 1. K is greater than or equal to 1. For example, K=2. The M blocks are grouped based on transient identifiers of the blocks, to determine the group quantity and the group indicator information. Blocks with a same transient identifier value are grouped together. The M blocks are divided into N groups, and N is the group quantity. The group indicator information is information formed by a transient identifier value of each of the M blocks.

For example, transient blocks form a transient group, and non-transient blocks form a non-transient group. Specifically, if the transient identifiers of the blocks are not completely the same, a group quantity numGroups of the current frame is 2. Otherwise, the group quantity is 1. The group quantity may be indicated by a group quantity identifier. For example, if the group quantity identifier is 1, it indicates that the group quantity of the current frame is 2. If the group quantity identifier is 0, it indicates that the group quantity of the current frame is 1. Group indicator information groupIndicator of the current frame is determined based on the transient identifiers of the M blocks. For example, the transient identifiers of the M blocks are sequentially arranged to form the group indicator information groupIndicator of the current frame.

In another implementation, before the step S13 of obtaining the group quantity and the group indicator information, interleaving and de-interleaving are not performed on the MDCT spectrums of the M blocks, the group quantity and the group indicator information of the current frame are directly determined based on the MDCT spectrums of the M blocks, the group quantity and the group indicator information of the current frame are encoded, and the encoding result is written into the bitstream.

Determining the group quantity and the group indicator information of the current frame based on the MDCT spectrums of the M blocks is similar to determining the group quantity and the group indicator information of the current frame based on the de-interleaved MDCT spectrums of the M blocks.

The group quantity and the group indicator information of the current frame are written into the bitstream.

In addition, the non-transient group may be further divided into two or more other groups. This is not limited in embodiments of the present disclosure. For example, the non-transient group may be divided into a harmonic group and a non-harmonic group.

S14: Perform grouping and arranging on the MDCT spectrums of the M blocks based on the group quantity and the group indicator information of the current frame, to obtain a grouped and arranged MDCT spectrum. The grouped and arranged MDCT spectrum is a to-be-encoded spectrum of the current frame.

If the group quantity of the current frame is 2, audio signal spectrums of the M blocks of the current frame need to be grouped and arranged. An arrangement manner is as follows: in the M blocks, several blocks belonging to the transient group are adjusted to the front, and several blocks belonging to the non-transient group are adjusted to the back. An encoding neural network of the encoder has better encoding effect for spectrums that are arranged in the front. Therefore, the transient blocks are adjusted to the front, so that encoding effect of the transient blocks can be ensured. This retains more spectral details of the transient blocks, and improves encoding quality.

The MDCT spectrums of the M blocks of the current frame are grouped and arranged based on the group quantity and the group indicator information of the current frame, or the de-interleaved MDCT spectrums of the M blocks of the current frame may be grouped and arranged based on the group quantity and the group indicator information of the current frame.

S15: Encode the grouped and arranged MDCT spectrum by using the encoding neural network, and write it into the bitstream.

Intra-group interleaving is first performed on the grouped and arranged MDCT spectrum, to obtain an intra-group interleaved MDCT spectrum. Then, the intra-group interleaved MDCT spectrum is encoded by using the encoding neural network. The intra-group interleaving is similar to the foregoing interleaving performed on the MDCT spectrums of the M blocks before the group quantity and the group indicator information are obtained, except that the interleaved object is the MDCT spectrums belonging to one group. For example, interleaving is performed on the MDCT spectrum blocks belonging to the transient group. Interleaving is performed on the MDCT spectrum blocks belonging to the non-transient group.

Processing by using the encoding neural network is pre-trained. A specific network structure and a training method of the encoding neural network are not limited in embodiments of the present disclosure. For example, a fully connected network or a convolutional neural network (CNN) may be selected for the encoding neural network.

Figure 8:
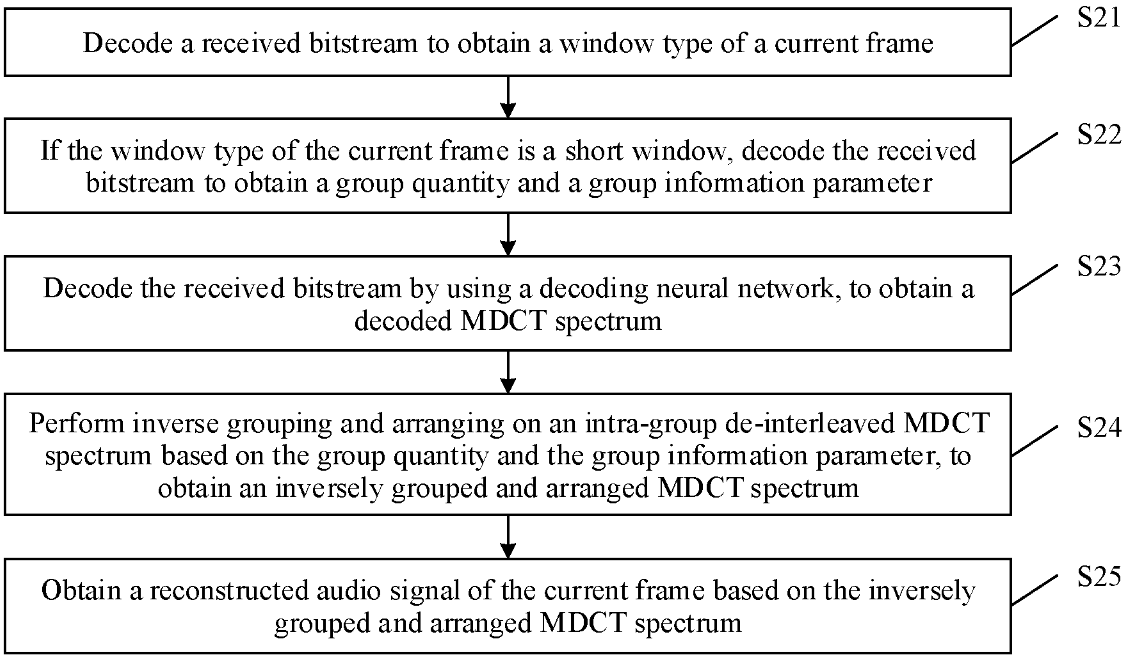
FIG. 8 is a schematic diagram of a multi-channel signal decoding method according to an embodiment of the present disclosure.

As shown in FIG. 8, a decoding process corresponding to an encoder side includes the following steps.

S21: Decode a received bitstream to obtain a window type of a current frame.

S22: If the window type of the current frame is a short window, decode the received bitstream to obtain a group quantity and group indicator information.

Group quantity identifier information in the bitstream may be parsed, and the group quantity of the current frame may be determined based on the group quantity identifier information. For example, if a group quantity identifier is 1, it indicates that the group quantity of the current frame is 2. If a group quantity identifier is 0, it indicates that the group quantity of the current frame is 1.

If the group quantity of the current frame is greater than 1, the received bitstream may be decoded to obtain the group indicator information.

Decoding the received bitstream to obtain the group indicator information may be: reading the M-bit group indicator information from the bitstream. Whether an $i^{th}$ block is a transient block may be determined based on a value of an $i^{th}$ bit of the group indicator information. If the value of the $i^{th}$ bit is 0, it indicates that the $i^{th}$ block is a transient block. If the value of the $i^{th}$ bit is 1, it indicates that the $i^{th}$ block is a non-transient block.

S23. Obtain a decoded MDCT spectrum by using a decoding neural network based on the received bitstream.

The decoding process of a decoder side corresponds to the encoding process of the encoder side. The method specifically includes the following steps.

First, the received bitstream is decoded by using the decoding neural network, to obtain the decoded MDCT spectrum.

Then, the decoded MDCT spectrum belonging to one group may be determined based on the group quantity and the group indicator information. Intra-group de-interleaving is performed on the MDCT spectrums belonging to one group, to obtain an intra-group de-interleaved MDCT spectrum. The intra-group de-interleaving process is the same as the de-interleaving performed on the interleaved MDCT spectrums of the M blocks before the encoder side obtains the group quantity and the group indicator information.

S24: Perform inverse grouping and arranging on the intra-group de-interleaved MDCT spectrum based on the group quantity and the group indicator information, to obtain an inversely grouped and arranged MDCT spectrum.

If the group quantity of the current frame is greater than 1, inverse grouping and arranging needs to be performed on the intra-group de-interleaved MDCT spectrum based on the group indicator information. Inverse grouping and arranging of the decoder side is an inverse process of grouping and arranging of the encoder side.

For example, it is assumed that the intra-group de-interleaved MDCT spectrum is formed by M L/M-point MDCT spectrum blocks. A block index idx0(i) of the $i^{th}$ transient block is determined based on the group indicator information. An MDCT spectrum of the $i^{th}$ block in the intra-group de-interleaved MDCT spectrum is used as an MDCT spectrum of an $idx0(i)^{th}$ block in the inversely grouped and arranged MDCT spectrum. The block index idx0(i) of the $i^{th}$ transient block is a block index corresponding to the $i^{th}$ block with an indicator value 0 in the group indicator information, and i starts from 0. A quantity of transient blocks is a quantity of bits with an indicator value 0 in the group indicator information, and is denoted as num0. After the transient blocks are processed, non-transient blocks need to be processed. A block index idx1(j) of a $j^{th}$ non-transient block is determined based on the group indicator information. An MDCT spectrum of a $(num0+j)^{th}$ block in the intra-group de-interleaved MDCT spectrum is used as an MDCT spectrum of an $idx1(j)^{th}$ block in the inversely grouped and arranged MDCT spectrum. The block index idx1(j) of the $j^{th}$ non-transient block is a block index corresponding to the $j^{th}$ block with an indicator value 1 in the group indicator information, and j starts from 0.

S25: Obtain a reconstructed audio signal of the current frame based on the inversely grouped and arranged MDCT spectrum.

In a specific implementation in which the reconstructed audio signal is obtained based on the inversely grouped and arranged MDCT spectrum, interleaving is first performed on the inversely grouped and arranged MDCT spectrums of M blocks, to obtain interleaved MDCT spectrums of the M blocks; a decoding post-processing operation is then performed on the interleaved MDCT spectrums of the M blocks, to obtain a decoding post-processed MDCT spectrum, where decoding post-processing may include, for example, inverse TNS, inverse FDNS, BWE, and the like, and decoding post-processing is in a one-to-one correspondence with an encoding pre-processing manner of the encoder side; de-interleaving is performed on the decoding post-processed MDCT spectrum, to obtain de-interleaved MDCT spectrums of the M blocks; and finally frequency-time transformation is performed on the de-interleaved MDCT spectrums of the M blocks, and de-windowing and overlap-addition are performed, to obtain the reconstructed audio signal.

In another specific implementation in which the reconstructed audio signal is obtained based on the inversely grouped and arranged MDCT spectrum, frequency-time transformation is performed on the MDCT spectrums of the M blocks, and de-windowing and overlap-addition are performed, to obtain the reconstructed audio signal.

Figure 9A:
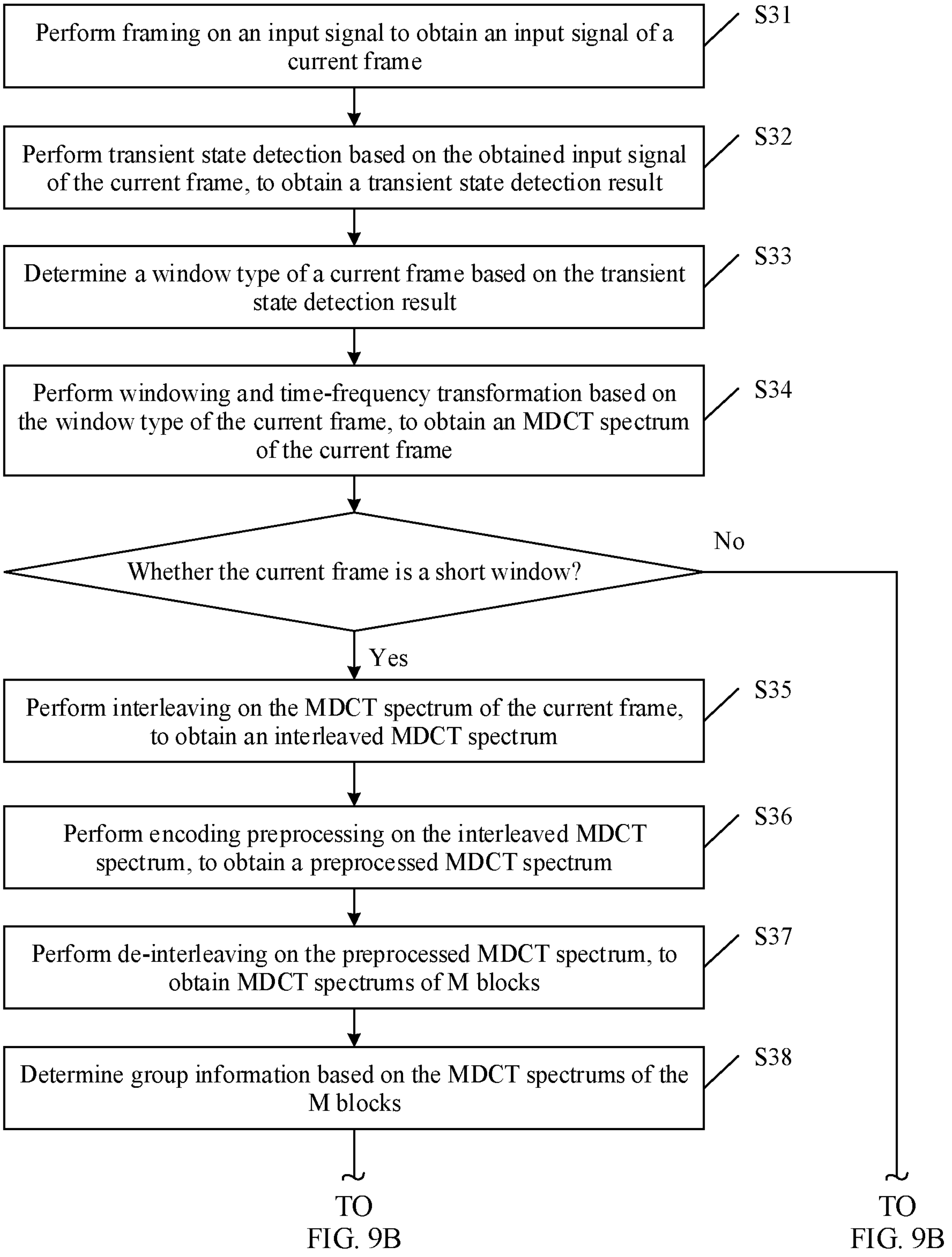
FIG. 9A and FIG. 9B are a schematic diagram of a multi-channel signal encoding method according to an embodiment of the present disclosure.
Figure 9B:
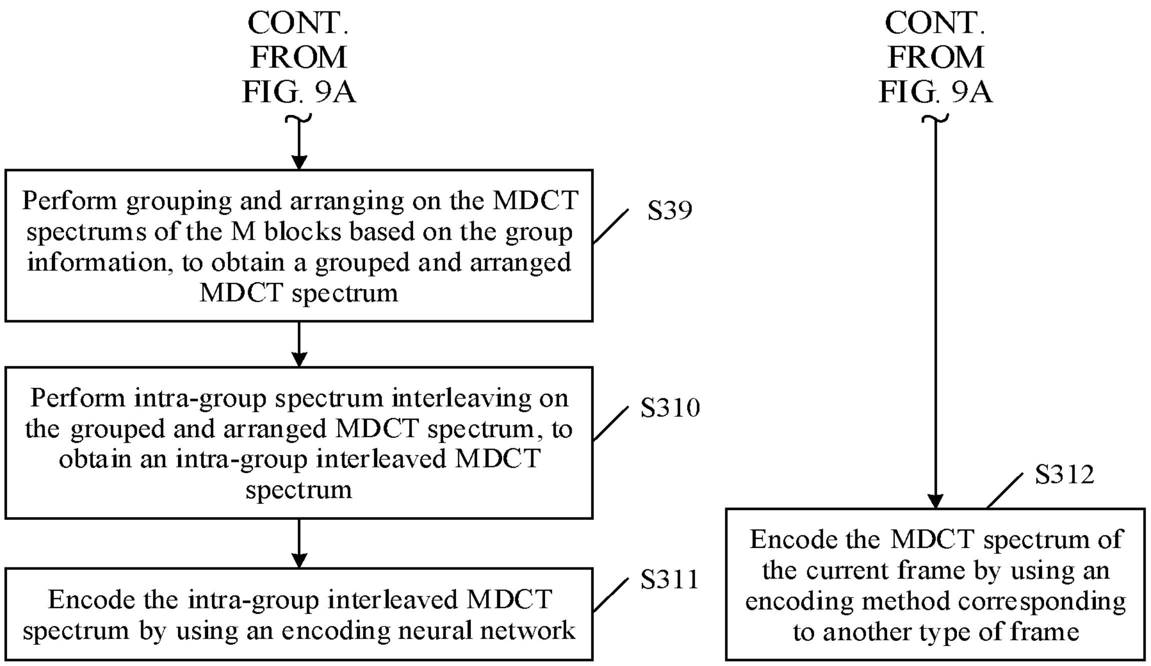

As shown in FIG. 9A and FIG. 9B, a multi-channel signal encoding method executed by an encoder side includes the following steps.

S31: Perform framing on an input signal to obtain an input signal of a current frame.

For example, if a frame length is 1024, the input signal of the current frame is a 1024-point audio signal.

S32: Perform transient state detection based on the obtained input signal of the current frame, to obtain a transient state detection result.

For example, the input signal of the current frame is divided into L blocks, and a signal energy value of each block is calculated. If signal energy values of adjacent blocks suddenly change, the current frame is considered as a transient signal. For example, L is a positive integer greater than 2, and may be L=8. If a difference between the signal energy values of the adjacent blocks is greater than a preset threshold, the current frame is considered as a non-transient signal.

S33: Determine a window type of the current frame based on the transient state detection result.

If the transient state detection result of the current frame is a transient signal, the window type of the current frame is a short window. Otherwise, the window type of the current frame is a long window.

In addition to the short window and the long window, the window type of the current frame may further include a cut-in window and a cut-out window. It is assumed that a frame number of the current frame is i. The window type of the current frame is determined based on transient state detection results of an $(i-1)^{th}$ frame and an $(i-2)^{th}$ frame and the transient state detection result of the current frame.

If the transient state detection results of the $i^{th}$ frame, the $(i-1^{th}$ frame, and the $(i-2)^{th}$ frame are all non-transient signals, the window type of the $i^{th}$ frame is a long window.

If the transient state detection result of the $i^{th}$ frame is a transient signal, and the transient state detection results of the $(i-1)^{th}$ frame and the $(i-2)^{th}$ frame are non-transient signals, the window type of the $i^{th}$ frame is a cut-in window.

If the transient state detection results of the $i^{th}$ frame and the $(i-1)^{th}$ frame are non-transient signals, and the transient state detection result of the $(i-2)^{th}$ frame is a transient signal, the window type of the $i^{th}$ frame is a cut-out window.

If the transient state detection results of the $i^{th}$ frame, the $(i-1)^{th}$ frame, and the $(i-2)^{th}$ frame are in a case other than the foregoing three cases, the window type of the $i^{th}$ frame is a short window.

S34: Perform windowing and time-frequency transformation based on the window type of the current frame, to obtain an MDCT spectrum of the current frame.

Windowing and MDCT transformation are performed based on the window type including the long window, the cut-in window, the cut-out window, and the short window. For the long window, the cut-in window, and the cut-out window, if a length of a windowed signal is 2048, 1024 MDCT coefficients are obtained. For the short window, eight overlapped short windows with a length 256 are added, and 128 MDCT coefficients are obtained for each short window, the 128 MDCT coefficients of each short window are referred to as a block, and there are 1024 MDCT coefficients in total.

Whether the window type of the current frame is a short window is determined. If the window type of the current frame is a short window, the following step S35 is performed. If the window type of the current frame is not a short window, the following step S312 is performed.

S35: If the window type of the current frame is a short window, perform interleaving on the MDCT spectrum of the current frame, to obtain an interleaved MDCT spectrum.

If the window type of the current frame is a short window, interleaving is performed on MDCT spectrums of eight blocks. That is, eight 128-dimensional MDCT spectrums are interleaved into an MDCT spectrum with a length 1024.

A form of the interleaved spectrum may be: block 0 bin 0, block 1 bin 0, block 2 bin 0, . . . , block 7 bin 0, block 0 bin 1, block 1 bin 1, block 2 bin 1, . . . , block 7 bin 1, and the like.

Herein, block 0 bin 0 indicates a frequency bin 0 of a block 0.

S36: Perform encoding preprocessing on the interleaved MDCT spectrum, to obtain a preprocessed MDCT spectrum.

Preprocessing may include FDNS, TNS, BWE, and other processing.

S37: Perform de-interleaving on the preprocessed MDCT spectrum, to obtain MDCT spectrums of M blocks.

De-interleaving is performed in a manner inverse to that in step S35, to obtain the MDCT spectrums of the eight blocks, where each block is 128 points.

S38: Determine group information based on the MDCT spectrums of the M blocks.

The information may include a group quantity numGroups and group indicator information groupIndicator. A specific solution for determining the group information based on the MDCT spectrums of the M blocks may be any one of the foregoing solutions in step S13 performed by the encoder side. For example, assuming that MDCT spectral coefficients of eight blocks in a short frame are mdctSpectrum[8][128], an MDCT spectral energy value of each block is calculated and denoted as enerMdct[8]. An average value of the MDCT spectral energy values of the eight blocks is calculated and denoted as avgEner. There are two methods for calculating the average value of the MDCT spectral energy values.

Method 1: Directly calculate the average value of the MDCT spectral energy values of the eight blocks, namely, the average value of enerMdct[8].

Method 2: To reduce impact of a block with a largest energy value in the eight blocks on calculation of the average value, calculate the average value after removing the largest energy value.

The MDCT spectral energy value of each block is compared with the average energy. If the MDCT spectral energy value is greater than several times of the average energy, a current block is considered as a transient block (denoted as 0). Otherwise, the current block is considered as a non-transient block (denoted as 1). All transient blocks form a transient group. All non-transient blocks form a non-transient group.

For example, if the window type of the current frame is a short window, the preliminarily determined group information may be: group quantity numGroups: 2; block indices: 0 1 2 3 4 5 6 7; and group indicator information groupIndicator: 1 1 1 0 0 0 0 1.

The group quantity and the group indicator information need to be written into a bitstream and transmitted to a decoder side.

S39: Perform grouping and arranging on the MDCT spectrums of the M blocks based on the group information, to obtain a grouped and arranged MDCT spectrum.

A specific solution for performing grouping and arranging on the MDCT spectrums of the M blocks based on the group information may be any one of the foregoing solutions in step S14 performed by the encoder side.

For example, in the eight blocks of the short frame, several blocks belonging to the transient group are placed in the front, and several blocks belonging to the other group are placed in the back.

The example in step S38 is still used as an example. The group information is: block indices: 0 1 2 3 4 5 6 7; and group indicator information groupIndicator: 1 1 1 0 0 0 0 1.

In this case, a spectrum form of the arranged spectrums is: block indices: 3 4 5 6 0 1 2 7.

To be specific, a spectrum of a block 0 after arrangement is a spectrum of a block 3 before arrangement, a spectrum of a block 1 after arrangement is a spectrum of a block 4 before arrangement, a spectrum of a block 2 after arrangement is a spectrum of a block 5 before arrangement, a spectrum of a block 3 after arrangement is a spectrum of a block 6 before arrangement, a spectrum of a block 4 after arrangement is a spectrum of a block 0 before arrangement, a spectrum of a block 5 after arrangement is a spectrum of a block 1 before arrangement, a spectrum of a block 6 after arrangement is a spectrum of a block 2 before arrangement, and a spectrum of a block 7 after arrangement is a spectrum of a block 7 before arrangement.

S310: Perform intra-group spectrum interleaving on the grouped and arranged MDCT spectrum, to obtain an intra-group interleaved MDCT spectrum.

Intra-group interleaving is performed on each group of the grouped and arranged MDCT spectrum. The processing manner is similar to that of step S35, except that interleaving is limited to processing MDCT spectrums belonging to one group.

The above example is still used as an example. In the arranged spectrums, interleaving is performed on the transient group (blocks 3, 4, 5, and 6 before arrangement, namely, block 0, 1, 2, and 3 after arrangement), and interleaving is performed on the other group (blocks 0, 1, 2, and 7 before arrangement, namely, blocks 4, 5, 6, and 7 after arrangement).

S311: Encode the intra-group interleaved MDCT spectrum by using an encoding neural network.

A specific method for encoding the intra-group interleaved MDCT spectrum by using the encoding neural network is not limited in embodiments of the present disclosure. For example, the intra-group interleaved MDCT spectrum is processed by using the encoding neural network, to generate latent variables (latent variables). The latent variables are quantized to obtain quantized latent variables. Arithmetic encoding is performed on the quantized latent variables, and an arithmetic encoding result is written into the bitstream.

S312: If the current frame is not a short frame, encode the MDCT spectrum of the current frame by using an encoding method corresponding to another type of frame.

For encoding of another type of frame, grouping, arranging, and intra-group interleaving may not be performed. For example, the MDCT spectrum of the current frame obtained in step S34 is directly encoded by using the encoding neural network.

For example, a window function corresponding to the window type is determined, and windowing is performed on the audio signal of the current frame, to obtain a windowed signal. When windows of adjacent frames are overlapped, time-frequency positive transformation, for example, MDCT transformation, is performed on the windowed signal, to obtain the MDCT spectrum of the current frame. The MDCT spectrum of the current frame is encoded.

Figure 10A:
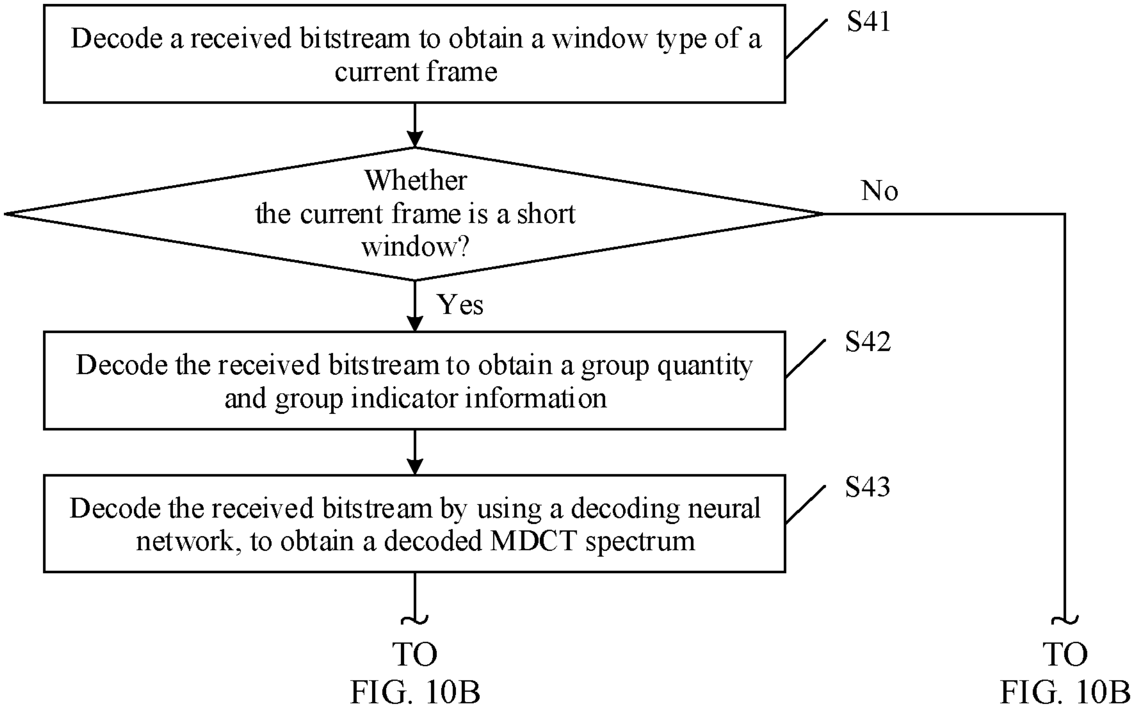
FIG. 10A and FIG. 10B are a schematic diagram of a multi-channel signal decoding method according to an embodiment of the present disclosure.
Figure 10B:
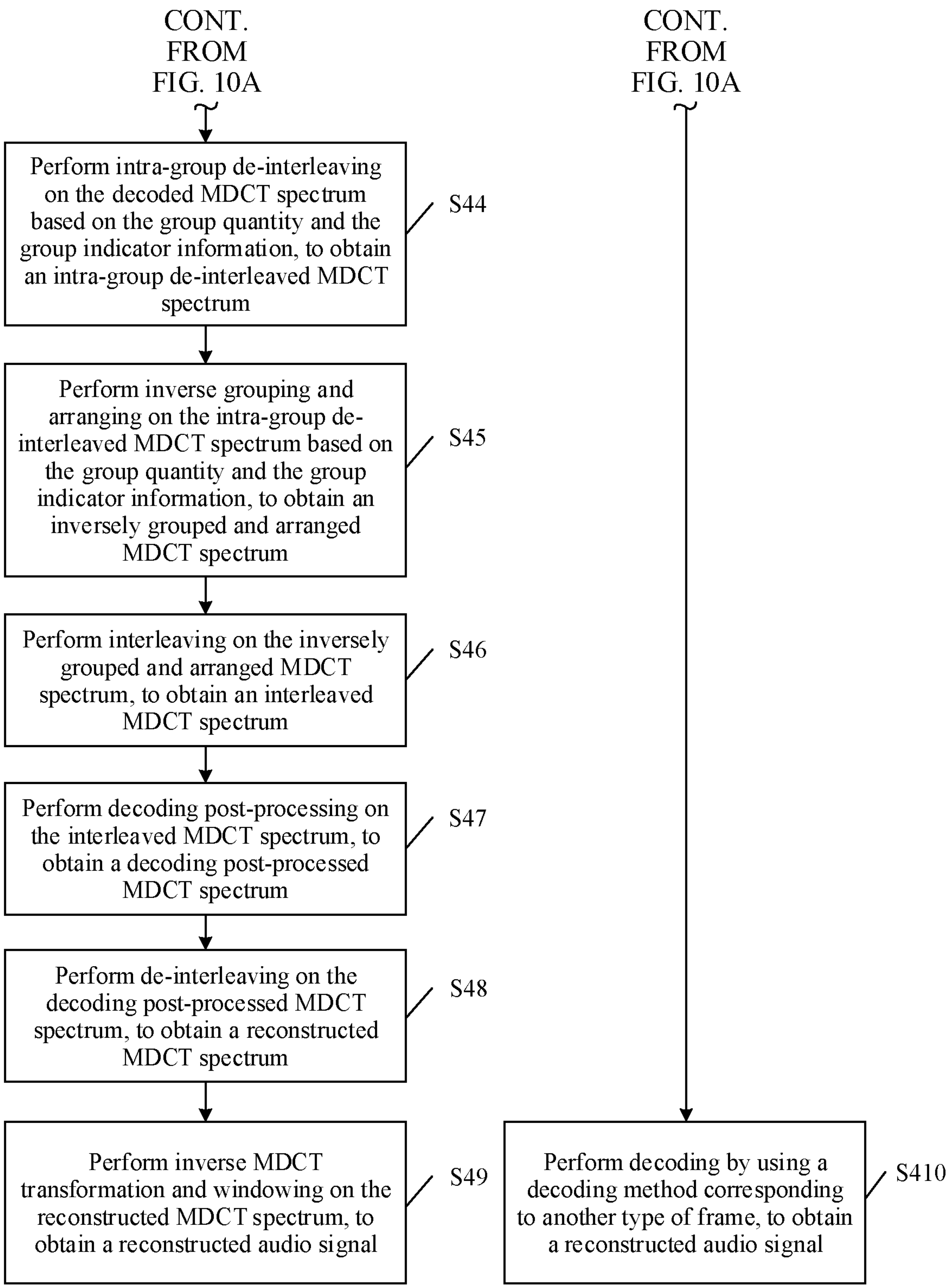

As shown in FIG. 10A and FIG. 10B, a multi-channel signal decoding method executed by a decoder side includes the following steps.

S41: Decode a received bitstream to obtain a window type of a current frame.

Whether the window type of the current frame is a short window is determined. If the window type of the current frame is a short window, the following step S42 is performed. If the window type of the current frame is not a short window, the following step S410 is performed.

S42: If the window type of the current frame is a short window, decode the received bitstream to obtain a group quantity and group indicator information.

S43: Decode the received bitstream by using a decoding neural network, to obtain a decoded MDCT spectrum.

The decoding neural network corresponds to an encoding neural network. For example, a specific method for decoding by using the decoding neural network is as follows: Arithmetic decoding is performed on the received bitstream, to obtain quantized latent variables. Dequantization is performed on the quantized latent variables to obtain dequantized latent variables. The dequantized latent variables are used as an input and processed by using the decoding neural network, to generate the decoded MDCT spectrum.

S44: Perform intra-group de-interleaving on the decoded MDCT spectrum based on the group quantity and the group indicator information, to obtain an intra-group de-interleaved MDCT spectrum.

MDCT spectrum blocks belonging to one group are determined based on the group quantity and the group indicator information. For example, the decoded MDCT spectrum is divided into eight blocks. The group quantity is equal to 2, and the group indicator information groupIndicator is 1 11 0 0 0 0 1. If a quantity of bits with an indicator value 0 in the group indicator information is 4, the MDCT spectrums of the first four blocks in the decoded MDCT spectrum are one group and belong to a transient group, and intra-group de-interleaving needs to be performed. If a quantity of bits with an indicator value 1 is 4, the MDCT spectrums of the last four blocks form one group and belong to a non-transient group, and intra-group de-interleaving needs to be performed. The MDCT spectrums of the eight blocks obtained through intra-group de-interleaving are the intra-group de-interleaved MDCT spectrums of the eight blocks.

S45: Perform inverse grouping and arranging on the intra-group de-interleaved MDCT spectrum based on the group quantity and the group indicator information, to obtain an inversely grouped and arranged MDCT spectrum.

The intra-group de-interleaved MDCT spectrum is arranged based on the group indicator information groupIndicator into M time-ordered block spectrums.

For example, the group quantity is equal to 2, and the group indicator information groupIndicator is 1 1 1 0 0 0 0 1. In this case, an intra-group de-interleaved MDCT spectrum of a block 0 needs to be adjusted to an MDCT spectrum of a block 3 (an element location index corresponding to a first bit with an indicator value 0 in the group indicator information is 3); an intra-group de-interleaved MDCT spectrum of a block 1 needs to be adjusted to an MDCT spectrum of a block 4 (an element location index corresponding to a second bit with an indicator value 0 in the group indicator information is 4); an intra-group de-interleaved MDCT spectrum of a block 2 needs to be adjusted to an MDCT spectrum of a block 5 (an element location index corresponding to a third bit with an indicator value 0 in the group indicator information is 5); an intra-group de-interleaved MDCT spectrum of a block 3 needs to be adjusted to an MDCT spectrum of a block 6 (an element location index corresponding to a fourth bit with an indicator value 0 in the group indicator information is 6); an intra-group de-interleaved MDCT spectrum of a block 4 needs to be adjusted to an MDCT spectrum of a block 0 (an element location index corresponding to a first bit with an indicator value 1 in the group indicator information is 0); an intra-group de-interleaved MDCT spectrum of a block 5 needs to be adjusted to an MDCT spectrum of a block 1 (an element location index corresponding to a second bit with an indicator value 1 in the group indicator information is 1); an intra-group de-interleaved MDCT spectrum of a block 6 needs to be adjusted to an MDCT spectrum of a block 2 (an element location index corresponding to a third bit with an indicator value 1 in the group indicator information is 2); and an intra-group de-interleaved MDCT spectrum of a block 7 is not adjusted, and is directly used as an MDCT spectrum of a block 7.

At an encoder side, a short frame spectrum form of the grouped and arranged spectrum is: block indices 3 4 5 6 0 12 7.

At a decoder side, an inversely grouped and arranged short frame spectrum is restored into eight time-ordered block spectrums of eight short frames: block indices 0 1 2 3 4 5 6 7.

S46: Perform interleaving on the inversely grouped and arranged MDCT spectrum, to obtain an interleaved MDCT spectrum.

If the window type of the current frame is a short window, interleaving is performed on the inversely grouped and arranged MDCT spectrum, and the method is the same as that described above.

S47: Perform decoding post-processing on the interleaved MDCT spectrum, to obtain a decoding post-processed MDCT spectrum.

Decoding post-processing may include BWE, TNS inverse processing, FDNS inverse processing, and other processing.

S48: Perform de-interleaving on the decoding post-processed MDCT spectrum, to obtain a reconstructed MDCT spectrum.

S49: Perform inverse MDCT transformation and windowing on the reconstructed MDCT spectrum, to obtain a reconstructed audio signal.

The reconstructed MDCT spectrum includes MDCT spectrums of the M blocks, and inverse MDCT transformation is performed on an MDCT spectrum of each block. After windowing and overlap-addition are performed on the inversely transformed signal, the reconstructed audio signal of a short frame can be obtained.

S410: If the window type of the current frame is another window type, perform decoding by using a decoding method corresponding to another type of frame, to obtain the reconstructed audio signal.

For example, the received bitstream is decoded by using the decoding neural network, to obtain a reconstructed MDCT spectrum. Inverse transformation and OLA are performed based on the window type (a long window, a cut-in window, and a cut-out window), to obtain the reconstructed audio signal.

According to the method provided in this embodiment of the present disclosure, if the window type of the current frame is a short window, the group quantity and the group indicator information of the current frame are obtained based on the spectrums of the M blocks of the current frame; the spectrums of the M blocks of the current frame are grouped and arranged based on the group quantity and the group indicator information of the current frame, to obtain grouped and arranged audio signals; and the grouped and arranged spectrum is encoded by using the encoding neural network. It can be ensured that when an audio signal of the current frame is a transient signal, an MDCT spectrum with a transient feature can be adjusted to a location of higher encoding importance, so that a transient feature of an audio signal reconstructed through encoding and decoding by using a neural network can be better retained.

This embodiment of the present disclosure may also be used for stereo encoding. A difference lies in that: First, a left sound channel and a right sound channel of stereo are separately processed by the encoder side according to steps S31 to 310 in the foregoing embodiment, to obtain an intra-group interleaved MDCT spectrum of the left sound channel and an intra-group interleaved MDCT spectrum of the right sound channel. Then, step S311 is changed to: encoding the intra-group interleaved MDCT spectrum of the left sound channel and the intra-group interleaved MDCT spectrum of the right sound channel by using the encoding neural network.

Input of the encoding neural network is no longer the intra-group interleaved MDCT spectrum of the mono channel, but the intra-group interleaved MDCT spectrum of the left sound channel and the intra-group interleaved MDCT spectrum of the right sound channel that are obtained by separately processing the left sound channel and the right sound channel of the stereo according to steps S31 to 310.

The encoding neural network may be a CNN, and the intra-group interleaved MDCT spectrum of the left sound channel and the intra-group interleaved MDCT spectrum of the right sound channel are used as input of two channels of the CNN.

Correspondingly, the process performed by the decoder side includes: decoding the received bitstream to obtain a window type, a group quantity, and group indicator information of the left sound channel of the current frame; decoding the received bitstream to obtain a window type, a group quantity, and group indicator information of the right sound channel of the current frame; decoding the received bitstream by using the decoding neural network, to obtain a decoded stereo MDCT spectrum; performing processing according to the step of mono decoding at the decoder side of Embodiment 1 based on the window type, the group quantity, and the group indicator information of the left sound channel of the current frame, and the decoded MDCT spectrum of the left sound channel, to obtain a reconstructed left sound channel signal; and performing processing according to the step of mono decoding at the decoder side of Embodiment 1 based on the window type, the group quantity, and the group indicator information of the right sound channel of the current frame, and the decoded MDCT spectrum of the right sound channel, to obtain a reconstructed right sound channel signal.

According to the method provided in this embodiment of the present disclosure, if the window type of the current frame is a short window, the group quantity and the group indicator information of the current frame are obtained based on the spectrums of the M blocks of the current frame; the spectrums of the M blocks of the current frame are grouped and arranged based on the group quantity and the group indicator information of the current frame, to obtain grouped and arranged audio signals; and the grouped and arranged spectrum is encoded by using the encoding neural network. It can be ensured that when an audio signal of the current frame is a transient signal, an MDCT spectrum with a transient feature can be adjusted to a location of higher encoding importance, so that a transient feature of an audio signal reconstructed through encoding and decoding by using a neural network can be better retained.

Figure 11:
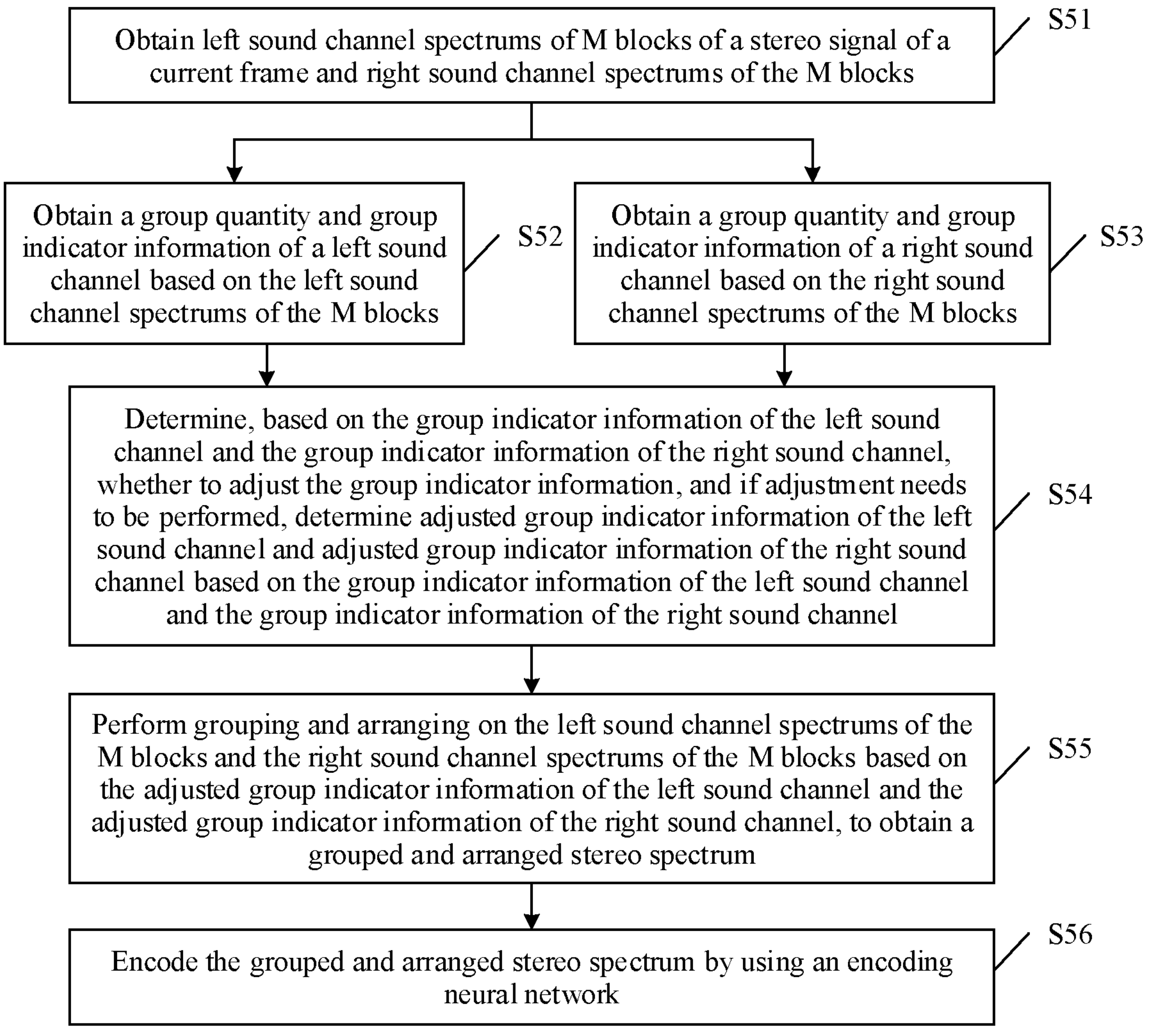
FIG. 11 is a schematic diagram of a multi-channel signal encoding method according to an embodiment of the present disclosure.

This embodiment of the present disclosure may also be used for stereo encoding. As shown in FIG. 11, an encoding procedure of adjusting group information of a left sound channel and group information of a right sound channel by using an encoder provided in embodiments of the present disclosure includes the following steps.

S51: Obtain left sound channel spectrums of M blocks of a stereo signal of a current frame and right sound channel spectrums of the M blocks.

Framing is performed on a stereo signal to obtain the stereo signal of the current frame. The stereo signal of the current frame includes a left sound channel signal of the current frame and a right sound channel signal of the current frame.

The left sound channel signal of the current frame is used as an audio signal of the current frame. A window type of the left sound channel signal of the current frame is determined by using the foregoing method in steps S11 and S12 of the encoder side shown in FIG. 7. If the window type of the left sound channel signal of the current frame is a short frame, short frame windowing is performed on the left sound channel signal of the current frame, and time-frequency transformation is performed, to obtain the left sound channel spectrums of the M blocks.

Similarly, the right sound channel signal of the current frame is used as an audio signal of the current frame. A window type of the right sound channel signal of the current frame is determined by using the foregoing methods in steps S11 and S12 of the encoder side shown in FIG. 7. If the window type of the right sound channel signal of the current frame is a short frame, short frame windowing is performed on the right sound channel signal of the current frame, and time-frequency transformation is performed, to obtain the right sound channel spectrums of the M blocks.

S52: Obtain a group quantity and group indicator information of the left sound channel based on the left sound channel spectrums of the M blocks.

If the window type of the left sound channel signal of the current frame is a short frame, the group quantity and the group indicator information of the left sound channel are obtained based on the left sound channel spectrums of the M blocks by using the foregoing method in step S13 of the encoder side shown in FIG. 7.

S53: Obtain a group quantity and group indicator information of the right sound channel based on the right sound channel spectrums of the M blocks.

If the window type of the right sound channel signal of the current frame is a short frame, the group quantity and the group indicator information of the right sound channel are obtained based on the right sound channel spectrums of the M blocks by using the foregoing method in step S13 of the encoder side shown in FIG. 7.

S54: Determine, based on the group indicator information of the left sound channel and the group indicator information of the right sound channel, whether to adjust the group indicator information, and if adjustment needs to be performed, determine adjusted group indicator information of the left sound channel and adjusted group indicator information of the right sound channel based on the group indicator information of the left sound channel and the group indicator information of the right sound channel.

When the group quantity of the left sound channel is equal to the group quantity of the right sound channel, an indicator value of the group indicator information of the left sound channel is inconsistent with an indicator value of the group indicator information of the right sound channel, and a quantity of transient blocks indicated by the group indicator information of the left sound channel is different from a quantity of transient blocks indicated by the group indicator information of the right sound channel, the group indicator information is adjusted based on the group indicator information of the left sound channel and the group indicator information of the right sound channel, to obtain the adjusted group indicator information. Otherwise, when the indicator value of the group indicator information of the left sound channel is completely consistent with the indicator value of the group indicator information of the right sound channel, or when the group indicator information of the left sound channel is inconsistent with the group indicator information of the right sound channel but the quantity of transient blocks of the left sound channel is the same as the quantity of transient blocks of the right sound channel, adjustment is not performed, and the group indicator information of the left sound channel and the group indicator information of the right sound channel are directly used as the adjusted group indicator information of the left sound channel and the adjusted group indicator information of the right sound channel.

Complete consistency means that the indicator values are equal. Inconsistency includes not complete consistency or complete inconsistency, and means that some are equal and some are unequal or means that all are unequal. Comparison is based on corresponding locations. For example, 1 1 1 0 0 0 1 1 and 1 1 1 0 0 0 0 1 indicate not complete consistency. 1 1 1 0 0 0 1 1 and 1 1 1 0 0 0 1 1 indicate complete consistency. 1 1 1 0 0 0 1 1 and 0 0 0 1 1 1 0 0 indicate complete inconsistency.

A specific adjustment method may be: performing AND calculation on the group indicator information of the left sound channel and the group indicator information of the right sound channel according to corresponding bits, and using a result as values of the corresponding bits in the adjusted group indicator information of the left sound channel and the adjusted group indicator information of the right sound channel.

In another implementation, whether to compare the group indicator information of the left sound channel and the group indicator information of the right sound channel is first determined based on the group quantity of the left sound channel and the group quantity of the right sound channel. If the group quantity of the left sound channel and the group quantity of the right sound channel are both equal to 2, the group indicator information of the left sound channel and the group indicator information of the right sound channel are further compared to determine whether to adjust the group indicator information. Otherwise, the group indicator information does not need to be adjusted.

The adjusted group indicator information of the left sound channel and the adjusted group indicator information of the right sound channel are encoded, written into a bitstream, and then transmitted to a decoder side.

S55: Perform grouping and arranging on the left sound channel spectrums of the M blocks and the right sound channel spectrums of the M blocks based on the adjusted group indicator information of the left sound channel and the adjusted group indicator information of the right sound channel, to obtain a grouped and arranged stereo spectrum.

A specific method for grouping and arranging is the same as step S14 shown in FIG. 7. Grouping and arranging are performed on the left sound channel spectrums of the M blocks and the right sound channel spectrums of the M blocks based on the adjusted group indicator information, to obtain grouped and arranged left sound channel spectrums and grouped and arranged right sound channel spectrums.

S56: Encode the grouped and arranged stereo spectrum by using an encoding neural network.

In one method, intra-group interleaving is performed on the grouped and arranged left sound channel spectrums based on the adjusted group indicator information, to obtain an intra-group interleaved left sound channel spectrum. Similarly, intra-group interleaving is performed on the grouped and arranged right sound channel spectrums based on the adjusted group indicator information, to obtain an intra-group interleaved right sound channel spectrum. Then, an intra-group interleaved stereo spectrum is encoded by using the encoding neural network, and written into the bitstream.

The encoding neural network used for stereo encoding may be a CNN, and the left sound channel spectrums and the right sound channel spectrums are each used as an input signal of a channel of the CNN.

Figure 12:
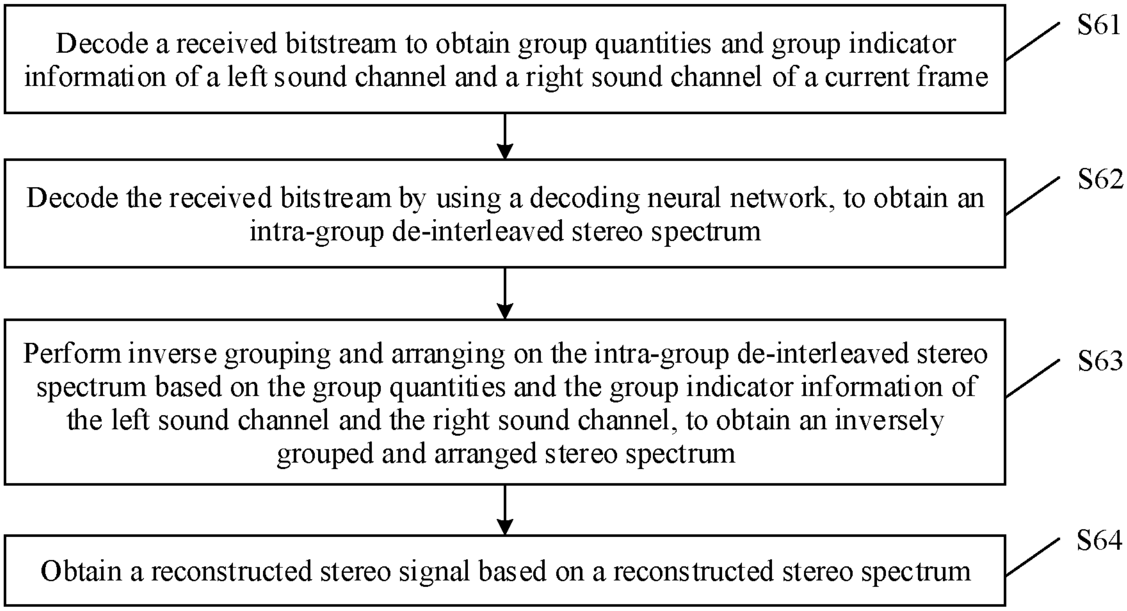
FIG. 12 is a schematic diagram of a multi-channel signal decoding method according to an embodiment of the present disclosure.

As shown in FIG. 12, a decoding procedure corresponding to an encoder side shown in FIG. 11 includes the following steps.

S61: Decode a received bitstream to obtain group quantities and group indicator information of a left sound channel and a right sound channel of a current frame.

The received bitstream is decoded to obtain a window type of the left sound channel and a window type of the right sound channel of the current frame. If the window type of the left sound channel of the current frame is a short frame, the received bitstream is decoded to obtain a group quantity and group indicator information of the left sound channel. If the window type of the right sound channel of the current frame is a short frame, the received bitstream is decoded to obtain a group quantity and group indicator information of the right sound channel.

S62: Decode the received bitstream by using a decoding neural network, to obtain an intra-group de-interleaved stereo spectrum.

A decoder side corresponds to an encoder side. The method specifically includes the following steps.

First, the received bitstream is decoded by using the decoding neural network, to obtain a left sound channel decoded spectrum and a right sound channel decoded spectrum.

Then, spectrums belonging to one group in the left sound channel decoded spectrum may be determined based on the group quantity and the group indicator information of the left sound channel. Intra-group de-interleaving is performed on the spectrums belonging to one group, to obtain an intra-group de-interleaved left sound channel spectrum. Similarly, spectrums belonging to one group in the right sound channel decoded spectrum may be determined based on the group quantity and the group indicator information of the right sound channel. Intra-group de-interleaving is performed on the spectrums belonging to one group, to obtain an intra-group de-interleaved right sound channel spectrum. De-interleaving is the same as de-interleaving of the encoder side.

S63: Perform inverse grouping and arranging on the intra-group de-interleaved stereo spectrum based on the group quantities and the group indicator information of the left sound channel and the right sound channel, to obtain an inversely grouped and arranged stereo spectrum.

Inverse grouping and arranging is performed on the intra-group de-interleaved left sound channel spectrum based on the group quantity and the group indicator information of the left sound channel, to obtain an inversely grouped and arranged left sound channel spectrum. Similarly, inverse grouping and arranging is performed on the intra-group de-interleaved right sound channel spectrums based on the group quantity and the group indicator information of the right sound channel, to obtain inversely grouped and arranged right sound channel spectrums. A specific method for inverse grouping and arranging is an inverse process of the foregoing grouping and arranging in step S55 of the encoder side shown in FIG. 11.

S64: Obtain a reconstructed stereo signal based on a reconstructed stereo spectrum.

A reconstructed left sound channel signal is obtained based on a reconstructed left sound channel spectrum. A reconstructed right sound channel signal is obtained based on a reconstructed right sound channel spectrum. A specific method for obtaining the reconstructed stereo signal based on the spectrums of the left sound channel and the right sound channel is an inverse process of the foregoing encoding in step S56 of the encoder side shown in FIG. 11.

In the foregoing embodiment, when the window type of the left sound channel and the window type of the right sound channel of the stereo signal are both short windows, but the group indicator information of the left sound channel is inconsistent with the group indicator information of the right sound channel, after encoding and decoding by using a neural network for blocks with inconsistent group indicator values of the left sound channel and the right sound channel, a transient feature of the reconstructed audio signal cannot be well restored. Therefore, an embodiment of the present disclosure further includes a solution of performing grouping adjustment of a left sound channel and a right sound channel on a stereo signal.

Figure 13:
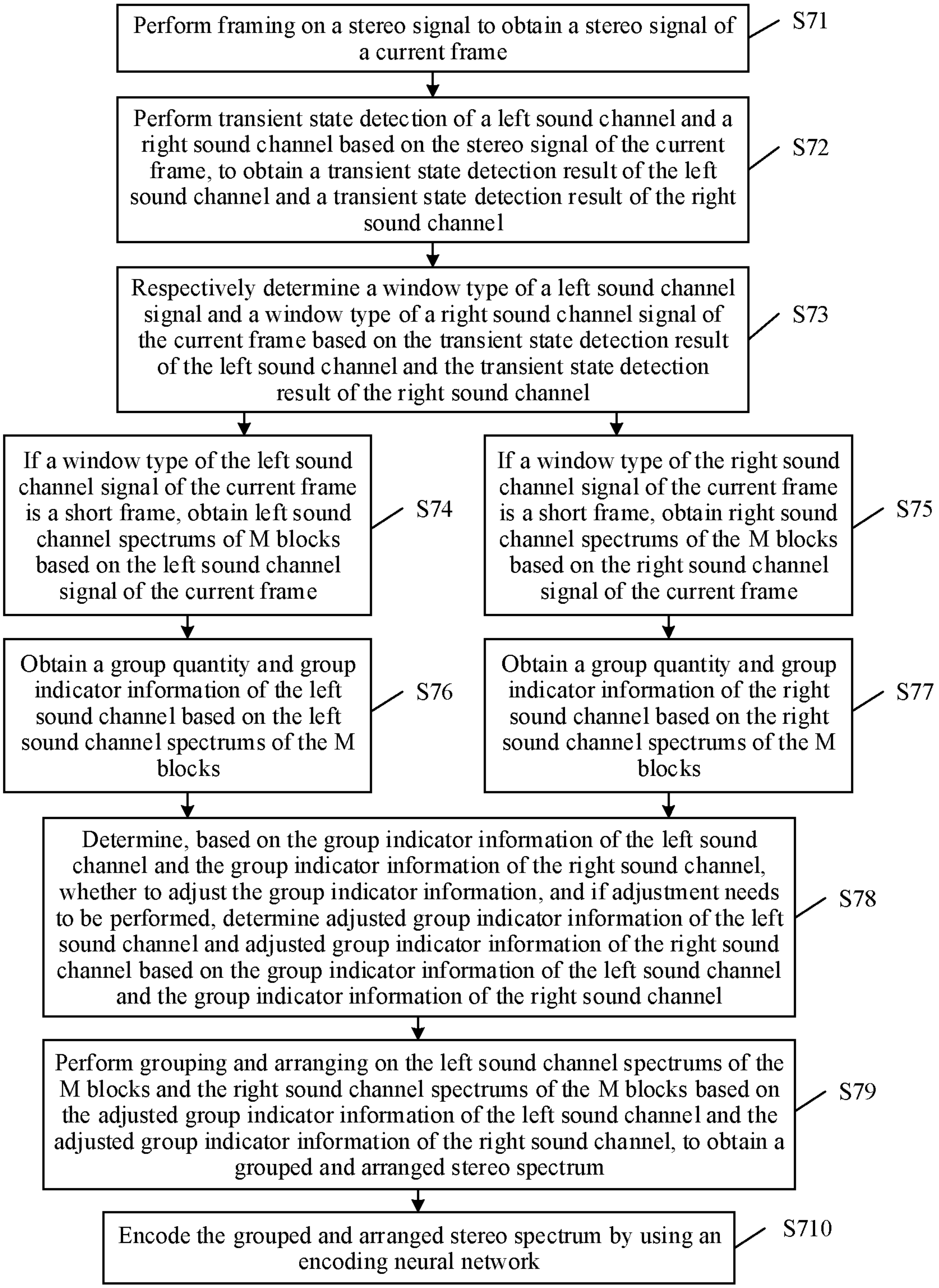
FIG. 13 is a schematic diagram of a multi-channel signal encoding method according to an embodiment of the present disclosure.

In an embodiment of the present disclosure, an encoding method is shown in FIG. 13.

S71: Perform framing on a stereo signal to obtain a stereo signal of a current frame.

The stereo signal of the current frame includes a left sound channel signal of the current frame and a right sound channel signal of the current frame.

S72: Perform transient state detection of a left sound channel and a right sound channel based on the stereo signal of the current frame, to obtain a transient state detection result of the left sound channel and a transient state detection result of the right sound channel.

A specific method for transient state detection of the left sound channel and the right sound channel is the same as step S12 shown in FIG. 7.

S73: Respectively determine a window type of the left sound channel signal and a window type of the right sound channel signal of the current frame based on the transient state detection result of the left sound channel and the transient state detection result of the right sound channel.

A method for determining the window type based on the transient state detection result is the same as step S13 shown in FIG. 7.

S74: If a window type of the left sound channel signal of the current frame is a short frame, obtain left sound channel spectrums of M blocks based on the left sound channel signal of the current frame.

If the window type of the left sound channel signal of the current frame is a short frame, short frame windowing is performed on the left sound channel signal of the current frame, and MDCT transformation is performed, to obtain the left sound channel MDCT spectrums of the M blocks. Interleaving is performed on the left sound channel MDCT spectrums of the current frame, to obtain an interleaved left sound channel MDCT spectrum. Encoding preprocessing is performed on the interleaved left sound channel MDCT spectrum, to obtain a preprocessed left sound channel MDCT spectrum. Preprocessing may include FDNS, TNS, BWE, and other processing. De-interleaving is performed on the preprocessed left sound channel MDCT spectrum, to obtain the left sound channel MDCT spectrums of the M blocks.

S75: If a window type of the right sound channel signal of the current frame is a short frame, obtain right sound channel spectrums of M blocks based on the right sound channel signal of the current frame.

If the window type of the right sound channel signal of the current frame is a short window, short frame windowing is performed on the right sound channel signal of the current frame, and MDCT transformation is performed, to obtain the right sound channel MDCT spectrums of the M blocks. Interleaving is performed on the right sound channel MDCT spectrums of the current frame, to obtain an interleaved right sound channel MDCT spectrum. Encoding preprocessing is performed on the interleaved right sound channel MDCT spectrum, to obtain a preprocessed right sound channel MDCT spectrum. Preprocessing may include FDNS, TNS, BWE, and other processing. De-interleaving is performed on the preprocessed right sound channel MDCT spectrum, to obtain the right sound channel MDCT spectrums of the M blocks.

S76: Obtain a group quantity and group indicator information of the left sound channel based on the left sound channel spectrums of the M blocks.

A specific method for obtaining the group quantity and the group indicator information is the same as step S18 shown in FIG. 7.

S77: Obtain a group quantity and group indicator information of the right sound channel based on the right sound channel spectrums of the M blocks.

A specific method for obtaining the group quantity and the group indicator information is the same as step S18 shown in FIG. 7.

S78: Determine, based on the group indicator information of the left sound channel and the group indicator information of the right sound channel, whether to adjust the group indicator information, and if adjustment needs to be performed, determine adjusted group indicator information of the left sound channel and adjusted group indicator information of the right sound channel based on the group indicator information of the left sound channel and the group indicator information of the right sound channel.

Case 1: If the group indicator information of the left sound channel and the group indicator information of the right sound channel indicate that locations of spectral blocks included in a transient group of the left sound channel are completely the same as locations of spectral blocks included in a transient group of the right sound channel, the group indicator information of the left sound channel and the group indicator information of the right sound channel are not adjusted. In other words, if a quantity of the blocks included in the transient group of the left sound channel is the same as a quantity of the blocks included in the transient group of the right sound channel, and the locations of the blocks included in the transient group of the left sound channel are the same as the locations of the blocks included in the transient group of the right sound channel, the group indicator information of the left sound channel and the group indicator information of the right sound channel are not adjusted.

Examples are as follows: group indicator information of the left sound channel: 1 1 1 1 1 1 0 0; and group indicator information of the right sound channel: 1 1 1 1 1 1 0 0.

The foregoing group information indicates that the locations of the spectral blocks included in the transient group of the left sound channel completely overlap the locations of the spectral blocks included in the transient group of the right sound channel. In this case, the group information of the left sound channel and the group information of the right sound channel do not need to be adjusted.

Case 2: If a quantity of blocks included in a transient group of the left sound channel is the same as a quantity of blocks included in a transient group of the right sound channel, the group indicator information of the left sound channel and the group indicator information of the right sound channel are not adjusted. In other words, if the quantity of the blocks included in the transient group of the left sound channel is the same as the quantity of the blocks included in the transient group of the right sound channel, and locations of the blocks included in the transient group of the left sound channel are inconsistent with locations of the blocks included in the transient group of the right sound channel, the group indicator information of the left sound channel and the group indicator information of the right sound channel are not adjusted.

Examples are as follows: group indicator information of the left sound channel: 0 0 0 1 1 1 1 1; and group indicator information of the right sound channel: 1 1 1 1 1 0 0 0.

The foregoing group information indicates that the quantity of the blocks included in the transient group of the left sound channel is the same as the quantity of the blocks included in the transient group of the right sound channel, but the locations of the blocks included in the transient group of the left sound channel are inconsistent with the locations of the blocks included in the transient group of the right sound channel. In this case, the group indicator information of the left sound channel and the group indicator information of the right sound channel do not need to be adjusted.

In the following cases 3 and 4, if a quantity of transient blocks included in the transient group of the left sound channel is different from a quantity of transient blocks included in the transient group of the right sound channel, the group indicator information of at least one of the left sound channel and the right sound channel needs to be adjusted. In the following case 3, the group indicator information of one of the left sound channel and the right sound channel is adjusted. In case 4, the group indicator information of one of the left sound channel and the right sound channel is adjusted, or the group indicator information of both sound channels is adjusted.

Case 3: If the group indicator information of the left sound channel and the group indicator information of the right sound channel indicate that a quantity of blocks included in a transient group of the left sound channel is different from a quantity of blocks included in a transient group of the right sound channel, and locations of the blocks included in the transient group of the left sound channel are completely different from locations of the blocks included in the transient group of the right sound channel, the group indicator information of a channel whose transient group includes a smaller quantity of blocks is adjusted, to ensure that the quantity of the blocks included in the transient group of the left sound channel is the same as the quantity of the blocks included in the transient group of the right sound channel.

Examples are as follows: group indicator information groupIndicator_L of the left sound channel: 00011111; and group indicator information groupIndicator_R of the right sound channel: 11110000.

The group indicator information of the left sound channel is adjusted, so that the quantity of the blocks in the transient group of the left sound channel is the same as the quantity of the blocks in the transient group of the right sound channel. For example, a transient identifier of a block whose left sound channel sequence number is 3 (the sequence number starts from 0) may be changed to a transient state. In this case, the adjusted group information is as follows: group indicator information groupIndicator_L of the left sound channel: 0 0 0 0 1 1 1 1; and group indicator information groupIndicator_R of the right sound channel: 1 1 1 1 0 0 0 0.

Through the foregoing adjustment, it can be ensured that the quantity of the blocks in the transient group of the left sound channel is the same as the quantity of the blocks in the transient group of the right sound channel.

Case 4: If the group indicator information of the left sound channel and the group indicator information of the right sound channel indicate that a quantity of blocks included in a transient group of the left sound channel is different from a quantity of blocks included in a transient group of the right sound channel, and locations of the blocks included in the transient group of the left sound channel are not exactly the same as locations of the blocks included in the transient group of the right sound channel, that is, the locations of the spectral blocks included in the transient group of the left sound channel are only partially different from the locations of the spectral blocks included in the transient group of the right sound channel, the group information needs to be adjusted. An adjustment manner may be performing union processing on the transient groups of the left sound channel and the right sound channel, that is, expanding a range of the transient groups.

For example, sequence numbers of the group indicator information of the left sound channel and the right sound channel start from 0, and the group information of the right sound channel needs to be adjusted as follows: group indicator information groupIndicator_L of the left sound channel: 1 1 1 0 0 0 0 1; and group indicator information groupIndicator_R of the right sound channel: 1 1 1 0 0 0 1.

Union processing is performed on the transient groups of the left sound channel and the right sound channel, that is, the range of the transient groups is expanded. In the foregoing example, the adjusted group information is as follows: group indicator information groupIndicator_L of the left sound channel: 1 1 1 0 0 0 0 1; and group indicator information groupIndicator_R of the right sound channel: 1 11 0 0 0 0 1.

A block with a sequence number 3 in the right sound channel is adjusted from a non-transient group to a transient group, so that the quantity of the transient blocks of the left sound channel is the same as the quantity of the transient blocks of the right sound channel, that is, the locations of the spectral blocks included in the transient group of the left sound channel remain consistent with the locations of the spectral blocks included in the right sound channel. The adjusted group indicator information of the left sound channel and the adjusted group indicator information of the right sound channel are encoded, written into a bitstream, and then transmitted to a decoder side.

For example, the group information of the left sound channel and the group information of the right sound channel need to be adjusted as follows: group indicator information groupIndicator_L of the left sound channel: 1 1 0 0 0 0 1 1; and group indicator information groupIndicator_R of the right sound channel: 1 1 1 1 0 0 0 1.

Union processing is performed on the transient groups of the left sound channel and the right sound channel, that is, the range of the transient groups is expanded. In the foregoing example, the adjusted group information is as follows: group indicator information groupIndicator_L of the left sound channel: 1 1 0 0 0 0 0 1; and group indicator information groupIndicator_R of the right sound channel: 1 1 0 0 0 0 0 1.

S79: Perform grouping and arranging on the left sound channel spectrums of the M blocks and the right sound channel spectrums of the M blocks based on the adjusted group indicator information of the left sound channel and the adjusted group indicator information of the right sound channel, to obtain a grouped and arranged stereo spectrum.

A specific method for grouping and arranging is the same as step S14 shown in FIG. 7. Grouping and arranging are performed on the left sound channel spectrums of the M blocks and the right sound channel spectrums of the M blocks based on the adjusted group indicator information, to obtain grouped and arranged left sound channel spectrums and grouped and arranged right sound channel spectrums.

S710: Encode the grouped and arranged stereo spectrum by using an encoding neural network, and write an encoding result into the bitstream.

In one method, intra-group interleaving is performed on the grouped and arranged left sound channel spectrums based on the adjusted group indicator information, to obtain an intra-group interleaved left sound channel spectrum. Similarly, intra-group interleaving is performed on the grouped and arranged right sound channel spectrums based on the adjusted group indicator information, to obtain an intra-group interleaved right sound channel spectrum. Then, the intra-group interleaved stereo spectrum is encoded by using the encoding neural network.

The encoding neural network used for stereo encoding may be a CNN, and the left sound channel spectrums and the right sound channel spectrums are each used as an input signal of a channel of the CNN.

Figure 14A:
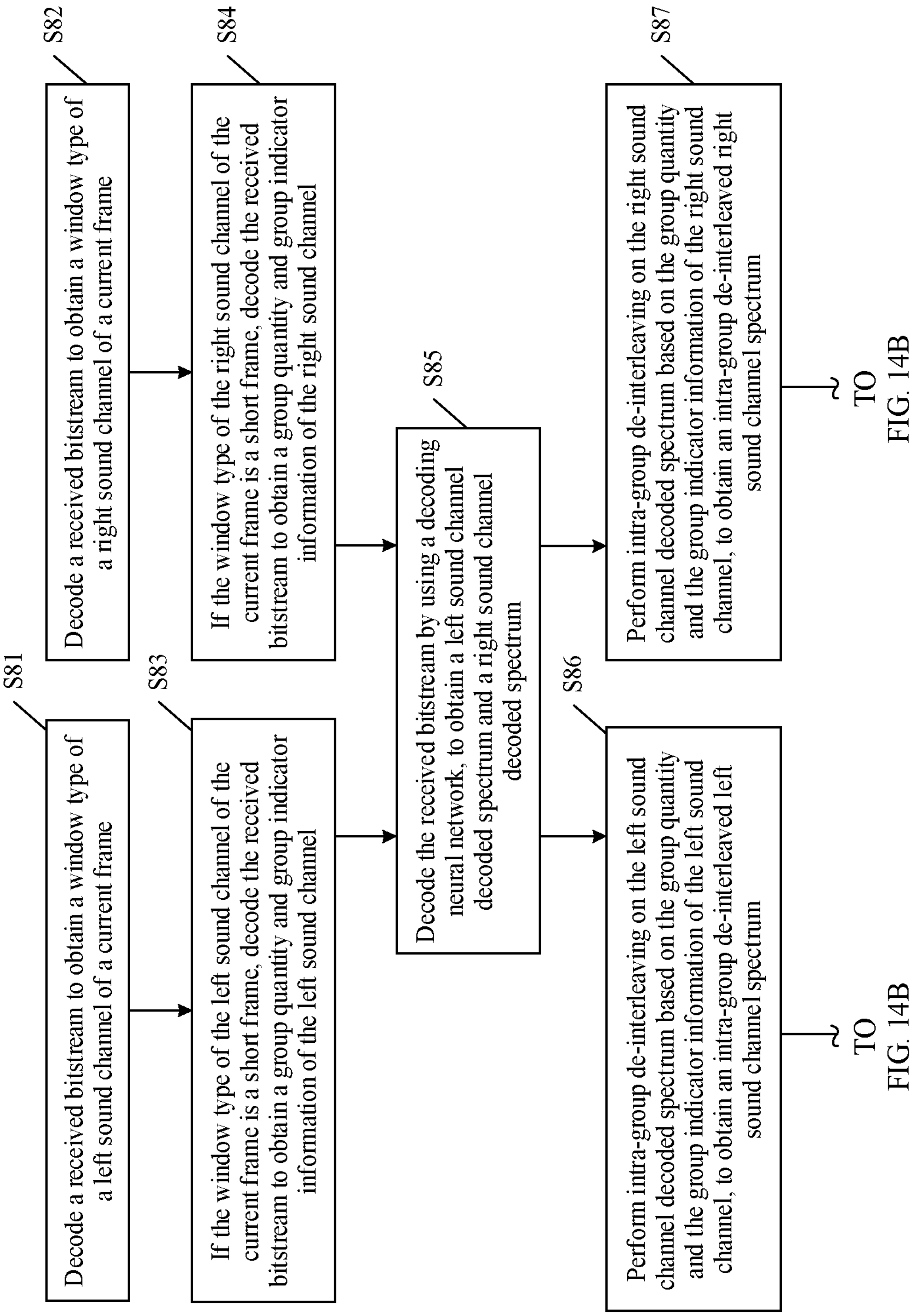
FIG. 14A and FIG. 14B are a schematic diagram of a multi-channel signal decoding method according to an embodiment of the present disclosure.
Figure 14B:
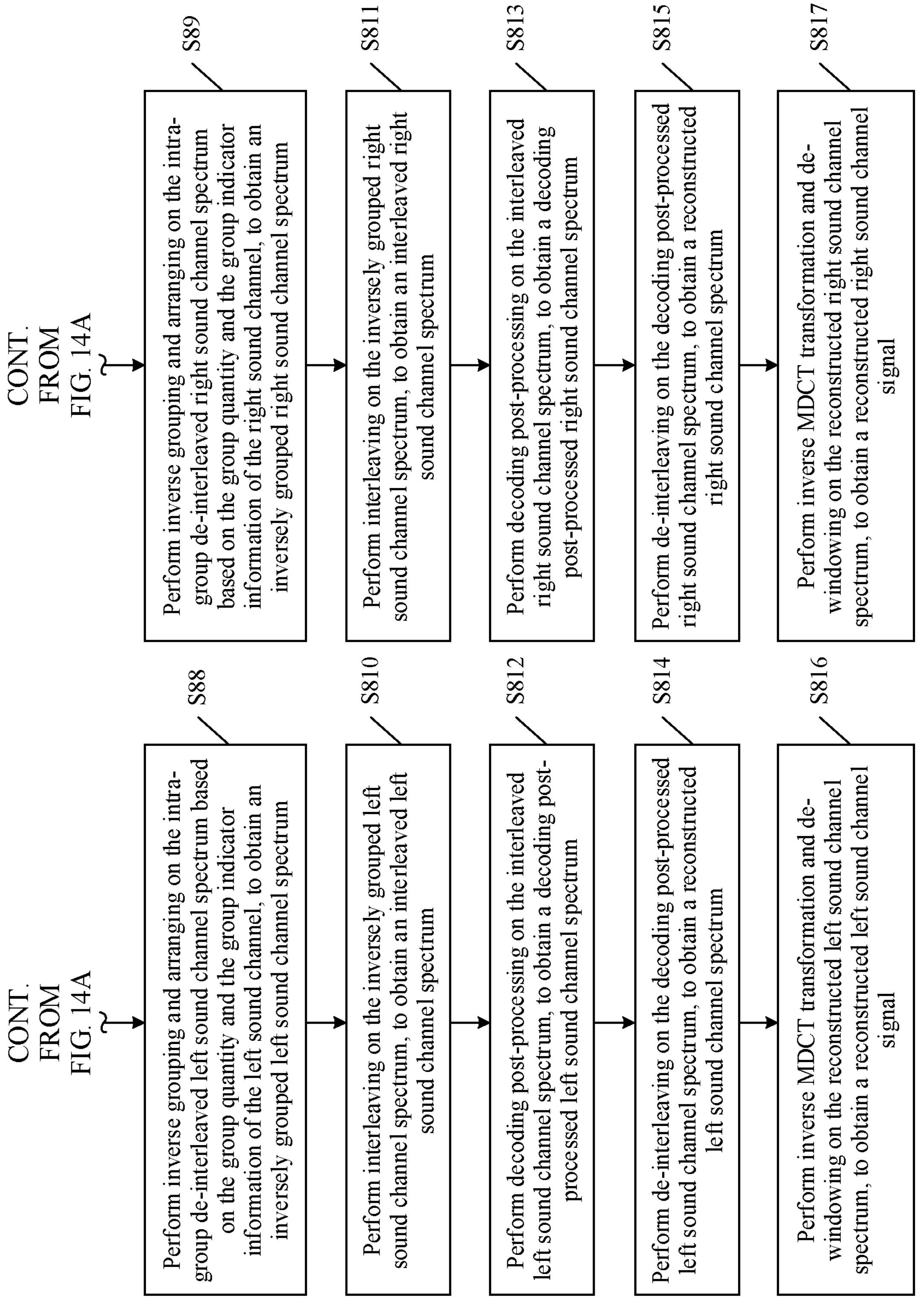

In some embodiments of the present disclosure, a decoding method is shown in FIG. 14A and FIG. 14B, and mainly includes the following steps.

S81: Decode a received bitstream to obtain a window type of a left sound channel of a current frame.

S82: Decode a received bitstream to obtain a window type of a right sound channel of the current frame.

S83: If the window type of the left sound channel of the current frame is a short frame, decode the received bitstream to obtain a group quantity and group indicator information of the left sound channel.

S84: If the window type of the right sound channel of the current frame is a short frame, decode the received bitstream to obtain a group quantity and group indicator information of the right sound channel.

S85: Decode the received bitstream by using a decoding neural network, to obtain a left sound channel decoded spectrum and a right sound channel decoded spectrum.

S86: Perform intra-group de-interleaving on the left sound channel decoded spectrum based on the group quantity and the group indicator information of the left sound channel, to obtain an intra-group de-interleaved left sound channel spectrum.

Then, spectrums belonging to one group in the left sound channel decoded spectrum may be determined based on the group quantity and the group indicator information of the left sound channel. Intra-group de-interleaving is performed on the spectrums belonging to one group, to obtain an intra-group de-interleaved left sound channel spectrum.

S87: Perform intra-group de-interleaving on the right sound channel decoded spectrum based on the group quantity and the group indicator information of the right sound channel, to obtain an intra-group de-interleaved right sound channel spectrum.

Similarly, spectrums belonging to one group in the right sound channel decoded spectrum may be determined based on the group quantity and the group indicator information of the right sound channel. Intra-group de-interleaving is performed on the spectrums belonging to one group, to obtain an intra-group de-interleaved right sound channel spectrum. De-interleaving is the same as de-interleaving of an encoder side.

S88: Perform inverse grouping and arranging on the intra-group de-interleaved left sound channel spectrum based on the group quantity and the group indicator information of the left sound channel, to obtain an inversely grouped left sound channel spectrum.

A specific method for inverse grouping and arranging is the same as step S24 shown in FIG. 8.

S89: Perform inverse grouping and arranging on the intra-group de-interleaved right sound channel spectrum based on the group quantity and the group indicator information of the right sound channel, to obtain an inversely grouped right sound channel spectrum.

A specific method for inverse grouping and arranging is the same as step S24 shown in FIG. 8.

S810: Perform interleaving on the inversely grouped left sound channel spectrum, to obtain an interleaved left sound channel spectrum.

If the window type of the left sound channel of the current frame is a short frame, interleaving is performed on the inversely grouped and arranged left sound channel spectrum.

S811: Perform interleaving on the inversely grouped right sound channel spectrum, to obtain an interleaved right sound channel spectrum.

If the window type of the right sound channel of the current frame is a short frame, interleaving is performed on the inversely grouped right sound channel spectrum.

S812: Perform decoding post-processing on the interleaved left sound channel spectrum, to obtain a decoding post-processed left sound channel spectrum.

S813: Perform decoding post-processing on the interleaved right sound channel spectrum, to obtain a decoding post-processed right sound channel spectrum.

Decoding post-processing may include BWE, TNS inverse processing, FDNS inverse processing, and other processing.

S814: Perform de-interleaving on the decoding post-processed left sound channel spectrum, to obtain a reconstructed left sound channel spectrum.

S815: Perform de-interleaving on the decoding post-processed right sound channel spectrum, to obtain a reconstructed right sound channel spectrum.

S816: Perform inverse MDCT transformation and de-windowing on the reconstructed left sound channel spectrum, to obtain a reconstructed left sound channel signal.

S817: Perform inverse MDCT transformation and de-windowing on the reconstructed right sound channel spectrum, to obtain a reconstructed right sound channel signal.

In this embodiment of the present disclosure, the group indicator information of the left sound channel and the group indicator information of the right sound channel are adjusted, to obtain adjusted group indicator information of the left sound channel and adjusted group indicator information of the right sound channel. Grouping and arranging are performed on the left sound channel spectrums of the M blocks and the right sound channel spectrums of the M blocks based on the adjusted group indicator information of the left sound channel and the adjusted group indicator information of the right sound channel, to obtain a grouped and arranged stereo spectrum. The group indicator information of the left sound channel and the group indicator information of the right sound channel are adjusted, to ensure that groups of the left sound channel remain consistent with groups of the right sound channel when the grouped and arranged stereo spectrum is used as input of the encoding neural network, so that transient features of the left sound channel and the right sound channel of the reconstructed stereo signal can be well restored.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. It should be further appreciated by a person skilled in the art that embodiments described in this specification all belong to embodiments, and the involved actions and modules are not necessarily required by the present disclosure.

To better implement the solutions of embodiments of the present disclosure, a related apparatus for implementing the solutions is further provided below.

Figure 15:
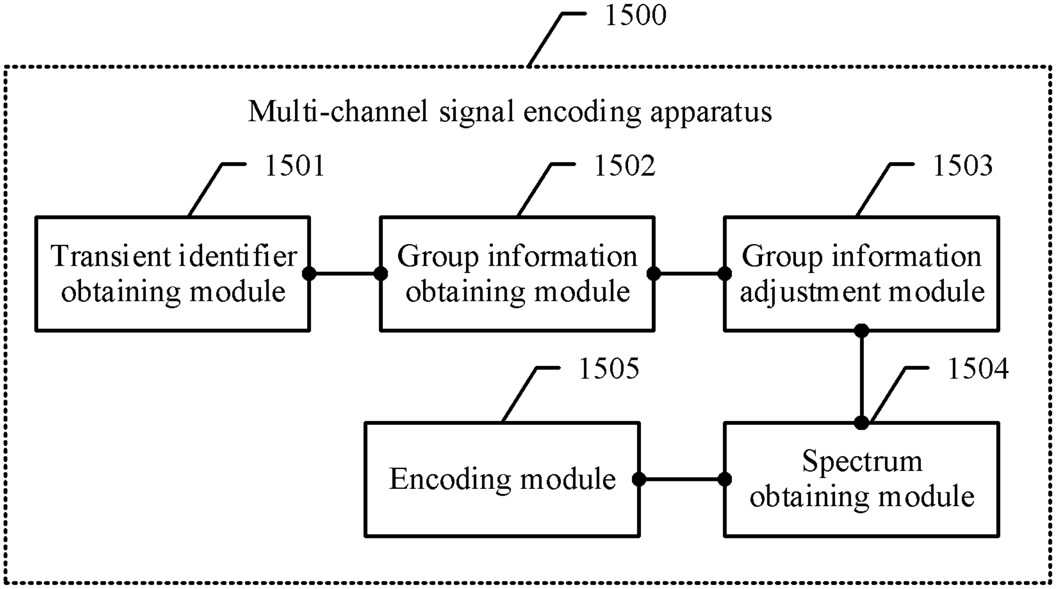
FIG. 15 is a schematic diagram of a composition structure of a multi-channel signal encoding apparatus according to an embodiment of the present disclosure.

As shown in FIG. 15, an embodiment of the present disclosure provides a multi-channel signal encoding apparatus 1500. The apparatus may include: a transient identifier obtaining module 1501, a group information obtaining module 1502, a group information adjustment module 1503, a spectrum obtaining module 1504, and an encoding module 1505.

The transient identifier obtaining module is configured to obtain M first transient identifiers of M blocks of a first sound channel of a current frame of a to-be-encoded multi-channel signal based on spectrums of the M blocks of the first sound channel, where the M blocks of the first sound channel include a first block of the first sound channel, and a first transient identifier of the first block indicates that the first block is a transient block or indicates that the first block is a non-transient block.

The group information obtaining module is configured to obtain first group information of the M blocks of the first sound channel based on the M first transient identifiers.

The transient identifier obtaining module is configured to obtain M second transient identifiers of M blocks of a second sound channel of the current frame based on spectrums of the M blocks of the second sound channel, where the M blocks of the second sound channel include a second block of the second sound channel, and a second transient identifier of the second block indicates that the second block is a transient block or indicates that the second block is a non-transient block.

The group information obtaining module is configured to obtain second group information of the M blocks of the second sound channel based on the M second transient identifiers.

The group information adjustment module is configured to: when the first group information and the second group information meet a preset condition, obtain first adjusted group information and second adjusted group information based on the first group information and the second group information, where the first adjusted group information corresponds to the first group information, and the second adjusted group information corresponds to the second group information; and the first adjusted group information is the same as the first group information, and the second adjusted group information is obtained by adjusting the second group information; or the first adjusted group information is obtained by adjusting the first group information, and the second adjusted group information is the same as the second group information; or the first adjusted group information is obtained by adjusting the first group information, and the second adjusted group information is obtained by adjusting the second group information.

The spectrum obtaining module is configured to obtain a first to-be-encoded spectrum based on the first adjusted group information and the spectrums of the M blocks of the first sound channel.

The spectrum obtaining module is configured to obtain a second to-be-encoded spectrum based on the second adjusted group information and the spectrums of the M blocks of the second sound channel.

The encoding module is configured to encode the first to-be-encoded spectrum and the second to-be-encoded spectrum by using an encoding neural network, to obtain a spectrum encoding result; and write the spectrum encoding result into a bitstream.

Figure 16:
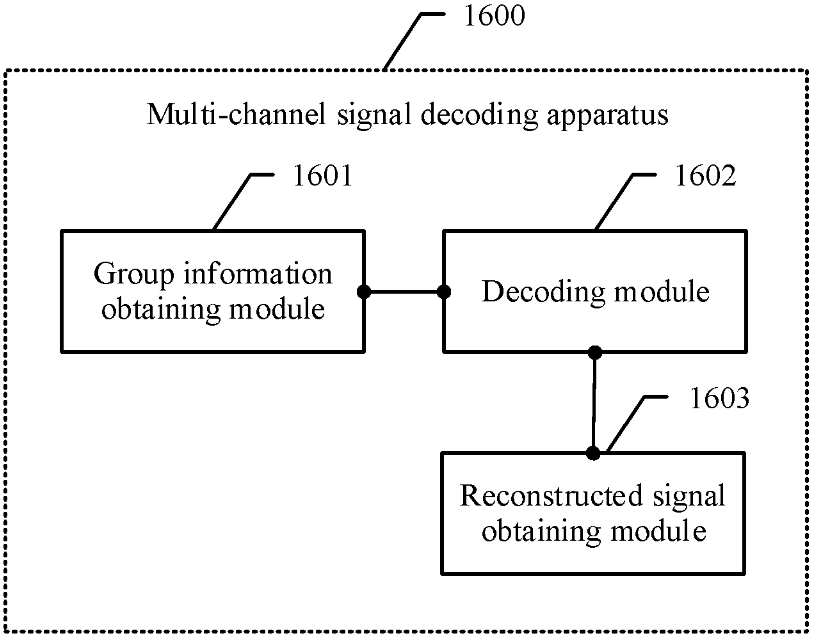
FIG. 16 is a schematic diagram of a composition structure of a multi-channel signal decoding apparatus according to an embodiment of the present disclosure.

As shown in FIG. 16, an embodiment of the present disclosure provides a multi-channel signal decoding apparatus 1600. The apparatus may include: a group information obtaining module 1601, a decoding module 1602, a spectrum obtaining module 1603, and a reconstructed signal obtaining module 1604.

The group information obtaining module is configured to obtain first decoded group information of M blocks of a first sound channel of a current frame of a multi-channel signal from a bitstream, where the first decoded group information indicates first decoded transient identifiers of the M blocks of the first sound channel.

The group information obtaining module is configured to obtain second decoded group information of M blocks of a second sound channel of the current frame from the bitstream, where the second decoded group information indicates second decoded transient identifiers of the M blocks of the second sound channel.

The decoding module is configured to decode the bitstream by using a decoding neural network, to obtain decoded spectrums of the M blocks of the first sound channel and decoded spectrums of the M blocks of the second sound channel.

The reconstructed signal obtaining module is configured to obtain a first reconstructed signal of the first sound channel based on the first decoded group information and the decoded spectrums of the M blocks of the first sound channel.

The reconstructed signal obtaining module is configured to obtain a second reconstructed signal of the second sound channel based on the second decoded group information and the decoded spectrums of the M blocks of the second sound channel.

It should be noted that, content such as information exchange between the modules/units of the apparatus and the execution processes thereof is based on the same idea as the method embodiments of the present disclosure, and produces the same technical effects as the method embodiments of the present disclosure. For specific content, refer to the foregoing descriptions in the method embodiments of the present disclosure.

An embodiment of the present disclosure further provides a computer storage medium. The computer storage medium stores a program, and the program performs a part or all of the steps described in the foregoing method embodiments.

Figure 17:
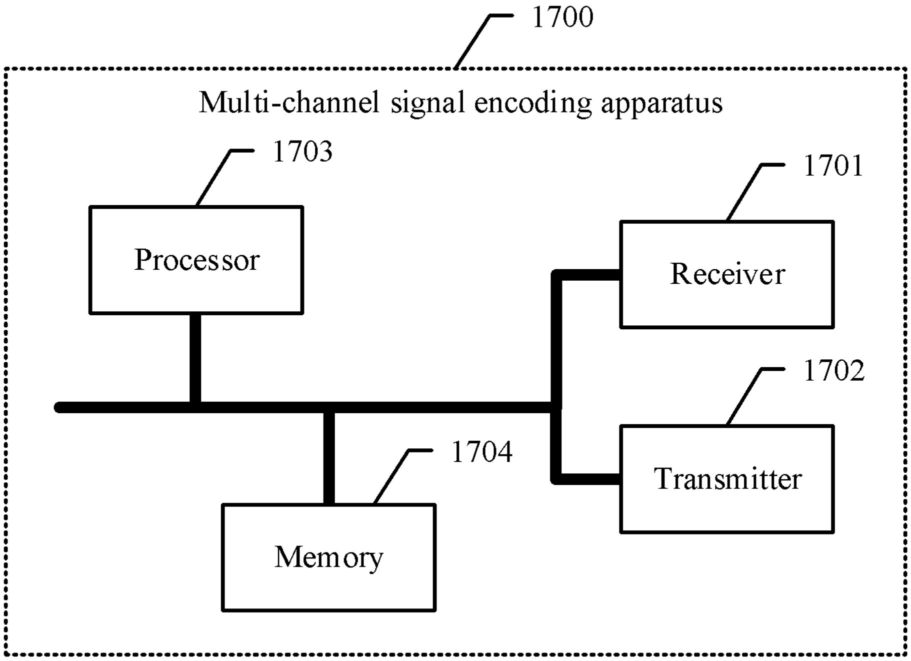
FIG. 17 is a schematic diagram of a composition structure of another multi-channel signal encoding apparatus according to an embodiment of the present disclosure.

The following describes another multi-channel signal encoding apparatus provided in an embodiment of the present disclosure. As shown in FIG. 17, the multi-channel signal encoding apparatus 1700 includes: a receiver 1701, a transmitter 1702, a processor 1703, and a memory 1704. (there may be one or more processors 1703 in the multi-channel signal encoding apparatus 1700, and one processor is used as an example in FIG. 17). In some embodiments of the present disclosure, the receiver 1701, the transmitter 1702, the processor 1703, and the memory 1704 may be connected through a bus or in another manner, and a connection through the bus is used as example in FIG. 17.

The memory 1704 may include a read-only memory (ROM) and a random-access memory (RAM), and provide instructions and data for the processor 1703. A part of the memory 1704 may further include a nonvolatile RAM (NVRAM). The memory 1704 stores an operating system and operation instructions, an executable module or a data structure, a subset thereof, or an extended set thereof. The operation instructions may include various operation instructions to implement various operations. The operating system may include various system programs, to implement various basic services and process a hardware-based task.

The processor 1703 controls an operation of the multi-channel signal encoding apparatus. The processor 1703 may also be referred to as a central processing unit (CPU). In a specific application, components of the multi-channel signal encoding apparatus are coupled together through a bus system. In addition to a data bus, the bus system includes a power bus, a control bus, and a status signal bus. However, for clear description, various types of buses in the figure are marked as the bus system.

The methods disclosed in the foregoing embodiments of the present disclosure may be applied to the processor 1703 or may be implemented by the processor 1703. The processor 1703 may be an integrated circuit chip, and has a signal processing capability. In an implementation process, steps in the methods may be implemented by using a hardware integrated logic circuit in the processor 1703, or by using instructions in a form of software. The processor 1703 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, steps, and logical block diagrams that are disclosed in embodiments of the present disclosure. The general-purpose processor may be a microprocessor, or the processor may be any conventional processor or the like. The steps in the methods disclosed with reference to embodiments of the present disclosure may be directly performed and completed by a hardware decoding processor, or may be performed and completed by a combination of hardware and a software module in the decoding processor. The software module may be located in a mature storage medium in the art, such as a RAM, a flash memory, a ROM, a programmable ROM, an electrically erasable programmable memory, or a register. The storage medium is located in the memory 1704, and the processor 1703 reads information in the memory 1704 and completes the steps in the foregoing methods in combination with hardware of the processor 1703.

The receiver 1701 may be configured to receive input digital or character information, and generate signal input related to a related setting and function control of the multi-channel signal encoding apparatus. The transmitter 1702 may include a display device such as a display, and the transmitter 1702 may be configured to output digital or character information through an external interface.

In this embodiment of the present disclosure, the processor 1703 is configured to perform the methods performed by the multi-channel signal encoding apparatus shown in FIG. 4, FIG. 7, FIG. 9A and FIG. 9B, FIG. 11, and FIG. 13 in the foregoing embodiments.

Figure 18:
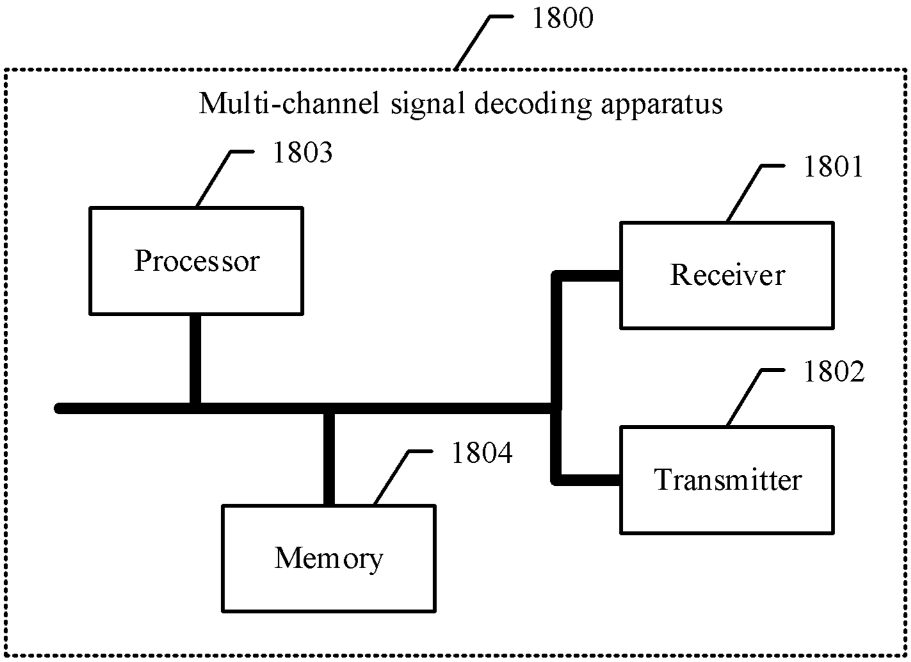
FIG. 18 is a schematic diagram of a composition structure of another multi-channel signal decoding apparatus according to an embodiment of the present disclosure.

The following describes another multi-channel signal decoding apparatus provided in an embodiment of the present disclosure. As shown in FIG. 18, the multi-channel signal decoding apparatus 1800 includes: a receiver 1801, a transmitter 1802, a processor 1803, and a memory 1804. (there may be one or more processors 1803 in the multi-channel signal decoding apparatus 1800, and one processor is used as an example in FIG. 18). In some embodiments of the present disclosure, the receiver 1801, the transmitter 1802, the processor 1803, and the memory 1804 may be connected through a bus or in another manner, and a connection through the bus is used as example in FIG. 18.

The memory 1804 may include a ROM and a RAM, and provide instructions and data for the processor 1803. Apart of the memory 1804 may further include an NVRAM. The memory 1804 stores an operating system and operation instructions, an executable module or a data structure, or a subset thereof, or an extended set thereof. The operation instructions may include various operation instructions for performing various operations. The operating system may include various system programs, to implement various basic services and process a hardware-based task.

The processor 1803 controls an operation of the multi-channel signal decoding apparatus, and the processor 1803 may also be referred to as a CPU. In a specific application, components of the multi-channel signal decoding apparatus are coupled together through a bus system. In addition to a data bus, the bus system includes a power bus, a control bus, and a status signal bus. However, for clear description, various types of buses in the figure are marked as the bus system.

The methods disclosed in the foregoing embodiments of the present disclosure may be applied to the processor 1803 or may be implemented by the processor 1803. The processor 1803 may be an integrated circuit chip, and has a signal processing capability. In an implementation process, steps in the methods may be implemented by using a hardware integrated logic circuit in the processor 1803, or by using instructions in a form of software. The foregoing processor 1803 may be a general-purpose processor, a DSP, an ASIC, an FPGA or another programmable logic device, a discrete gate or transistor logic device, or a discrete hardware component. The processor may implement or perform the methods, steps, and logical block diagrams that are disclosed in embodiments of the present disclosure. The general-purpose processor may be a microprocessor, or the processor may be any conventional processor or the like. The steps in the methods disclosed with reference to embodiments of the present disclosure may be directly performed and completed by a hardware decoding processor, or may be performed and completed by a combination of hardware and a software module in the decoding processor. The software module may be located in a mature storage medium in the art, such as a RAM, a flash memory, a ROM, a programmable ROM, an electrically erasable programmable memory, or a register.

The storage medium is located in the memory 1804, and the processor 1803 reads information in the memory 1804 and completes the steps in the foregoing methods in combination with hardware of the processor 1803.

In this embodiment of the present disclosure, the processor 1803 is configured to perform the methods performed by the multi-channel signal decoding apparatus shown in FIG. 5, FIG. 8, FIG. 10A and FIG. 10B, FIG. 12, and FIG. 14A and FIG. 14B in the foregoing embodiments.

In another possible design, when the multi-channel signal encoding apparatus or the multi-channel signal decoding apparatus is a chip in a terminal, the chip includes a processing unit and a communication unit. The processing unit may be, for example, a processor. The communication unit may be, for example, an input/output interface, a pin, a circuit, or the like. The processing unit may execute computer-executable instructions stored in a storage unit, so that the chip in the terminal performs the audio encoding method according to any one of the first aspect or the audio decoding method according to any one of the second aspect. Optionally, the storage unit is a storage unit in the chip, for example, a register or a cache; or the storage unit may be a storage unit that is in the terminal and that is located outside the chip, for example, a ROM, another type of static storage device that can store static information and instructions, or a RAM.

The processor mentioned above may be a general-purpose central processing unit, a microprocessor, an ASIC, or one or more integrated circuits configured to control program execution of the method in the first aspect or the second aspect.

In addition, it should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected based on an actual requirement, to achieve objectives of the solutions in embodiments. In addition, in the accompanying drawings of the apparatus embodiments provided in the present disclosure, connection relationships between modules indicate that the modules have communication connections with each other, and may be specifically implemented as one or more communication buses or signal cables.

Based on the description of the foregoing implementations, a person skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, in the present disclosure, a software program implementation is a better implementation in most cases. Based on such an understanding, the technical solutions of the present disclosure essentially or the part contributing to the conventional technology may be implemented in a form of a software product. The computer software product is stored in a readable storage medium, such as a floppy disk, a Universal Serial Bus (USB) flash drive, a removable hard disk, a ROM, a RAM, a magnetic disk, or an optical disc of a computer, and includes several instructions for instructing a computer device (which may be a personal computer, a server, or a network device) to perform the methods described in embodiments of the present disclosure.

All or some of the foregoing embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on a computer, all or some procedures or functions in embodiments of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a Digital Versatile Disc (DVD)), a semiconductor medium (for example, a solid-state disk (SSD)), or the like.

What is claimed is:

1. A method comprising:

obtaining M first transient identifiers of first M blocks of a first sound channel of a current frame of a multi-channel signal based on first spectrums of the first M blocks, wherein the first M blocks comprise a first block of the first sound channel, and wherein a first first transient identifier of the first block indicates that the first block is transient or non-transient;

obtaining first group information of the first M blocks based on the M first transient identifiers;

obtaining M second transient identifiers of second M blocks of a second sound channel of the current frame based on second spectrums of the second M blocks, wherein the second M blocks comprise a second block of the second sound channel, and wherein a first second transient identifier of the second block indicates that the second block is transient or non-transient;

obtaining second group information of the second M blocks based on the M second transient identifiers;

obtaining, when the first group information and the second group information meet a preset condition, first adjusted group information and second adjusted group information based on the first group information and the second group information, wherein the first adjusted group information corresponds to the first group information, wherein the second adjusted group information corresponds to the second group information, and wherein the first adjusted group information is same as the first group information and the second adjusted group information is based on adjusting the second group information, the first adjusted group information is based on adjusting the first group information and the second adjusted group information is same as the second group information, or the first adjusted group information is based on adjusting the first group information and the second adjusted group information is based on adjusting the second group information;

obtaining a first to-be-encoded spectrum based on the first adjusted group information and the first spectrums;

obtaining a second to-be-encoded spectrum based on the second adjusted group information and the second spectrums;

encoding the first to-be-encoded spectrum and the second to-be-encoded spectrum by using an encoding neural network to obtain a spectrum encoding result; and writing the spectrum encoding result into a bitstream.

2. The method of claim 1, further comprising:

encoding the first adjusted group information and the second adjusted group information to obtain a group information encoding result; and writing the group information encoding result into the bitstream.

3. The method of claim 1, wherein:

the first group information comprises a first group quantity or a first group quantity identifier of the first M blocks, wherein the first group quantity identifier indicates the first group quantity, and wherein when the first group quantity is greater than 1, the first group information further comprises the M first transient identifiers; and/or the second group information comprises a second group quantity or a second group quantity identifier of the second M blocks, wherein the second group quantity identifier indicates the second group quantity, and wherein when the second group quantity is greater than 1, the second group information further comprises the M second transient identifiers; and/or the first adjusted group information comprises a first adjusted group quantity or a first adjusted group quantity identifier of the first M blocks, wherein the first adjusted group quantity identifier indicates the first adjusted group quantity, and wherein when the first adjusted group quantity is greater than 1, the first adjusted group information further comprises M first adjusted transient identifiers of the first M blocks; and/or the second adjusted group information comprises a second adjusted group quantity or a second adjusted group quantity identifier of the second M blocks, wherein the second adjusted group quantity identifier indicates the second adjusted group quantity, and wherein when the second adjusted group quantity is greater than 1, the second adjusted group information further comprises M second adjusted transient identifiers of the second M blocks.

4. The method of claim 3, wherein the preset condition comprises the first group information is inconsistent with the second group information, wherein the first group information is inconsistent with the second group information comprises:

the M first transient identifiers indicate that the first M blocks comprise a first transient block and a first non-transient block;

the M second transient identifiers indicate that the second M blocks comprise a second transient block and a second non-transient block; and one of the following:

the M first transient identifiers are inconsistent with the M second transient identifiers; or a first quantity of transient blocks of the first sound channel is inconsistent with a second quantity of transient blocks of the second sound channel; or the M first transient identifiers are inconsistent with the M second transient identifiers, an $N^{th}$ block in the first M blocks and an $N^{th}$ block in the second M blocks are both in a transient state, and $0 \leq N < M$.

5. The method of claim 4, wherein the first M blocks and the second M blocks have respective indices; and when the first group information is inconsistent with the second group information comprises: the first quantity is inconsistent with the second quantity, if a first index of the first transient block and a second index of the second transient block do not intersect, obtaining the first adjusted group information and second adjusted group information comprises:

adjusting, when the first quantity is less than the second quantity, the first group information to obtain the first adjusted group information, wherein a third quantity of transient blocks of the first sound channel indicated by the first adjusted group information is equal to a fourth quantity of transient blocks of the second sound channel indicated by the second group information; or adjusting, when the first quantity is greater than the second quantity, the second group information to obtain the second adjusted group information, wherein a fifth quantity of transient blocks of the second sound channel indicated by the second adjusted group information is equal to a sixth quantity of transient blocks of the first sound channel indicated by the first group information; or when that the first group information is inconsistent with the second group information comprises: the first quantity is inconsistent with the second quantity, if the first index and the second index intersect, obtaining the first adjusted group information and second adjusted group information comprises:

adjusting, when first indices of transient blocks indicated by the M first transient identifiers are a part of second indices of transient blocks indicated by the M second transient identifiers, at least one of the M first transient identifiers to obtain the M first adjusted transient identifiers, wherein the first indices of all the transient blocks indicated by the M first adjusted transient identifiers are same as the second indices of all the transient blocks indicated by the M second transient identifiers; or adjusting, when the second indices of transient blocks indicated by the M second transient identifiers are a part of the first indices of transient blocks indicated by the M first transient identifiers, at least one of the M second transient identifiers to obtain the M second adjusted transient identifiers, wherein the second indices of all the transient blocks indicated by the M second adjusted transient identifiers are same as the first indices of all the transient blocks indicated by the M first transient identifiers; or adjusting, when the first indices of transient blocks indicated by the M first transient identifiers are partially same as the second indices of transient blocks indicated by the M second transient identifiers, at least one of the M first transient identifiers to obtain the M first adjusted transient identifiers, and adjusting at least one of the M second transient identifiers to obtain the M second adjusted transient identifiers, wherein the first indices of all the transient blocks indicated by the M first adjusted transient identifiers are same as the second indices of all the transient blocks indicated by the M second adjusted transient identifiers.

6. The method of claim 5, wherein:

adjusting the at least one of the M first transient identifiers to obtain the M first adjusted transient identifiers comprises adjusting, when the first first transient identifier indicates that the first block is non-transient and a second second transient identifier of a third block in the second M blocks indicates that the third block is transient, the first first transient identifier to a first adjusted transient identifier of the first block, wherein the first adjusted transient identifier indicates that the first block is transient, and wherein a third index of the first block is same as a fourth index of the third block; or adjusting the at least one of the M second transient identifiers to obtain the M second adjusted transient identifiers comprises, adjusting, when the first second transient identifier indicates that the second block is non-transient and a second first transient identifier of a fourth block in the first M blocks indicates that the fourth block is transient, the first second transient identifier to a second adjusted transient identifier of the second block, wherein the second adjusted transient identifier indicates that the second block is transient, and wherein a fifth index of the second block is same as a sixth index of the fourth block.

7. The method of claim 3, wherein when the first adjusted group quantity is greater than 1 or the M first adjusted transient identifiers indicate that the first M blocks comprise a first transient block and a first non-transient block, obtaining the first to-be-encoded spectrum comprises grouping and arranging the first spectrums based on the first adjusted group information to obtain the first to-be-encoded spectrum, and wherein when the second adjusted group quantity is greater than 1 or the M second adjusted transient identifiers indicate that the second M blocks comprise a second transient block and a second non-transient block, obtaining the second to-be-encoded spectrum comprises grouping and arranging the second spectrums based on the second adjusted group information to obtain the second to-be-encoded spectrum.

8. The method of claim 7, wherein:

grouping and arranging the first spectrums comprises allocating third spectrums of blocks that are indicated as transient by the M first adjusted transient identifiers and that are in the first M blocks to a first transient group, allocating fourth spectrums of blocks that are indicated as non-transient by the M first adjusted transient identifiers and that are in the first M blocks to a first non-transient group, and arranging the third spectrums before the fourth spectrums to obtain the first to-be-encoded spectrum; or grouping and arranging the second spectrums comprises allocating fourth spectrums of blocks that are indicated as transient by the M second adjusted transient identifiers and that are in the second M blocks to a second transient group, allocating fifth spectrums of blocks that are indicated as non-transient by the M second adjusted transient identifiers and that are in the second M blocks to a second non-transient group, and arranging the fourth spectrums before the fifth spectrums to obtain the second to-be-encoded spectrum; or grouping and arranging the first spectrums comprises allocating sixth spectrums of blocks that are indicated as transient by the M first adjusted transient identifiers and that are in the first M blocks before seventh spectrums of blocks that are indicated as non-transient by the M first adjusted transient identifiers and that are in the first M blocks to obtain the first to-be-encoded spectrum; or wherein grouping and arranging the second spectrums comprises arranging eighth spectrums of blocks that are indicated as transient by the M second adjusted transient identifiers and that are in the second M blocks before ninth spectrums of blocks that are indicated as non-transient by the M second adjusted transient identifiers and that are in the second M blocks to obtain the second to-be-encoded spectrum.

9. The method of claim 3, wherein before encoding the first to-be-encoded spectrum and the second to-be-encoded spectrum, the method further comprises:

performing intra-group interleaving on the first to-be-encoded spectrum to obtain a first intra-group interleaved spectrum;

performing intra-group interleaving on the second to-be-encoded spectrum to obtain a second intra-group interleaved spectrum; and encoding the first to-be-encoded spectrum and the second to-be-encoded spectrum comprises encoding, by using the encoding neural network, the first intra-group interleaved spectrum and the second intra-group interleaved spectrum.

10. The method of claim 9, wherein the M first adjusted transient identifiers indicate P blocks in the first M blocks are transient and Q blocks in the first M blocks are non-transient, wherein M=P+Q, and wherein performing intra-group interleaving on the first to-be-encoded spectrum comprises:

performing interleaving on third spectrums of the P blocks to obtain interleaved spectrums of the P blocks; and performing interleaving on fourth spectrums of the Q blocks to obtain interleaved spectrums of the Q blocks.

11. The method of claim 1, wherein before obtaining the M first transient identifiers, the method further comprises:

obtaining a first window type of the first sound channel, wherein the first window type is a short window type or a non-short window type;

obtaining a second window type of the second sound channel, wherein the second window type is the short window type or the non-short window type; and obtaining, only when both the first window type and the second window type are the short window type, the M first transient identifiers.

12. The method of claim 11, further comprising:

encoding the first window type and the second window type to obtain a window type encoding result; and writing the window type encoding result into the bitstream.

13. The method of claim 1, wherein obtaining the M first transient identifiers comprises:

obtaining M first spectral energy values of the first M blocks based on the first spectrums;

obtaining a first average spectral energy value of the first M blocks based on the M first spectral energy values; and obtaining the M first transient identifiers based on the M first spectral energy values and the first average spectral energy value.

14. The method of claim 13, wherein when a first spectral energy value of the first block is greater than K times the first average spectral energy value, the first transient identifier indicates that the first block is transient, wherein when the first spectral energy value of the first block is less than or equal to K times the first average spectral energy value, the first transient identifier indicates that the first block is non-transient, and wherein K is a real number greater than or equal to 1.

15. A method comprising:

obtaining first decoded group information of first M blocks of a first sound channel of a current frame of a multi-channel signal from a bitstream, wherein the first decoded group information indicates M first decoded transient identifiers of the first M blocks;

obtaining second decoded group information of second M blocks of a second sound channel of the current frame, wherein the second decoded group information indicates M second decoded transient identifiers of the second M blocks;

decoding the bitstream, using a decoding neural network, to obtain first decoded spectrums of the first M blocks and second decoded spectrums of the second M blocks;

obtaining a first reconstructed signal of the first sound channel based on the first decoded group information and the first decoded spectrums; and obtaining a second reconstructed signal of the second sound channel based on the second decoded group information and the second decoded spectrums.

16. The method of claim 15, wherein obtaining the first reconstructed signal comprises:

performing, when the first decoded group information indicates that a first decoded group quantity of the first M blocks is greater than 1, inverse grouping and arranging on the first decoded spectrums to obtain first inversely grouped and arranged spectrums of the first M blocks; and obtaining the first reconstructed signal of the first sound channel based on the first inversely grouped and arranged spectrums, and wherein obtaining the second reconstructed signal comprises:

performing, when the second decoded group information indicates that a second decoded group quantity of the second M blocks is greater than 1, inverse grouping and arranging on the second decoded spectrums to obtain second inversely grouped and arranged spectrums of the second M blocks; and obtaining the second reconstructed signal of the second sound channel based on the second inversely grouped and arranged spectrums; or wherein obtaining the first reconstructed signal comprises:

performing intra-group de-interleaving on the first decoded spectrums to obtain first intra-group de-interleaved spectrums of the first M blocks; and obtaining the first reconstructed signal based on the first intra-group de-interleaved spectrums, and wherein obtaining the second reconstructed signal comprises:

performing intra-group de-interleaving on the second decoded spectrums to obtain second intra-group de-interleaved spectrums of the second M blocks; and obtaining the second reconstructed signal based on the second intra-group de-interleaved spectrums.

17. The method of claim 15, wherein the M first decoded transient identifiers indicate P blocks in the first M blocks are transient and Q blocks in the first M blocks are non-transient, wherein M=P+Q; and wherein obtaining the first reconstructed signal comprises:

performing intra-group de-interleaving on third decoded spectrums of the P blocks and on fourth decoded spectrums of the Q blocks to obtain intra-group de-interleaved spectrums of the first M blocks;

performing inverse grouping and arranging on the intra-group de-interleaved spectrums based on the first decoded group information to obtain inversely grouped and arranged spectrums of the first M blocks; and obtaining the first reconstructed signal based on the inversely grouped and arranged spectrums.

18. The method of claim 17, wherein performing inverse grouping and arranging on the intra-group de-interleaved spectrums comprises:

obtaining first indices of the P blocks based on the first decoded group information;

obtaining second indices of the Q blocks based on the first decoded group information; and performing inverse grouping and arranging on the intra-group de-interleaved spectrums based on the first indices and the second indices.

19. The method of claim 15, wherein:

the first decoded group information comprises a first decoded group quantity or a first decoded group quantity identifier of the first M blocks, wherein the first decoded group quantity identifier indicates the first decoded group quantity, and when the first decoded group quantity is greater than 1, the first decoded group information further comprises the M first decoded transient identifiers; and/or the second decoded group information comprises a second decoded group quantity or a second decoded group quantity identifier of the second M blocks, wherein the second decoded group quantity identifier indicates the second decoded group quantity, and when the second decoded group quantity is greater than 1, the second decoded group information further comprises the M second decoded transient identifiers.

20. An apparatus comprising:

a memory configured to store instructions;

one or more processors coupled to the memory and configured to execute the instructions to cause the apparatus to:

obtain M first transient identifiers of first M blocks of a first sound channel of a current frame of a multi-channel signal based on first spectrums of the first M blocks, wherein the first M blocks comprise a first block of the first sound channel, and wherein a first transient identifier of the first block indicates that the first block is transient or non-transient;

obtain first group information of the first M blocks based on the M first transient identifiers;

obtain M second transient identifiers of second M blocks of a second sound channel of the current frame based on second spectrums of the second M blocks, wherein the second M blocks comprise a second block of the second sound channel, and wherein a second transient identifier of the second block indicates that the second block is transient or non-transient;

obtain second group information of the second M blocks based on the M second transient identifiers;

obtain, when the first group information and the second group information meet a preset condition, first adjusted group information and second adjusted group information based on the first group information and the second group information, wherein the first adjusted group information corresponds to the first group information, wherein the second adjusted group information corresponds to the second group information, and wherein the first adjusted group information is same as the first group information, and the second adjusted group information is based on adjusting the second group information, the first adjusted group information is based on adjusting the first group information, and the second adjusted group information is same as the second group information, or the first adjusted group information is based on adjusting the first group information, and the second adjusted group information is based on adjusting the second group information;

obtain a first to-be-encoded spectrum based on the first adjusted group information and the first spectrums;

obtain a second to-be-encoded spectrum based on the second adjusted group information and the second spectrums;

obtain the first to-be-encoded spectrum and the second to-be-encoded spectrum by using an encoding neural network to obtain a spectrum encoding result; and write the spectrum encoding result into a bitstream.

* * * * *